United States Patent [19]
Haley et al.

[11] Patent Number: 5,857,071
[45] Date of Patent: Jan. 5, 1999

[54] COMPUTER PROCESS RESOURCE MODELLING METHOD AND APPARATUS

[75] Inventors: Matthew A. Haley, San Jose; Jonathan D. Pincus, San Francisco; William R. Bush, San Mateo, all of Calif.

[73] Assignee: Intrinsa Corporation, Mountain View, Calif.

[21] Appl. No.: 902,714

[22] Filed: Jul. 30, 1997

Related U.S. Application Data

[62] Division of Ser. No. 289,148, Aug. 10, 1994, Pat. No. 5,694,539.

[51] Int. Cl.$^6$ .................................................. G06F 11/00
[52] U.S. Cl. ............... 395/183.14; 395/704; 395/185.04
[58] Field of Search ........................ 395/183.01, 183.11, 395/183.13, 183.14, 183.15, 185.01, 185.02, 185.04, 185.07, 704

[56] References Cited

U.S. PATENT DOCUMENTS

| | | | |
|---|---|---|---|
| 4,953,084 | 8/1990 | Meloy et al. | 395/183.14 |
| 5,038,348 | 8/1991 | Yoda et al. | 395/183.14 |
| 5,193,180 | 3/1993 | Hastings | 395/575 |
| 5,253,158 | 10/1993 | Suzuki et al. | 364/140 |
| 5,293,629 | 3/1994 | Conley et al. | 395/700 |
| 5,355,469 | 10/1994 | Sparks et al. | 395/575 |
| 5,517,629 | 5/1996 | Boland | 395/183.14 |
| 5,559,980 | 9/1996 | Connors et al. | 395/183.14 |
| 5,613,063 | 3/1997 | Eustace et al. | 395/183.14 |
| 5,615,369 | 3/1997 | Holler | 395/709 |
| 5,689,712 | 11/1997 | Heisch | 395/183.14 |
| 5,729,676 | 3/1998 | Inoue | 395/183.14 |

OTHER PUBLICATIONS

Austin et al., "Efficient Detection of All Pointer and Array Access Errors," ACM Sigplan, document No. 0–89791–662–x/94/0006, pp. 290–301 (1994).

Boris Beizer, *Software Testing Techniques*, 2nd Ed., Van Nostrand Reinhold, New York, NY., pp. 59–60, 70–77, 145 and 150–172 (1990).

Francois Bourdoncle, "Abstract Debugging of Higher–order Imperative Languages," ACM Sigplan, document No. 0–89791–598–4/93/0006/0046, pp. 46–55 (1993).

(List continued on next page.)

*Primary Examiner*—Albert DeCady
*Attorney, Agent, or Firm*—Skjerven, Morrill, MacPherson, Franklin & Friel; Alan H. MacPherson

[57] ABSTRACT

An error detection mechanism for detecting programming errors in a computer program. A component of the computer program, e.g., a procedure or function of the computer program, is analyzed to determine the effect of the component on resources used by the computer program. A component is analyzed by traversing the computer instructions, i.e., statements, of the component and tracking the state of resources used by the component as affected by the statements of the component. Each resource has a prescribed behavior represented by a number of states and transition between states. Violations in the prescribed behavior of a resource resulting from an emulated execution of the statements of the component are detected and reported as programming errors. Resources used by two or more components are modelled by modelling externals of the components. The effect of execution of a component on externals and resources of the component is determined by traversing one or more possible control flow paths through the component and tracking the use of each external and resource by each statement of each control flow path. Once the effect of execution of a component on externals and resources of the component is determined, a model of the component is created and used to model externals and resources of other components which invoke the modelled component.

3 Claims, 37 Drawing Sheets

Microfiche Appendix Included
(2 Microfiche, 98 Pages)

OTHER PUBLICATIONS

Chan et al., "AIDA—A Dynamic Data Flow Anomaly Detection System for Pascal Programs," Software Practice and Experience, vol. 17, No. 3, pp. 227–239 (Mar. 1987).

Richard A. Eyre–Todd, "The Detection of Dangling References in C++ Programs," ACM Letters on Programming Languages and Systems, vol. 2, Nos. 1–4, pp. 127–133 (Mar.–Dec. 1993).

Istvan Forgacs, "Double Iterative Framework for Flow–Sensitive Interprocedural Data Flow Analysis," ACM Transactions on Software Engineering and Methodology, vol. 3, No. 1, pp. 29–55 (Jan. 1994).

Fosdick et al., "Data Flow Analysis in Software Reliability," Computing Surveys, vol. 8, No. 3, pp. 305–330 (Sep. 1976).

Frankl et al., "An Applicable of Data Flow Testing Criteria," IEEE Transactions of Software Engineering, vol. 14, No. 10, pp. 1483–1498 (Oct. 1988).

Fritzson et al., "Generalized Algorithmic Debugging and Testing," Proceedings of the ACM Sigplan '91 Conference on Programming Language Design and Implementation, Toronto, Ontario, Canada, pp. 317–326 (Jun. 26–28, 1991).

Rajiv Gupta, "Optimizing Array Bound Checks Using Flow Analysis," ACM Letters on Programming Languages and Systems, vol. 2, Nos. 1–4, pp. 135–150 (Mar.–Dec. 1993).

J. C. Huang, "Detection of Data Flow Anomaly Through Program Instrumentation," IEEE Transactions on Software Engineering, vol. SE–5, No. 3, pp. 226–236 (May 1979).

Bogdan Korel, "Automated Software Test Data Generation," IEEE Transactions on Software Engineering, vol. 16, No. 8, pp. 870–879 (Aug. 1990).

Laski et al., "A Data Flow Oriented Program Testing Strategy," IEEE Transactions on Software Engineering, vol. SE–9, No. 3, pp. 347–354 (May 1983).

Ogawa et al., "Anomaly Detection of Functional Programs Based on Global Dataflow Analysis,"Systems and Computers in Japan, vol. 21, No. 2, pp. 11–22 (1990).

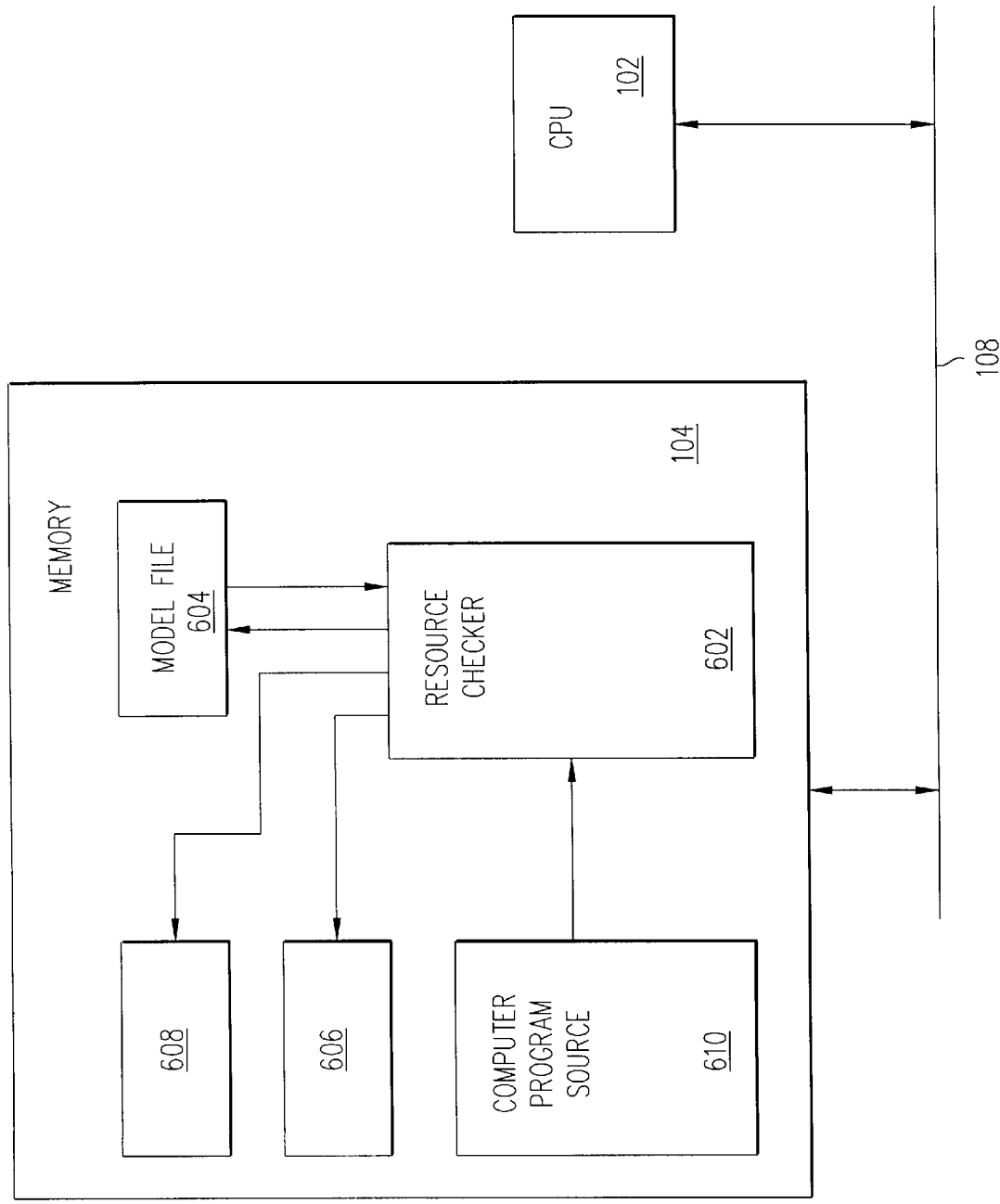

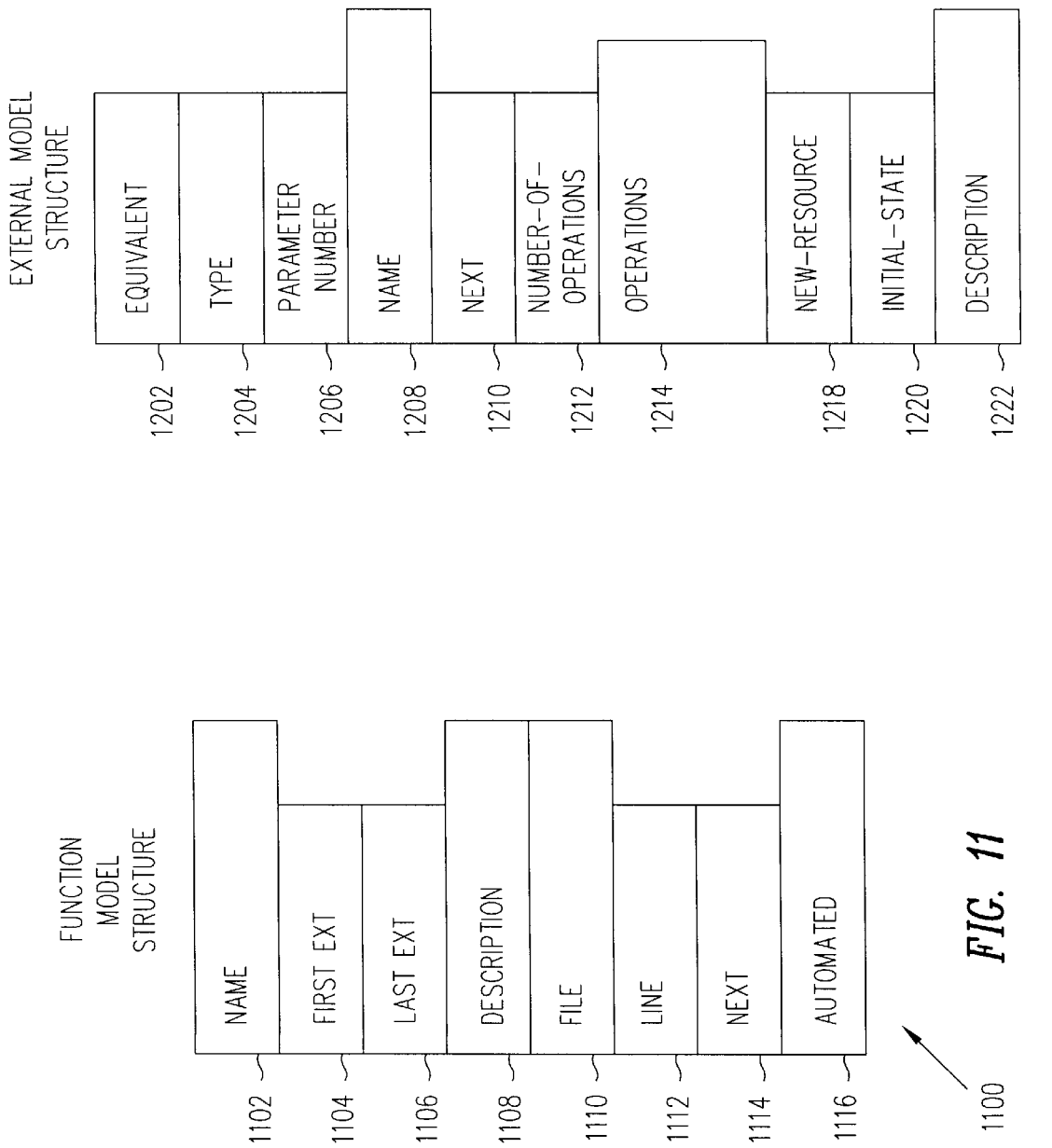

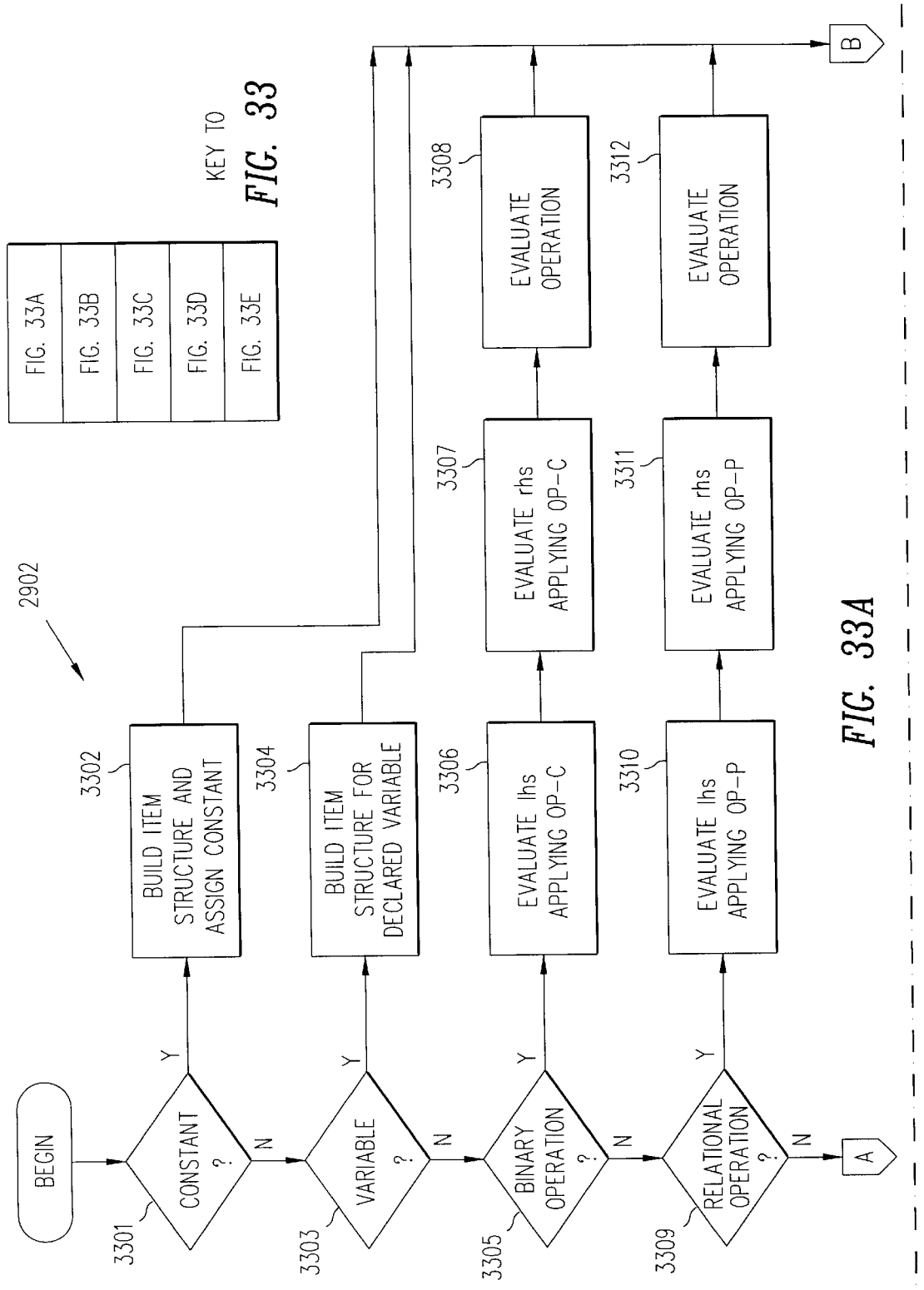

COMPUTER PROCESS RESOURCE MODELLING METHOD AND APPARATUS

This application is a division of application Ser. No. 08/289,148, filed Aug. 10, 1994, now U.S. Pat. No. 5,694,539.

CROSS REFERENCE TO MICROFICHE APPENDIX

Appendix A, which is a part of this disclosure, is a microfiche appendix consisting of 2 sheets of microfiche having a total of 124 frames. Microfiche Appendix A is a list of computer programs and related data in one embodiment of the present invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the analysis of computer programs and, in particular, to the detection of programming errors in a computer program through analysis of the use of resources prescribed by the computer program.

2. Discussion of Related Art

Some existing programming error detection methods detect violations in the computer instruction protocol with which a particular program comports. Such a programming error detection method is called "static checking" since the syntax of the computer instructions, or "statements" of the computer program is analyzed outside the context of the behavior resulting from the execution of those statements. The term "statement" is used herein as it is defined in Section 6.6 of *American National Standard for Programming Languages*—C (American National Standards Institute/International Organization for Standardization ANSI/ISO 9899-1990), which is reproduced in Herbert Schildt, *The Annotated ANSI C Standard*, (Osborne McGraw-Hill 1990) (hereinafter the C Standard). Briefly, in the context of the C computer language, a statement is a computer instruction other than a declaration. In other words, a statement is a any expression or instruction which directs a computer to carry out one or more processing steps. Static checking in the context of the C computer language includes, for example, (i) making sure that no two variables in the computer program are identified by the same name; (ii) ensuring that each "break" statement corresponds to a preceding "while", "for", or "switch" statement; and (iii) verifying that operators are applied to compatible operands. Static checking is discussed, for example, in Alfred V. Aho et al., *Compilers*, (Addison Wesley 1988).

Some existing static checking methods, which are generally called "data flow analysis" techniques, analyze data flow through a program to detect programming errors. Such analysis includes use of control flow information, such as sequencing of statements and loop statements, to detect the improper use of data objects, e.g., the use of a variable before a value has been assigned to the variable. Flow of control in a computer program is the particular sequence in which computer instructions of the computer program are executed in a computer process defined by the computer program. Computer programs and processes and the relation therebetween are discussed more completely below. Data flow techniques are discussed in Beizer, *Software Testing Techniques*, (1990) at pp. 145–172.

Existing static checking techniques suffer from the inability to track use of resources through several discrete components of a computer program such as several functions which collectively form a computer program. For example, a variable may be initialized in a first function and used in a calculation in a second, subsequently executed function. By analysis of only the computer instructions of the second function, the variable appears to be used before the variable is initialized which can be erroneously reported as an error. In addition, existing static checking techniques are static in nature and do not consider particular data values associates with particular data objects. Static analysis is limited to what can be determined without considering the dynamic effects of program execution. Beizer describes several areas for which static analysis is inadequate, including: arrays, especially dynamically calculated indices and dynamically allocated arrays; records and pointers; files; and alternate state tables, representing the different semantics of different types in the same program.

Static checkers do not detect errors involving calculated addresses corresponding to dynamically allocated memory or calculated indices into arrays. Calculated addresses and indices are addresses and indices, respectively, which are calculated during the execution of a computer process. Static checkers do not detect such errors in a computer program because checking for such errors typically involves determining the precise values of calculated addresses and indices, which in turn involves consideration of the behavior of the computer program during execution, i.e., as a computer process.

Static checkers do not detect errors involving the use of questionably allocated resources or the use of resources whose state is determined by the value of a variable or other data object. In the C computer language, a resource, e.g., dynamically allocate memory or a file, is questionably allocated. In other words, a function which allocates the resource completes successfully, even if allocation of the resource failed. Whether the allocation succeeded is determined by comparison of the returned item of the function, which is a pointer to the allocated resource, to an invalid value, e.g., NULL. Static checkers do not consider the behavior of a called function but instead only verify that the syntax of the call to the called function comports with the syntax prescribed in the particular computer language. Therefore, static checkers do not detect errors involving use of a resource which is questionably allocated.

As described above, a static checker does not consider the behavior of a called function. Thus, verifying the use of a resource which spans multiple functions is impossible. For example, if a first function allocates a resource, a second function uses the resource, and a third function deallocates the resource, static checking of any of the first, second, and third functions alone or a function calling all three functions, cannot verify the proper use of the resource.

When using an error detection technique, which employs insufficient information regarding the behavior of a computer program during execution, the errors reported by such a technique are either under-inclusive or over-inclusive. For example, if a function accepts as a parameter a pointer to an allocated resource, e.g., a file, and uses the parameter without comparing the parameter to an invalid pointer, the function contains a possible error. Whether the function contains an error depends on circumstances which are unknown within the context of the function. For example, if the pointer is verified to be a valid pointer before the function is called, there is no error in the function. To report the use of the pointer as an error would clutter an analysis of the function with a falsely reported error, and thus would be over-inclusive. Falsely reporting errors in analysis of a large program, at best, is an inconvenience to a program developer and, at worst, renders analysis of a computer program useless. If the pointer is not checked to be valid prior to calling the function, failure to report the error results in failure to detect an error which can cause an execution of the computer program to be aborted abruptly and can result in the corruption of data structures and possibly in the loss of valuable data.

One particular drawback of the failure of static checking techniques to consider the dynamic behavior of a computer program is the reporting of apparent, but "false", errors, i.e., errors resulting from computer instructions through which control cannot flow. In functions in which control flow paths depend on particular values associated with particular data structures and program variables, control flow cannot be determined without considering the values associated with those data structures and variables which generally in turn cannot be determined without consideration of the behavior of the function during execution. As a result, instructions which are not executed or which are executed only under specific circumstances are generally assumed to always be executed by static checkers.

Another type of existing programming error detection technique is called program verification. In program verification, a computer program is treated as a formal mathematical object. Errors in the computer program are detecting by proving, or failing to prove, certain properties of the computer program using theoretical mathematics. One property for which a proof is generally attempted is that, given certain inputs, a computer process defined by the computer program produces certain outputs. If the proof fails, the computer program contains a programming error. Such program verification techniques are described, for example, in Eric C. R. Hehner et al., *A Practical Theory of Programming*, (Verlag 1993) and Ole-Johan Dahl, *Verifiable Programming*, (Prentice Hall 1992).

Verified programming techniques are limited in at least two ways: (i) only properties of computer programs which can be expressed and automatically proven using formal logic can be verified, and (ii) a person developing a computer program generally must formally specify the properties of the computer program. Formally specifying the properties of a computer program is extremely difficult in any case and intractable for larger programs. As a result, commercially successful products employing verified programming techniques are quite rare.

In another type of programming error detection technique, a computer program is executed, thus forming a computer process, and the behavior of the computer process is monitored. Since a computer program is analyzed during execution, such a programming error detection technique is called "runtime checking". Some runtime checking techniques include automatically inserting computer instructions into a computer program such that execution of the inserted computer instructions note, during execution of the computer program, the status of variables and resources of the computer program. Such an error detection technique is described by U.S. Pat. No. 5,193,180 to Hastings.

Runtime checking can typically detect errors such as array indices out of bounds and memory leaks. Examples of runtime checking include Purify which is available from Pure Software Inc. of Sunnyvale, Calif. and Insight which is available from Parasoft Corporation of Pasadena, Calif. Purify inserts into a computer program monitoring computer instructions after a computer program has been compiled in to an object code form, and Insight inserts into a computer program monitoring computer instructions before a computer program is compiled, i.e., while the computer program is still in a source code form.

Runtime checking is generally limited to what can be determined by actually executing the computer instructions of a computer program with actual, specific inputs. Runtime checking does not consider all possible control flow paths through a computer program but considers only those control flow paths corresponding to the particular inputs to the computer program supplied during execution. It is generally impracticable to coerce a computer process, formed by execution of the computer instructions of a computer program, to follow all possible control flow paths. To do so requires that a programmer anticipate all possible contingencies which might occur during execution of the computer instructions of a computer program and to cause or emulate all possible combinations of occurrences of such contingencies.

Furthermore, runtime checking can only be used when the computer program is complete. Analysis of a single function before the function is incorporated into a complete program is impossible in runtime checking since the function must be executed to be analyzed. Analysis of a function using runtime checking therefore requires that (i) all functions of a computer program be developed and combined to form the computer program prior to analysis of any of the functions or (ii) that a special purpose test program, which incorporates the function, be developed to test the function. Top-down programming, which involves the design, implementation, and testing of individual functions prior to inclusion in a complete computer program and which is a widely known and preferred method of developing more complex computer programs, therefore does not lend itself well to runtime analysis.

What is needed is a programming error detection technique which considers the dynamic behavior of a computer program, which automatically considers substantially all possible control flow paths through the computer program, and which does not require a programmer of such a computer program to express the computer program in an alternative, e.g., mathematical, form. What is further needed is a programming error detection technique which analyzes an individual component of a program, considering the behavior of the component during execution. What is further needed is a programming error detection technique which considers the behavior of a component whose execution is invoked by a computer program component under analysis.

SUMMARY OF THE INVENTION

In accordance with the present invention, a computer program is analyzed, and programming errors in the computer program are detected, by modelling the behavior of resources used by the computer program and detecting potential state violations in the those resources. A resource is modelled according to resource states and resource state transitions which describe the behavior of the resource. The computer instructions of the computer program are dynamically inspected, i.e., the dynamic behavior of the computer instructions is determined and the states of resources are changed according to the dynamic behavior of the computer instructions.

Each component of a computer program is analyzed individually. Use of a resource whose use spans more than one component, e.g., a resource which is allocated by a first component, used by a second component and deallocated by a third component, is analyzed by modelling the externals of each component. Two components of a computer program communicate with one another through the externals of each component. For example, information regarding a resource allocated by a first component is transmitted to a second component, which uses the resource, through the externals of the first and second components. By analyzing the behavior of each component with respect to the externals of the component, resources whose use span more than one component are properly modelled.

Each component is analyzed and the effect of execution of the component on each external of the component is determined. From the analysis of the component, a model of the component is created. The model of the component describes the effect of execution of the component on each external of the component in terms of changes in the respective states of the externals and the introduction of new resources associated with any external of the component. Execution of the modelled component can have any of a number of effects on any individual external, and those effects are represented in a composite state of the external. The model of the component can then be used in the analysis of other components which invoke execution of the modelled component.

BRIEF DESCRIPTION OF THE DRAWINGS

FIGS. 6 and 7 are block diagrams of a resource checker in accordance with the present invention.

FIG. 11 is a block diagram of a function model structure in accordance with an embodiment of the present invention.

FIG. 12 is a block diagram of an external model structure in accordance with an embodiment of the present invention.

FIGS. 33A, 33B, and 33C are a logic flow diagram of the processing of an operator in accordance with an embodiment of the present invention.

DETAILED DESCRIPTION

Figure 1:
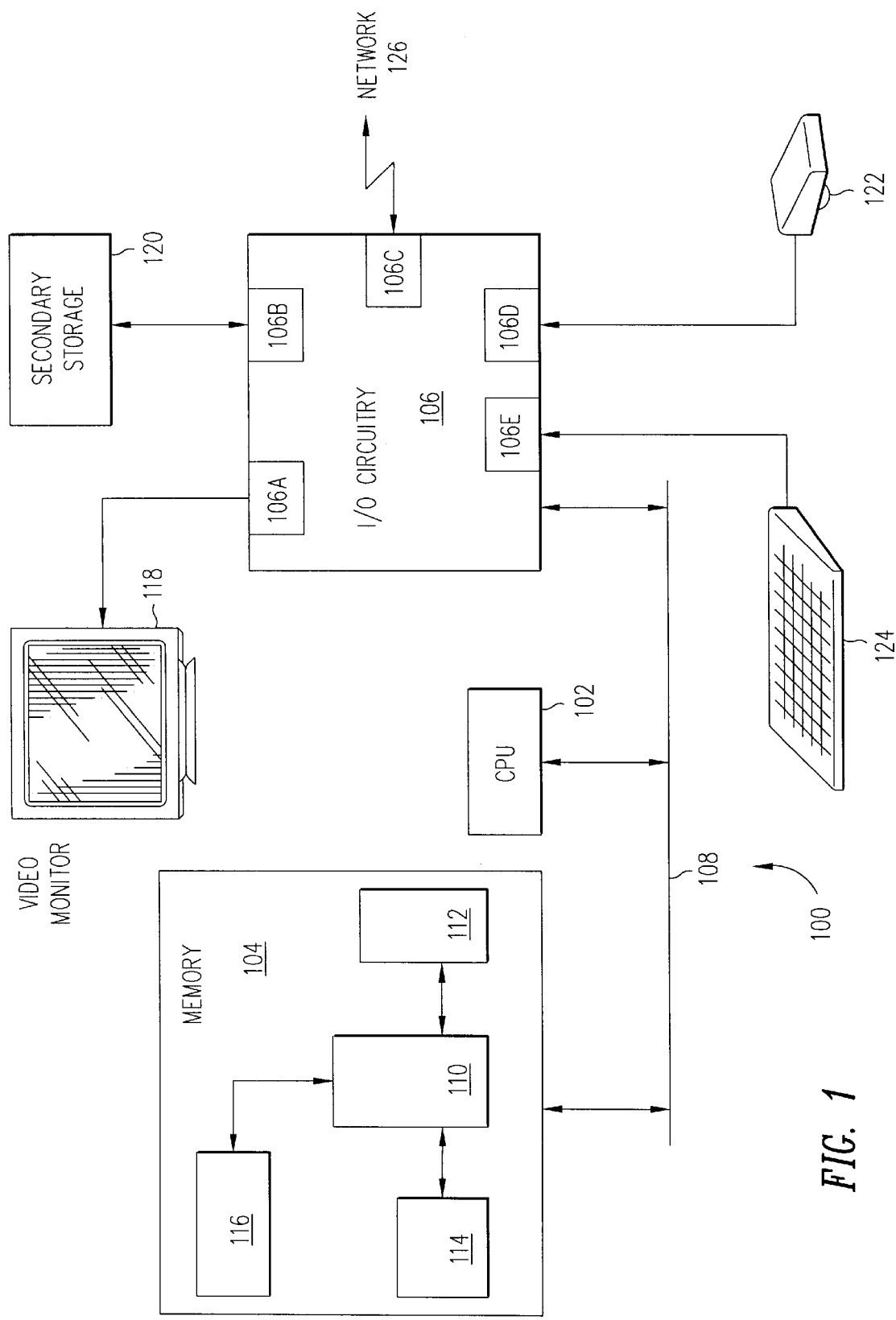
FIG. 1 is a block diagram of a computer.

In accordance with the present invention, errors in a computer program are detected by modelling resources used by the computer program and detecting potential state violations in those resources. A resource is modelled by simulating the behavior of the resource in terms of states of the resource and transitions between those states. Each computer instruction of the computer program is analyzed and the state of the resource is changed according to the effect execution of the computer instruction would have on the resource. State violations, i.e., invalid states and invalid state transitions in the state of the resource, are detected and reported as programming errors. In this way, error detection according to the present invention considers the behavior of a computer process as defined by the computer program, thereby overcoming many of the limitations of static checkers of the prior art.

Each resource has a prescribed behavior which can be described in terms of valid states and valid transitions between those states. A common source of errors in computer programs is the failure of the developer of the computer program to observe the prescribed behavior of a resource. When a computer instruction in the computer program directs a computer to use the resource in violation of the prescribed behavior of the resource, a state violation occurs. An example of a state violation is the reading of a record from a file after the file has been closed when the prescribed behavior of the file dictates that the file must be open to be read.

A computer 100 (FIG. 1) includes a central processing unit (CPU) 102, memory 104, and input/output circuitry (I/O circuitry) 106, all of which are interconnected through a bus 108. Memory 104 can include any type of memory, including randomly-accessible memory (RAM), read-only memory (ROM), and secondary storage devices such as magnetic disks. CPU 102 executes from memory 104 a computer process 110, which has access to library functions 112, dynamically allocated memory 114, and a second computer process 116. I/O circuitry 106 includes drivers 106A, 106B, 106C, 106D, and 106E, which drive a video monitor 118, secondary storage 120, a network 126, a locator device such as a mouse 122, and a keyboard 124.

As used herein, a resource is a part of a computer system which is used by a computer process and which generally must be allocated before being used and generally must be deallocated, i.e., freed, after being used. Examples of resources include global memory, files, windows, menus, and dialogs. Resources of computer process 110 include, for example, dynamically allocated memory 114, computer process 116, and magnetic disk 120.

As used herein, a computer process is a series of steps carried out by a computer. A computer program is a series of instructions which can be carried out by a computer. It should be understood that the instructions of a computer program define the steps which, when carried out by a computer, form a computer process. Thus, to model the behavior of computer process 110, the computer program defining computer process 110 is analyzed.

Analyzing at the Function Level

Computer programs are typically a combination of previously developed components and newly developed code. As used herein, "code" refers to source code, i.e., computer instructions in human intelligible form, and/or object code, i.e., computer instructions in computer intelligible form. A component of a computer program is a collection of computer instructions and/or data structures which are previously developed to perform a specified process fragment and which have typically been tested to ensure that the process fragment is performed faithfully by the component. A process fragment is one or more of the steps of a computer process, i.e., is a fragment of the computer process. A developer of a computer program uses such components to perform the specified process fragments and typically trusts that the components, when executed, perform as specified. Such components can include invocations of execution of, i.e., calls to, components previously developed by the developer or components acquired commercially. Thus, redundancy in developing a computer program is avoided.

A new computer program is typically developed by combining previously developed components and interconnecting those components using newly written computer instructions. The result of such combining and interconnecting can be either a new computer program or a new component that can be used by other components or computer programs. A component of a computer program defines a process fragment of the computer process defined by the computer program. Each process fragment of a computer process can alter the state of a resource used by the computer process. Thus, to properly analyze the state and state transitions of a resource used by a computer process, the effect on the state of the resource resulting from execution of the process fragment as defined by the component of the computer program must be ascertained. As an example, properly analyzing the use of a resource, which is allocated in a first process fragment defined by a first component, used in a second process fragment defined by a second component, and deallocated in a third process fragment defined by a third component, requires analysis of the effect of each of the first, second and third process fragments on the resource.

Computer programs can be written in any of a number of computer languages. Traditional computer languages are procedural in that the computer instructions of a computer program are organized into components, sometimes called procedures or "functions", each of which is designed to carry out a particular process fragment when executed. Examples of procedural languages include C, Ada, Pascal, Fortran, and Basic. Some procedural languages are object-oriented, such as C++ and SmallTalk. In object-oriented computer languages, functions and data structures are combined into objects which are in turn organized into components known as "classes".

Some computer languages are graphics-based in that instructions are represented as graphical images which are displayed on a computer screen and which are linked by a programmer to form a computer program. For example, Microsoft Visual Basic, which is available from Microsoft Corporation of Redmond, Wash., is such a graphics-based computer language. Some computer languages are specific to a particular software product such as the Microsoft Word Basic computer language for the Microsoft Word word processor available from Microsoft Corporation or the Lotus 1-2-3 macro language for the Lotus 1-2-3 Spreadsheet product available from Lotus Development Corporation of Cambridge, Mass. The present invention is applicable to any computer language, i.e., to any computer instruction protocol, in which resources are used. While source code computer instruction protocols are described above, it is appreciated that the teachings herein are equally applicable to computer instructions in the form of object code. In the illustrative embodiment described herein, the particular computer language analyzed is the well-known C computer language as described in the C Standard.

Computer programs written in the C computer language are typically divided into a number of functions. A function, when executed, accepts as input zero or more parameters and produces as output one returned item or no returned item. The parameters and the returned item are data structures which are stored in memory, such as memory 104, and which include data accessible by the function. An illustrative example of a function defined in the C computer language is given below in computer code excerpt (1).

In the illustrative embodiment described herein, each function of a computer program is analyzed individually. A function is analyzed by modelling changes to and uses of the resources, externals and items of the function effected by the computer instructions of the function. An item of a function represents a location in memory, such as memory 104, that is accessible by the function. An item has a type and a value. Types of items supported in one embodiment of the present invention include integer, floating point, and pointer data. The value of an item is the value represented by the particular data stored in the location of memory represented by the item. An external and a resource can be associated with each item of a function. Items are described more completely below. A variable is an association between an identifier and one or more items.

An external of a function represents a part of a computer process which exists outside of the context of the function, i.e., before execution of the function begins or after execution of the function terminates. Examples of externals of a function include the parameters and returned item of the function, globally defined variables, and static variables. The terms (i) "globally defined variables" and (ii) "static variables" are used herein to describe, respectively, (i) variables with "extern" linkage and (ii) variables with "intern" linkage and "static" storage duration. "Locally-defined variables" are variables with "intern" linkage and "automatic" storage duration. Linkage is discussed in the C Standard at Section 6.1.2.2, and storage duration is discussed in the C Standard at Section 6.1.2.4. Briefly, a globally-defined variable is defined for all process fragments of a computer process, and a static variable is; defined for a number of process fragments, but not necessarily all process fragments, of a computer process.

Each process fragment uses a number of resources. For example, function 202 (FIG. 2) of process 110 (FIG. 1) uses dynamically allocated memory 114, and computer process 116. Function 202 (FIG. 2) also uses (i) globally defined memory 204, which is also accessible by functions 202A and 202B and other functions, (ii) local memory, (iii) parameters 208A–208C, and (iv) returned item 210. Function 202 is analyzed by modelling one or more of these resources.

Each resource and external has a state. Execution of each computer instruction of a function is emulated, modelling any changes in the state of any externals or resources of the function which would result from actual execution of the computer instruction. If the state of an external or resource is changed, the state change is compared to a corresponding external behavior model or resource behavior model, respectively, to determine whether the change in state reflects appropriate use of the external or resource, respectively. If the state change is inappropriate, a state violation occurs and an error is reported. The error can be reported to the user (i) by displaying an error message on video monitor 118 (FIG. 1) or similar output device, (ii) by recording an error message in an error log file in memory 104 or in secondary storage 120, or (iii) by both displaying an error message and recording an error message.

Behavior Models

A function model represents the abstraction of a function in terms of operations applied by the function to the externals of the function and any new resources the function allocates.

Figure 3A:
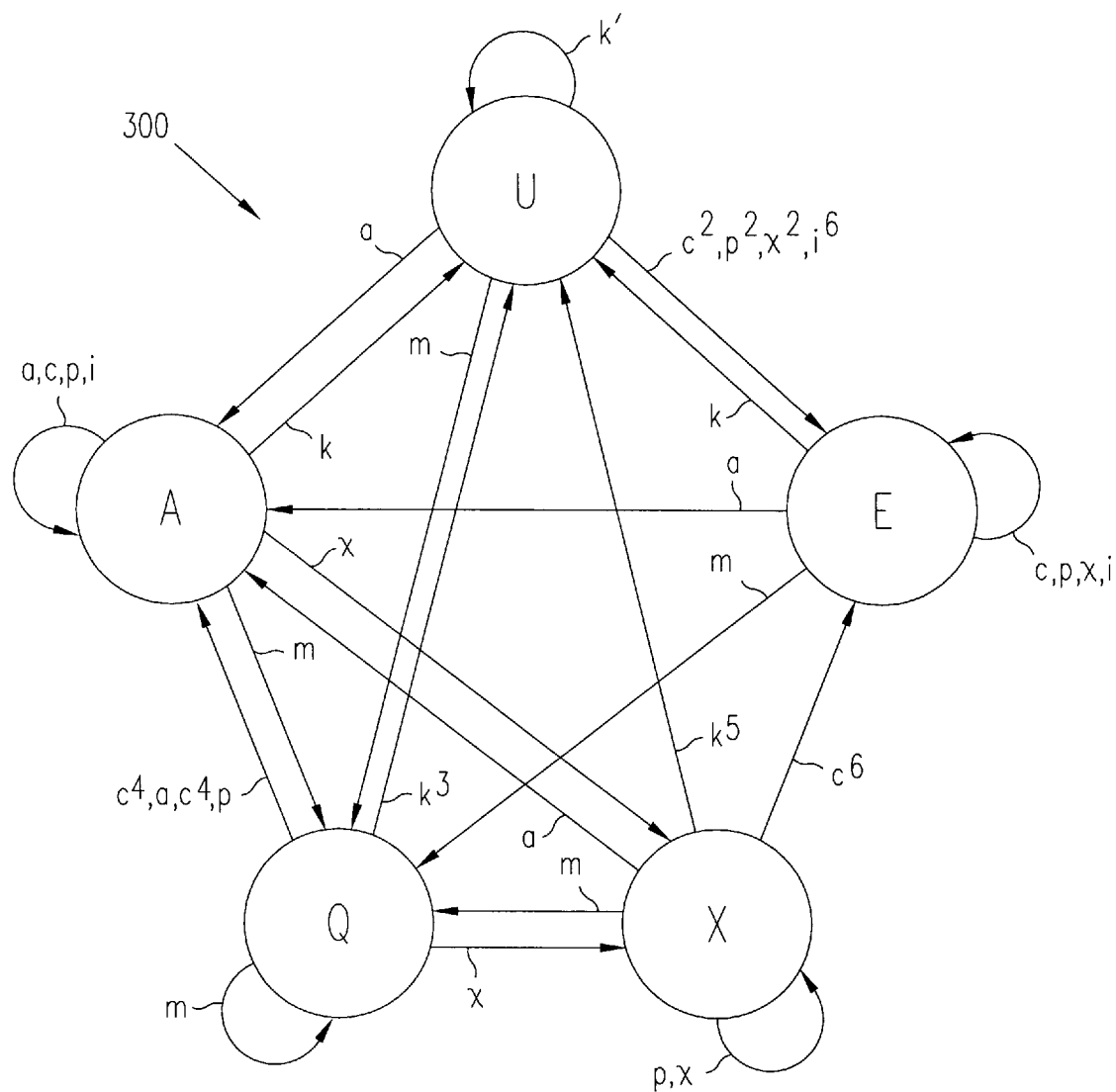
FIGS. 3A and 3B are state diagrams representing the modelling of a resource according to one embodiment of the present invention.

As described above, a resource has a state. The valid states and valid transitions between states of a resource is represented by a resource behavior model. The modelling of the behavior of a resource can be substantially simpler than the actual behavior of the resource. For example, the state of a resource is modelled according to a resource behavior model represented by state diagram 300 (FIG. 3A). According to state diagram 300, a resource can have any of the following states.

TABLE A

| |
|---|
| U = Unallocated |
| A = Allocated |
| Q = Questionably allocated |
| X = Invalid ("NULL") |
| E = Error or unknown state |

States U and X are similar but distinct: an item associated with an unallocated resource has an indeterminate value, and an item associated with an invalid resource has a known, invalid value. A resource behavior model can be as complex as the actual behavior of the resource whose behavior is modelled. However, even substantially simplified resource behavior models such as that represented in state diagram 300 are effective in detecting a substantial majority of all possible errors in the use of such a resource.

Resources are initially in state U since a resource is initially unallocated. Emulated execution of each computer instruction, actual execution of which causes a change in the state of a resource, applies an operation to the resource. By application of an operation to a resource, the state of the resource changes according to state diagram 300. The following are the operations which can be applied to a resource.

TABLE B

| |
|---|
| a = definitely allocates |
| m = maybe allocates |
| k = kills, i.e., frees or deallocates |
| c = uses in a calculation |
| p = uses in a predicate |
| i = uses in an indirection |
| x = mark invalid |

Thus, according to state diagram 300, if an unallocated resource, i.e., a resource in state U, is definitely allocated by an instruction in a function, thereby applying operation a, the resource is then in state A, i.e., allocated. However, if an unallocated resource, i.e, in state U, is used in a calculation, thereby applying operation c, the resource is then in state E. State E indicates that a state violation has occurred as a result of a programming error. State E is optional in that state E does not describe the prescribed behavior of a resource, but is used in the disclosed embodiment as a convenient way to represent a state violation. In an alternative embodiment, state E is omitted and a violation is detected in the above example by noting that, when a resource is in state U, operation c is undefined.

State diagram 300 (FIG. 3A) is summarized in Table C below.

TABLE C

New States Resulting from Operations

| operation: | a | m | k | c | p | i | x |
|---|---|---|---|---|---|---|---|
| old state: | | | | | | | |
| U: | A | Q | $U^1$ | $E^2$ | $E^2$ | $E^6$ | $E^2$ |
| A: | A | Q | U | A | A | A | X |
| Q: | A | Q | $U^3$ | $A^4$ | A | $A^4$ | X |
| X: | A | Q | $U^5$ | $E^6$ | X | $E^6$ | X |
| E: | A | Q | U | E | E | E | E |

Superscript numerals corresponding to operation identifiers in state diagram 300 and to new state identifiers in Table C indicate specific errors. The errors are listed in Table D.

TABLE D

1 - Freeing an unallocated or freed resource.
2 - Using an unallocated or freed resource.
3 - Freeing potentially-allocated data without checking.
4 - Using potentially-allocated data without checking.
5 - Freeing NULL data.
6 - Using (e.g., dereferencing) NULL data.

In the example given above, applying operation c to a resource in state U places the resource in state E as indicated in state diagram 300 by an arrow from state U to state E identified by "$c^2$". Thus, the error in this example is error number 2 in Table D, namely, the use of an unallocated resource.

Each function model specifies which operations are applied to each external of a corresponding function. For example, function fopen ( ), which is defined for the C computer language and which is described in the C Standard at Section 7.9.5.3, defines two parameters, the first of which is accepted as input and which specifies a file to be opened, and defines a returned item which is a file pointer corresponding to the opened file. File pointers, i.e., pointers to items of the type "FILE", are well-known and are described in the C Standard at Section 7.9.1. The file pointer is an external of function fopen ( ) and the file specified by the parameter is the resource associated with the external. The function model for function fopen ( ) specifies that a new resource whose initial state is state Q is created. The initial state of the resource is state Q rather than state A because function fopen ( ) does not guarantee that the file is opened successfully.

Function fclose ( ), which is defined for the C computer language and which is described in the C Standard at Section 7.9.5.1, defines a parameter which is a file pointer. Execution of function fclose ( ) closes the file to whose file descriptor the parameter points. The function model for function fclose ( ) specifies that an operation k is applied to the parameter to reflect closing, and thus deallocating, the associated file. Similarly, function models for functions of the C computer language defining read and write operations to the file specify application of an operation c to a resource representing the file to reflect use of the file.

If an item corresponding to a resource, e.g., the file pointer which is the returned item of function fopen ( ), is used as a predicate in a decision instruction, operation p is applied to the resource to thereby change the state of the resource according to state diagram 300. An item is used in a predicate if the item appears as an operand in a relational expression (e.g., an operation involving any of operators >, <, <=, >=, and !=) or a boolean expression (e.g., an operation involving any of operators &&, |, and !) or if the item is used as the control expression in a "switch" statement. The "switch" statement is defined for the C computer language and controls flow of a function according to the value of the control expression. The "switch" statement is described more completely in the C Standard at Section 6.6.4.2.

If an item corresponding to a resource is used in a calculation, operation c is applied to the resource to thereby change the state of the resource according to state diagram 300. An item is used in a calculation (i) if the item appears as an operand to a mathematical operation (e.g., +, /, *, or -), (ii) if the resource appears as a dereference of a pointer or as an access into an array, or (iii) if the resource appears as an array index.

Pointers and arrays are well-known and are described in the C Standard. For completeness, pointers and arrays are briefly described herein. In the context of the C computer language, a pointer is an item whose value is the address in memory of another item. Thus, a pointer "points" to the other item. Dereferencing a pointer is retrieving the item to which the pointer points.

Data structures, which are used to implement the disclosed embodiment of the present invention and which are described below in greater detail, are described as including pointers to other data structures. It is appreciated that mechanisms other than pointers are known for uniquely identifying a data structure and that these mechanisms can be substituted for pointers without deviating from the principles of the present invention.

An array is a collection of one or more items of similar structure. The items of an array are called elements and are numbered sequentially. An access to an array is an access to an element of the array by reference to the number of the element, i.e., the index of the element.

Operation x is applied to a resource corresponding to an item which is assumed to be NULL. NULL is generally an invalid value and is assigned to an item to indicate that the item has no valid value. For example, a pointer whose value is NULL points to no item. In the context of the C computer language, NULL is also a boolean value of "false". An item is assumed to be NULL, i.e., to have a value of NULL, if the item is compared to NULL and the result of the comparison is assumed to be true. As described more completely below, analysis of a function requires that assumptions be made regarding the particular behavior of the function when executed. For example, function fopen ( ) either successfully opens a file or fails to do so. If the returned item, i.e., the file pointer, is compared to NULL and the result is assumed to be true, i.e., if function fopen ( ) is assumed to have failed, operation x is applied to the resource representing the file as described more completely below.

Illustrative Examples of the Basic Principles of the Present Invention

The utility of the modelling of resources is described by way of example. The following source code excerpt (1) includes a programming error which is detected by the disclosed embodiment of the present invention. Source code excerpt (1) comports with the known C computer language and defines a function example_1( ). Line numbers, which are not part of the C computer language, are added for clarity in the discussion below.

```
1.  #include <stdio.h>                                        (1)
2
3   #define MAX_STR_LEN 100
4   #define FALSE 0
5   #define TRUE 1
6
7   int example_1(input_file_name)    /* begin function */
8   char *input_file_name;            /* parameter to function */
9   {
10      char *str;      /* Declaration of local variable "str" */
11      FILE *fptr;     /* Declaration of local variable "fptr" */
12
13      /* try to open a file */
14      fptr = fopen(input_file_name, "r");
15      if (fptr == NULL)
16          {
17          /* could not open the file */
18          fprintf(stderr, "Could not open file %s\n",
19                  input_file_name);
20          return FALSE;            /* an error */
21          }
22      /* allocate some memory for a string buffer */
23      str = (char *)malloc(MAX_STR_LEN);
24      /* get some input from the file */
25      fgets(str, MAX_STR_LEN - 1, fptr);
26      /* print out the information */
27      printf(str);
28      /* clean up */
29      free(str);
30      fclose(fptr);
31      return TRUE;                 /* no error */
32  }
```

As function example_1( ) is analyzed, the state of each item, including each external, is tracked. Variable "str" is locally-defined, i.e., is defined only in the context of function example_1( ). Variable "str" is a pointer to data whose type is "char" as defined in line 10. However, variable "str" is initially uninitialized and points to no specific data. Therefore, variable "str" is not associated with a resource.

Execution of function malloc ( ), which is defined for the C computer language and which is described in the C Standard at Section 7.10.3.3, accepts a request for allocated memory, e.g., memory 104 (FIG. 1), and either allocates the memory or fails to do so. Function malloc ( ) returns, as the returned item, a pointer to the allocated memory if the memory is successfully allocated or a NULL pointer otherwise. Therefore, function malloc ( ) creates a new resource whose initial state is state Q and associates the new resource with the returned item of function malloc ( ). After variable "str" is assigned the value of the returned item of function malloc ( ) at line 23, variable "str" points to newly allocated memory if such memory is allocated or is a NULL pointer otherwise.

At line 25 of source code excerpt (1), variable "str" is used as a parameter in function fgets ( ), which is defined for the C computer language and which is described in the C Standard at Section 7.9.7.2. Execution of function fgets ( ) dereferences the first parameter, which is variable "str" in the context of line 25 of source code excerpt (1). Therefore, operation i is applied to the resource associated with variable "str". As shown in state diagram 300 (FIG. 3A) and Tables C and D, application of operation i to a resource in state Q places the resource in state A, producing an error message indicating that potentially allocated data is used without checking.

At line 29 of source code excerpt (1), variable "str" is passed as a parameter to function free ( ), which frees, i.e., deallocates, the memory to which variable "str" points. Therefore, operation k is applied to the resource associated with variable "str". As shown in state diagram 300 and Tables C and D, application of operation k to a resource in state A places the resource in state U. Since deallocation of an allocated resource is proper, no error is reported.

Text (2) below illustrates the error messages produced by the disclosed embodiment of the present invention in analyzing function example_1( ) of source code excerpt (1).

example_1.c: In function 'example_1':                        (2)

example_1.c:25: warning: (6): dereferencing invalid data
  (argument 0)

In text (2), "example_1.c" refers to a file containing source code excerpt (1) above, and thus defining function example_1( ). Thus, function example_1( ) fails to account for the contingency that there may be insufficient memory to allocate the amount of memory requested in calling, i.e., invoking execution of, function malloc ( ) at line 23 of source code excerpt (1). If function malloc ( ) fails to allocate the requested memory during execution of function example_1( ), the computer process in which function example_1( ) is executed aborts abruptly without giving to a user an indication of the reason for the unexpected termination of processing. However, detecting and reporting the failure to account for such a contingency using, for example, Text (2) above provides the developer of function example_1( ) with the necessary information to correct the defect in function example_1( ) and to properly provide for such a contingency.

The utility of the present invention is further illustrated by considering the tracking of the state of file pointer "fptr" in function example_1( ) of source code excerpt (1). File pointer "fptr" is a locally-defined variable of function example_1( ). File pointer "fptr" is a pointer to data of the type "FILE". Initially, file pointer "fptr" is uninitialized and is not associated with any resource.

The returned item of function fopen ( ) is assigned to file pointer "fptr" at line 14. As described above, function fopen ( ) creates a new resource, whose initial state is state Q, and associates the new resource with the returned item of function fopen ( ). The "if" statement at line 15 determines whether the file to which file pointer "fptr" points is successfully opened by comparing file pointer "fptr" to NULL. If file pointer "fptr" is NULL, the file is not successfully opened and function example_1( ) terminates after reporting to a user the failure to open the file. Conversely, if file pointer "fptr" is not NULL, the file to which file pointer "fptr" points is known to be successfully opened and function example_1( ) continues at line 22. The comparison of file pointer "fptr" in line 15 applies operation p to the resource associated with file pointer "fptr". Thus, the state of the resource associated with file pointer "fptr" is changed from state Q to state A. As a result, any uses of file pointer "fptr", either in calculation (applying operation c) or in a predicate (applying operation p) do not produce any error messages as shown in state diagram 300 and Table C. Therefore, no errors with respect to the treatment of file pointer "fptr" are detected.

Figure 2:
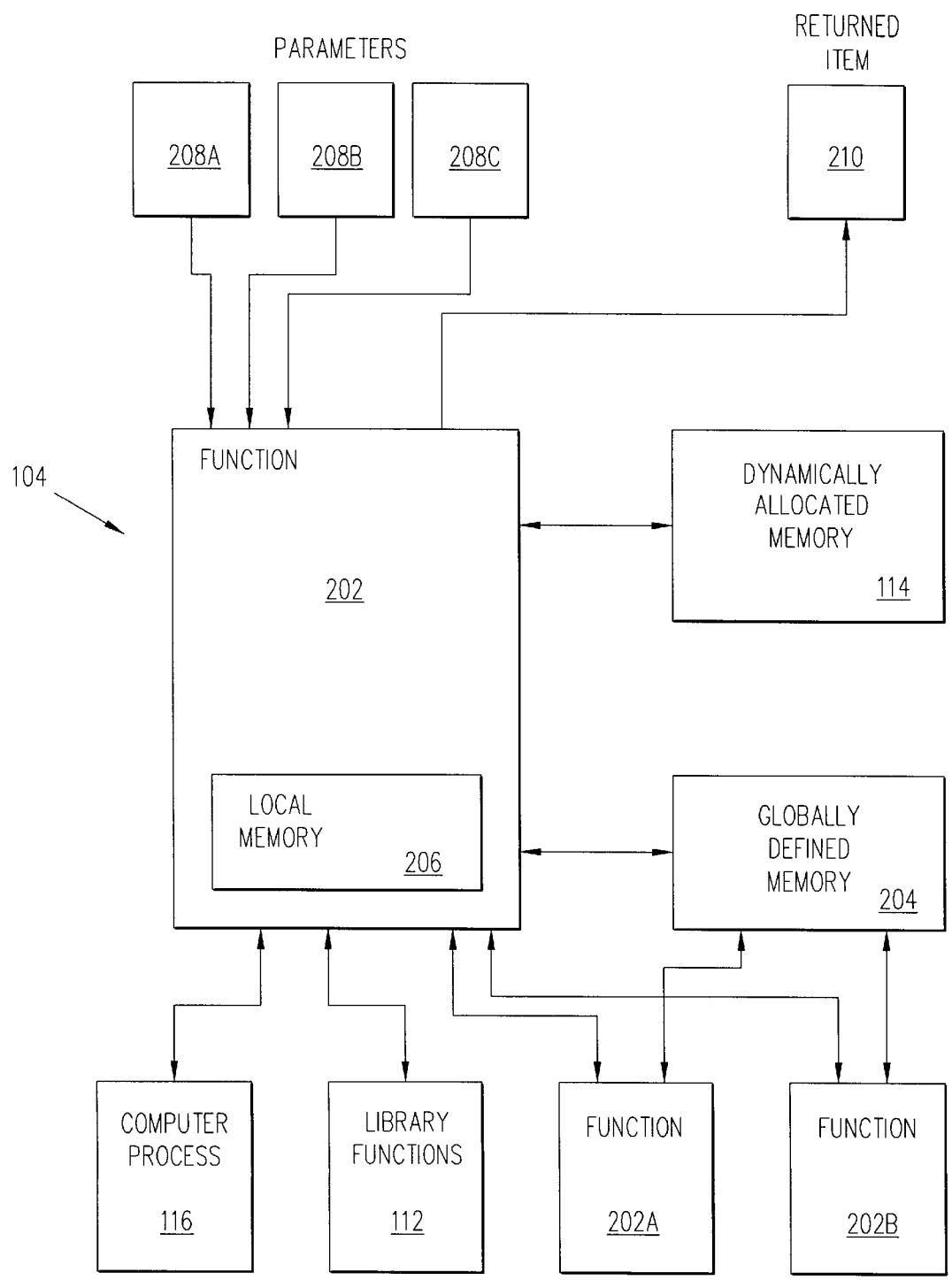
FIG. 2 is a block diagram of a computer process component, resources of the component, and other components.

As described above, functions fopen ( ) and malloc ( ), when executed, perform specific processing on resources of parameters and returned items. Functions such as functions fopen ( ) and malloc ( ) are included in library functions 112 (FIG. 1) which are accessed by computer process 110. Calls to such functions are included in function 202 (FIG. 2). As used herein, a "call" to a function is a statement which, when executed, causes a processor, such as CPU 102 (FIG. 1), to (i) supply zero or more items as parameters to the function, (ii) execute the function, and (iii) produce a returned item representing the value to which the function evaluates if a returned item is defined by the function. A first function, which includes a call to a second function, is called a "calling function". The second function is called a "called function." To properly analyze resources of function 202 (FIG. 2) affected by execution of functions called by statements of function 202, function models describing the behavior of such called functions are maintained. In one embodiment, such function models are created from well-known textual descriptions of the behavior of such functions, e.g., from the C Standard, and those function models are stored in memory 104 of computer 100. Those function models are then retrieved from memory 104 prior to analyzing a computer program as described more completely below.

The following are illustrative examples of function models of some of the functions called by function example_1( ) of source code excerpt (1) above. All of the called functions are from the C standard library's "stdio" (input/output) header file which is a well-known file for use with the C computer language and which is described in the C Standard in Sections 7.9 et seq.

```
(malloc                           /* model for function malloc( ) */   (3)
    (retval (new Q "memory"))  / returned item:
                                 creates a new, possibly
                                 allocated resource */
    ((param 0) (op c))         /* parameter 0: used in
                                 a computation */   )
```

A function model structure, which represents in memory 104 (FIG. 1) a function model according to the disclosed embodiment of the present invention, is described more completely below. Function model (3) defines the effect of execution of function malloc ( ) on the respective states of the externals of function malloc ( ). According to function model (3), a new resource is created, initialized to state Q, and associated with the returned item of function malloc ( ). Function model (3) also specifies that operation c is applied to parameter 0, i.e., the first parameter, of function malloc ( ).

```
(free                        /* model for function free( ) */   (4)
    ((param 0) (op k)))      /* parameter 0: free (kill) */
```

Function model (4) represents the effect of execution of function free ( ) on the externals of function free ( ) and specifies that: operation k is applied to parameter 0, i.e., the first parameter in the argument list.

```
(fgets                      /* model for function fgets( ) */   (5)
    ((param 0) (op i))      /* parameter 0 (string
                              buffer): apply operation i,
                              indirection */
    ((param 1) (op c))      /* parameter 1 (buffer
                              length): use in computation
                              (op c) */
    ((param 2) (op i))      /* parameter 2 (the file):
                              indirection (op i — file must
                              be open) */
}
```

Function model (5) specifies that (i) operation i is applied to parameter 0, i.e., the first parameter, (ii) operation c is applied to parameter 1, i.e., the second parameter, and (iii) operation i is applied to parameter 2, i.e., the third parameter, by calling function fgets ( ).

Detection of Resource Leaks

By modelling resources and tracking associations of resources with externals of a function, the disclosed error detection mechanism provides a convenient mechanism for detecting resource leaks. A resource is "leaked" by a function when execution of the function terminates, leaving the resource in an allocated state, when the resource cannot be accessed by any external of the function. When a resource is leaked, the resource cannot be used since no pointer to the resource remains after execution of the leaking function terminates. If the resource is reusable, such as dynamically allocated memory 114 (FIG. 1), failure to free the resource prior to termination of execution of the function prevents other functions from reusing the resource. A process fragment which repeatedly leaks dynamically allocated memory can ultimately cause exhaustion of all memory which is available to the computer process of which the process fragment is a part.

As an example of detection of a resource leak, function example_2( ) of source code excerpt (6) is considered.

```
 0  #include <stdio.h>                                         (6)
 1  #include <string.h>
 2
 3  #define MAX_STR_LEN 100
 4  #define FALSE 0
 5  #define TRUE 1
 6
 7  char *example_2(input_file_name) /* begin function */
 8  char *input_file_name; /* parameter to the function */
 9  {
10  char *str;     /* declare local variable "str" */
11  FILE *fptr;    /* declare local variable "fptr" */
12
13  /* allocate some memory for a string buffer */
14  str = (char *)malloc(MAX_STR_LEN);
15  /* check to ensure that the allocation succeeded */
16  if (str == NULL)
17       return NULL;
18  /* try to open a file */
19  fptr = fopen(input_file_name, "r");
20  if (fptr == NULL)
21       {
22       /* could not open the file */
23       fprintf(stderr, "Could not open file %s\n",
24            input_file_name);
25       return NULL;    /* error condition */
26       }
27  fgets(str, MAX_STR_LEN − 1, fptr);
28  fclose(fptr);   /* close file */
29  return str; /* no error */
30  }
```

Variable "str" is local to function example_2( ) and is therefore not accessible to any function other than function example_2( ). Since the memory to which variable "str" points is not freed prior to instruction "return" of line 25 of source code excerpt (6), that memory is not useable and cannot be deallocated or reallocated until computer process 110, which function example_2( ) partly defines, terminates. That resource therefore "leaks" from computer process 110.

Since an external of a function is an item which exists past the termination of execution of the function, any allocated resource reachable through an external is not leaked. A resource which is not associated with a particular external can, in some circumstances, be reachable through the external. For example, a resource which is associated with a particular element of an array of items is reachable through an external which is a different element of the array of items. This is true since the location in memory of an element of an array can be calculated from the location of any other element of the array according to the C computer language.

Leaks are checked at the conclusion of a traversal of a function. The detection of leaks is described more completely below and is summarized briefly here. All resources reachable through any external are marked. Any resource which is not marked and which is allocated is reported as leaked. Since variable "str", at line 25, is not returned, variable "str" is not an external. The memory pointed to by variable "str" is therefore allocated and not marked at the conclusion of the traversal of function example_2( ). The memory pointed to by variable "str" is therefore leaked.

Analysis of function example_2( ) produces the following error message.

example_2.c: In function 'example-2': (7)

example_2.c:25: warning: (15): leaking resources allocated on line 14

Static checkers of the prior art cannot detect resource leaks. Run-time checkers of the prior art often do not consider all potential events which might cause a function to leak a resource and generally cannot analyze a single function outside of the context of a larger computer program to detect resource leaks in that single function. In contrast, the disclosed embodiment of the present invention provides for efficient detection of resource leaks by analysis of a single function of a larger computer program. As described more completely below, the disclosed error detection mechanism considers all possible events which might cause a function to leak a resource. The present invention therefore represents a significant improvement over the prior art.

Composite States of Externals

As described more completely below, a function is analyzed by following the flow of control of the function, emulating execution of individual statements of the function, and tracking the state of externals and resources. The flow of control through a function is the particular sequence of computer instructions of the function executed during a particular execution of the function. When control transfers from a first computer instruction to a second computer instruction, the second computer instruction is executed following execution of the first computer instruction. The flow of control through a function is sometimes called herein the control flow path through the function. Flow of control through a function is often dependent upon particular events which occur during execution of the process fragment, defined by the function, in a computer process.

In analyzing a function, it is preferred to consider all possible control flow paths through the function. It is therefore preferred to consider all events which can influence the control flow path through the function. Static checkers of the prior art often do not consider control flow paths at all. Run-time checkers only consider all control flow paths through a particular function to the extent a user can coerce, through manipulation of the events which influence the control flow path of the function, a computer process to follow each possible control flow path during execution of the computer process. In contrast, the disclosed error detection mechanism analyzes each possible control flow path through a function automatically without user intervention. Furthermore, the disclosed error detection mechanism can analyze a function outside of the context of a computer program or computer process which includes the function. Thus, individual functions can be more completely checked for errors prior to inclusion in a larger function or computer program or process.

As an example, function example_2( ) of source code excerpt (6) is considered. The precise control flow path through function example_2( ) is not known until function example_2( ) is executed in a computer process. For example, control flows from the "if" statement at line 16 to a call to function fopen ( ) at line 19 if function malloc ( ), called at line 14, successfully allocates memory as requested. In other words, if function malloc ( ) successfully allocates memory as requested when called at line 14, the call to function fopen ( ) at line 19 follows execution of the "if" statement at line 16. Conversely, control flows from the "if" statement at line 16 to the "return" statement at line 17 if the allocation of memory fails. Whether memory is successfully allocated by function malloc ( ) as called at line 14 is typically not known until function example_2( ) is executed in a computer process.

In analyzing function example_2( ), it is preferred that each possible control flow path through function example_2( ) is considered. Multiple control flow paths through a function are considered by multiple traversals of the function under varying assumptions. For example, function example_2( ) is traversed once under the assumption that function malloc ( ), called at line 14, successfully allocates the requested memory and once under the assumption that function malloc ( ) fails to allocate the requested memory.

In one embodiment of the present invention which is described below in greater detail, a function is traversed repeatedly, and, during each traversal, assumptions are made by random chance. Each traversal of function example_2( ) tracks the state of the externals of function example_2( ). Each external has a composite state which reflects the states of the external resulting from multiple traversals of function example_2( ).

Externals have composite RS, CP, and DK states. These composite states are used for the dual purposes of (i) detecting inconsistent uses of an external when varying control flow paths through the function are considered and (ii) building a function model describing the effect of execution of the function on the externals of the function. The function model can then be used to analyze other functions which call the modelled function.

Within the context of a particular function, each external has a CP state, a DK state, and a RS state. The CP state of an external is used to determine whether the external is checked before being used. The term "CP" is derived from the operations of primary concern: operation c, which represents use of the external, before operation p, which represents checking of the external. The DK state of an external is used to determine whether the function allocates and/or frees the external. The term "DK" is derived from the purpose of the DK state: to determine whether a resource is defined ("D") before being killed ("K"), i.e., freed. The RS state of an external is the state of the resource associated with the external if a resource is so associated. The term "RS" is derived from resource ("R") state ("S").

Each external of a function also has a composite CP state, a composite DK state, and a composite RS state reflecting multiple CP, DK, and RS states, respectively, resulting from multiple traversals of the function. After each iterative traversal of a function, a new composite RS state of an external is composed, as described more completely below, from the previous composite RS state of the external and the RS state of the resource associated with the external resulting from the most recent traversal of the function. In a similar fashion, as described more completely below, new composite CP and DK states are composed from previous composite CP and DK states, respectively, and CP and DK states, respectively, resulting from the most recent traversal of the function.

Figure 3B:
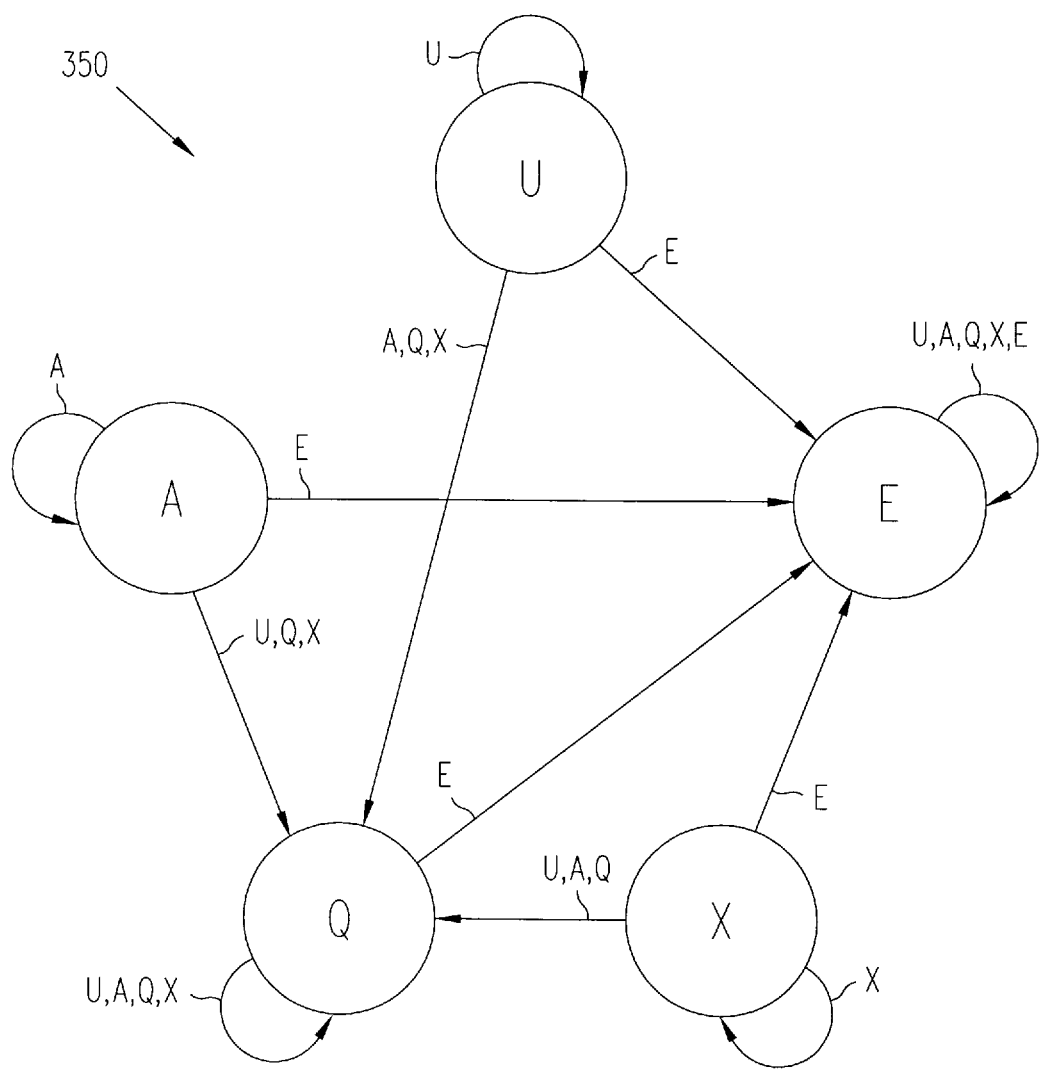

State diagram 350 (FIG. 3B) represents states and state transitions for a composite RS state. Arrows are used in state diagram 350 to represent composite RS state transitions from a previous composite RS state according to an RS state resulting from a traversal of the function. State diagram 350 is summarized in Table E.

TABLE E

| | New Composite RS States | | | | |
|---|---|---|---|---|---|
| next RS state: | U | A | Q | X | E |
| | U: | U | Q | Q | Q | E |
| previous | A: | Q | A | Q | Q | E |
| composite | Q: | Q | Q | Q | Q | E |
| RS state: | X: | Q | Q | Q | X | E |
| | E: | E | E | E | E | E |

State diagram 400 (FIG. 4A) represents states and state transitions for a CP state of an external. Arrows are used in state diagram 400 to represent CP state transitions resulting from application of operations. An external can have any of the following CP or composite CP states.

TABLE G

O = Used in neither a predicate nor a computation (initial state).
C = Used in computation before checking.
I = Used for indirection before checking.
P = Checked (used in predicate) before using.
N = Neither; assigned to before checking or using.

The operations which can be applied to an external are described above with respect to Table B. State diagram 400 is summarized in Table H below.

TABLE H

| | New States Resulting from Operations | | | | | | |
|---|---|---|---|---|---|---|---|
| operation: | a | m | k | c | p | i | x |
| old state: | | | | | | | |
| O: | N | N | C | C | P | I | N |
| C: | C | C | C | C | C | C | C |
| I: | I | I | I | I | I | I | I |
| P: | P | P | P | P | P | P | P |
| N: | N | N | N | N | N | N | N |

State diagram 450 (FIG. 4B) represents states and state transitions for a composite CP state of an external. Arrows are used in state diagram 450 to represent composite CP state transitions from a previous composite CP state according to a CP state resulting from a traversal of the function. State diagram 450 is summarized in Table I below.

TABLE I

| | New Composite CP States | | | | |
|---|---|---|---|---|---|
| next CP state: | O | C | I | P | N |
| | O: | O | C | I | P | N |
| previous | C: | C | C | I | C | C |
| composite | I: | I | I | I | I | I |
| CP state: | P: | P | P | I | P | P |
| | N: | N | C | I | P | N |

Figure 5A:
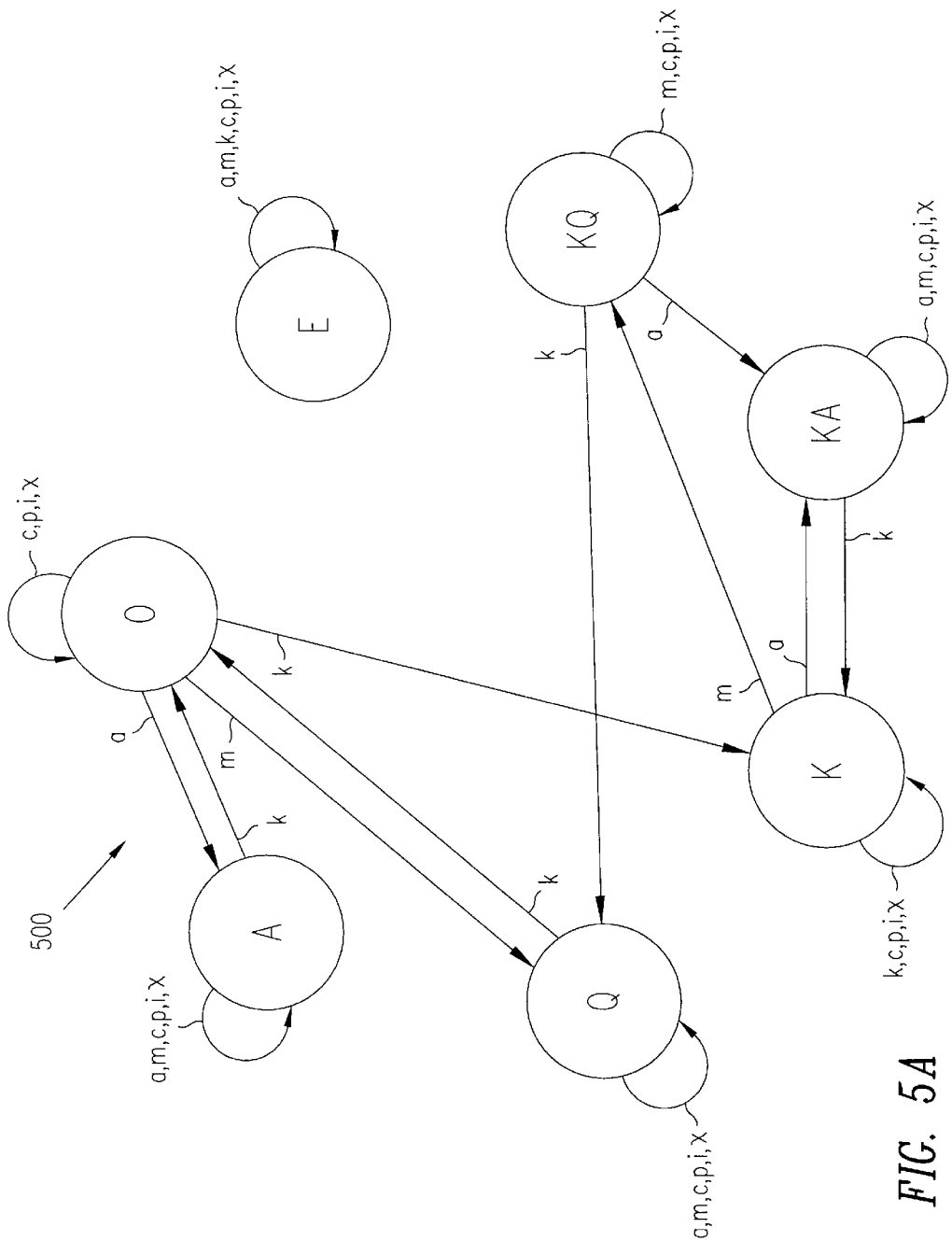

State diagram 500 (FIG. 5A) represents states and state transitions for a DK state of an external. Arrows are used in state diagram 500 to represent DK state transitions resulting from application of operations. An external can have any of the following DK or composite DK states reflecting the effect of execution of the function on a resource associated with the external.

TABLE J

O = The function neither allocates nor kills the resource (initial state).
A = The function definitely allocates the resource.
Q = The function questionably allocates the resource.
K = The function kills, i.e., deallocates, the resource.
KA = The function kills, then definitely allocates, the resource.
KQ = The function kills, then questionably allocates, the resource.
E = Error (unknown state).

The operations which can be applied to an external are described above with respect to Table B. State diagram 500 is summarized in Table K below.

TABLE K

| | New States Resulting from Operations | | | | | | |
|---|---|---|---|---|---|---|---|
| operation: | a | m | k | c | p | i | x |
| old state: | | | | | | | |
| O: | A | Q | K | O | O | O | O |
| A: | A | A | O | A | A | A | A |
| Q: | Q | Q | O | Q | Q | Q | Q |
| K: | KA | KQ | K | K | K | K | K |
| KA: | KA | KA | K | KA | KA | KA | KA |
| KQ: | KA | KQ | K | KQ | KQ | KQ | KQ |
| E: | E | E | E | E | E | E | E |

Figure 5B:
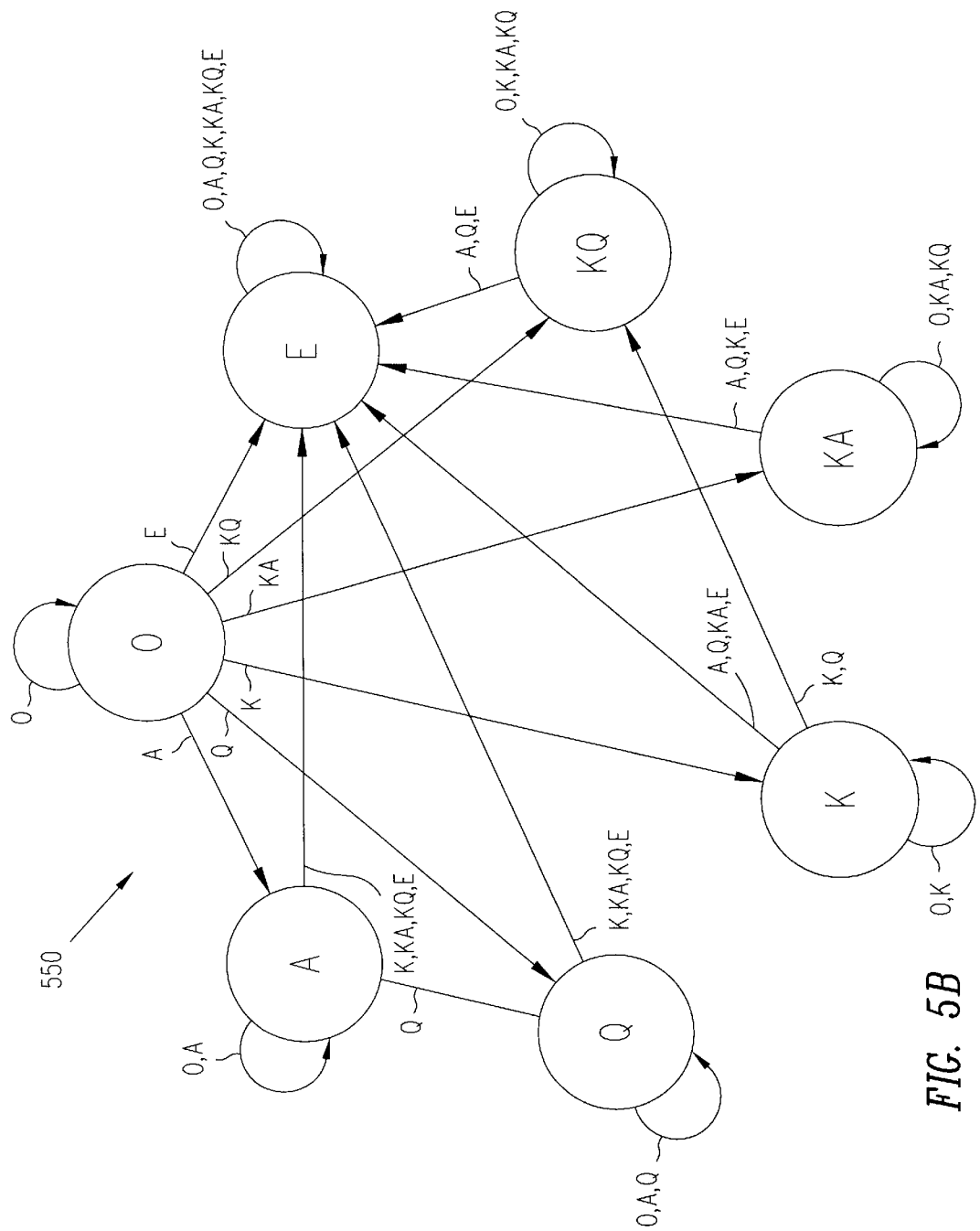

State diagram 550 (FIG. 5B) represents states and state transitions for a composite DK state of an external. Arrows are used in state diagram 550 to represent composite DK state transitions from a previous composite DK state according to a DK state resulting from a traversal of the function. State diagram 550 is summarized in Table L below.

TABLE L

| | New Composite DK States | | | | | | |
|---|---|---|---|---|---|---|---|
| next DK state: | | O | A | Q | K | KA | KQ | E |
| | O: | O | A | Q | K | KA | KQ | E |
| | A: | A | A | Q | E | E | E | E |
| previous | Q: | Q | Q | Q | E | E | E | E |
| composite | K: | K | E | E | K | E | KQ | E |
| DK state: | KA: | KA | E | E | E | KA | KQ | E |

TABLE L-continued

New Composite DK States

| next DK state: | | O | A | Q | K | KA | KQ | E |
|---|---|---|---|---|---|---|---|---|
| | KQ: | KQ | E | E | KQ | KQ | KQ | E |
| | E: | E | E | E | E | E | E | E |

Function example_2( ) of source code excerpt (6) above provides an illustrative example of the utility of composite states of externals.

As described above, flow of control through function example_2( ) can take any of several paths depending on assumptions made with respect to events during an emulated execution of the function. For example, the "if" statement at line 16 can be followed by the "return" statement at line 17, if variable "str" is not NULL, or by the expression on line 19, otherwise. The returned item of function example_2( ) is an external of function example_2( ). The returned item of function example_2( ) is assigned at line 17, line 25, or line 29 of source code excerpt (6) depending only the particular assumptions made during a particular traversal of function example_2( ).

At line 17 or line 25, the returned item has no associated resource. Thus, after a traversal of function example_2( ) in which control transfers through either line 17 or line 25 of source code excerpt (6), the composite RS state of the external representing the returned item is state U. After a subsequent traversal of function example_2( ) in which control transfers through line 29, the external representing the returned item is associated with a resource created within function example_2( ) and is definitely allocated, i.e., in state A. The resource is definitely allocated because lines 16–17 of source code excerpt (6) properly prescribe an action to be taken in the event that execution of function malloc ( ) does not successfully allocate memory.

As shown in state diagram 350 (FIG. 3B), an external, whose previous composite RS state is state U and whose next RS state is state A, has a new composite RS state of state Q. Such reflects the fact that execution of function example_2can allocate, but does not necessarily allocate, memory to which the returned item points. Thus, when forming a function model describing the behavior of function example_2, the returned item of function example_2is described as associated with a newly created resource whose initial state is state Q.

Composite states can also be used to detect inconsistent use of an external by a function. For example, if a function terminates with an external in an allocated state, i.e., a RS state of state A, and, in a subsequent traversal of the function, the function terminates with the same external in a freed state, i.e., a RS state of state K, the composite RS state of the external is in state E. This can be viewed as an error since a calling function generally would not expect the function to allocate a resource associated with an external in one execution and to free a resource associated with the same external in another execution.

Analysis of a Computer Program

A computer program 610 (FIG. 6) is analyzed in accordance with the present invention by a resource checker 602 which analyzes the use of resources prescribed by computer program 610 as described herein. In the disclosed embodiment, resource checker 602 is a computer process executing in CPU 102 from memory 104, which is connected to CPU 102 through bus 108.

Figure 9:
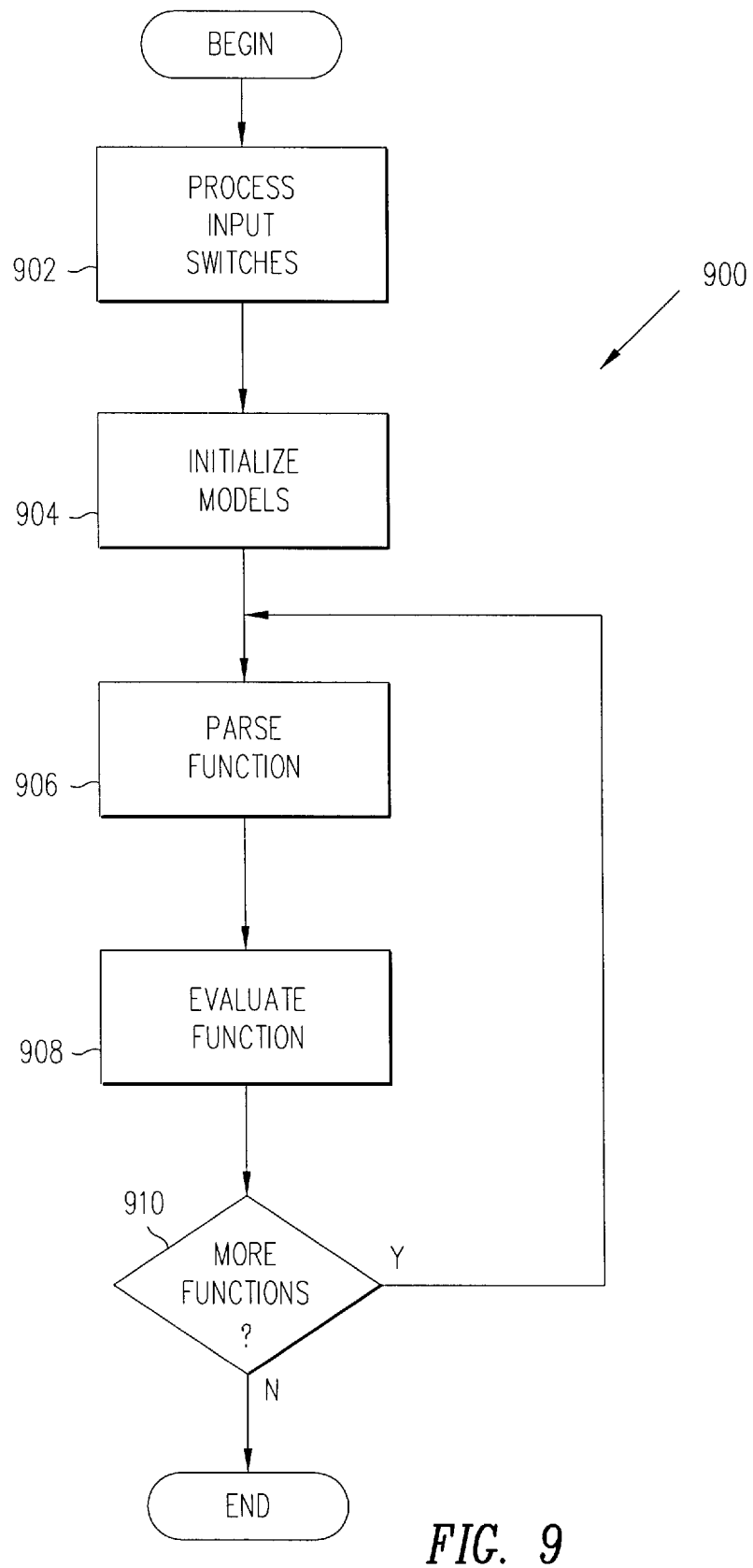
FIG. 9 is a logic flow diagram of the analysis of a computer program in accordance with the present invention.

The analysis of computer program 610 according to the present invention is illustrated by logic flow diagram 900 (FIG. 9). Processing begins in step 902 in which a command entered by a user, e.g., through keyboard 124 (FIG. 1) or mouse 122, initiates analysis of computer program 610 (FIG. 6) and specifies characteristics of the environment in which computer program 610 is analyzed. Characteristics of the environment which can be modified by the user include (i) specific types of errors to detect, (ii) a is maximum number of errors to report, (iii) a maximum number of functions to analyze, (iv) a maximum number of iterative traversals of each function, and (v) the particular technique for traversing all possible control flow paths through a function.

Figure 10:
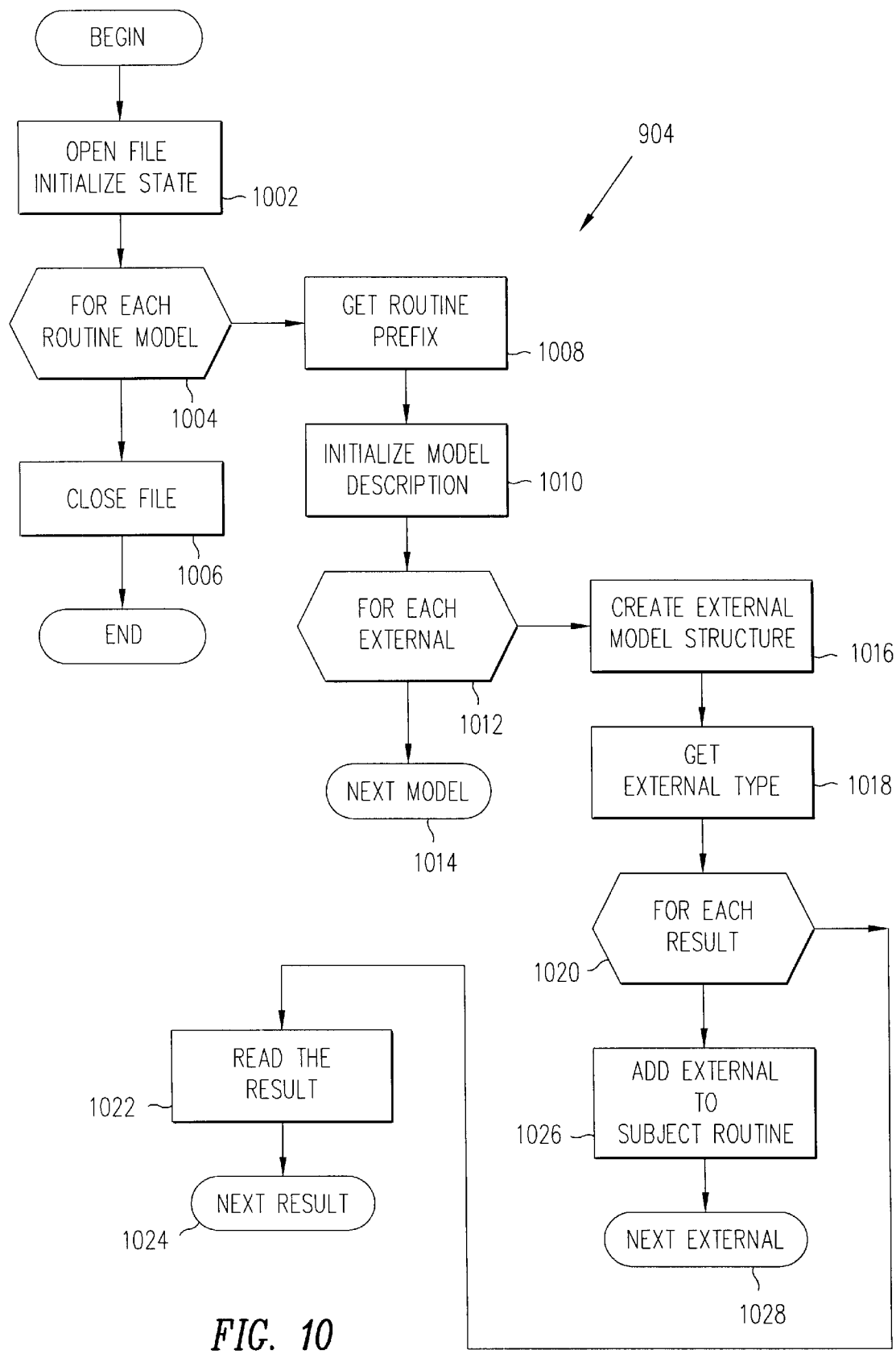
FIG. 10 is a logic flow diagram of the initialization of a model in the logic flow diagram of FIG. 9.

Processing transfers from step 902 (FIG. 9) to step 904 in which resource checker 602 (FIG. 6) initializes function models, which describe the effect on resources of execution of the various functions used by the computer program. Resource checker 602 includes a model parser 702 (FIG. 7) which reads models from a model description file 604 (FIG. 6) and constructs therefrom function model structures which are described more completely below. By creating function model structures within resource checker 602, the function models are initialized. Step 904 (FIG. 9) is described more completely below with respect to logic flow diagram 904 (FIG. 10).

Processing transfers from step 904 (FIG. 9) to step 906, in which a program parser 704 (FIG. 7), which is part of resource checker 602, reads and parses computer program 610 (FIG. 6), using conventional techniques, according to the language to which computer program 610 comports. Program parser 704 (FIG. 7) parses computer program 610 (FIG. 6) into smaller program components, e.g., functions. In step 906 (FIG. 9), a single function is parsed from computer program 610 (FIG. 6) and a function structure, which represents the parsed function is transferred to a dynamic inspection engine 706, which is described more completely below. In an alternative embodiment, a preprocessor, which is described in more detail below, parses computer program 610 and stores a number of function structures representing the parsed functions of computer program 610. In this alternative embodiment, program parser 704 retrieves a single function structure and transfers the function structure to dynamic inspection engine 706. Processing transfers from step 906 (FIG. 9) to step 908.

In step 908, dynamic inspection engine 706 (FIG. 7), which is part of resource checker 602, analyzes the "subject function", i.e., the function represented by the function structure transferred to dynamic inspection engine 706 by program parser 704 in step 906 (FIG. 9). In other words, the effect on the resources used by computer program 610 resulting from the execution of the subject function is determined and the state transitions of each of the resources affected by execution of the subject function are analyzed as described more completely below. The function models initialized in step 904 are used to analyze the states and state transitions of the resources and externals of the subject function. Any detected state violations are reported as programming errors.

Figure 24:
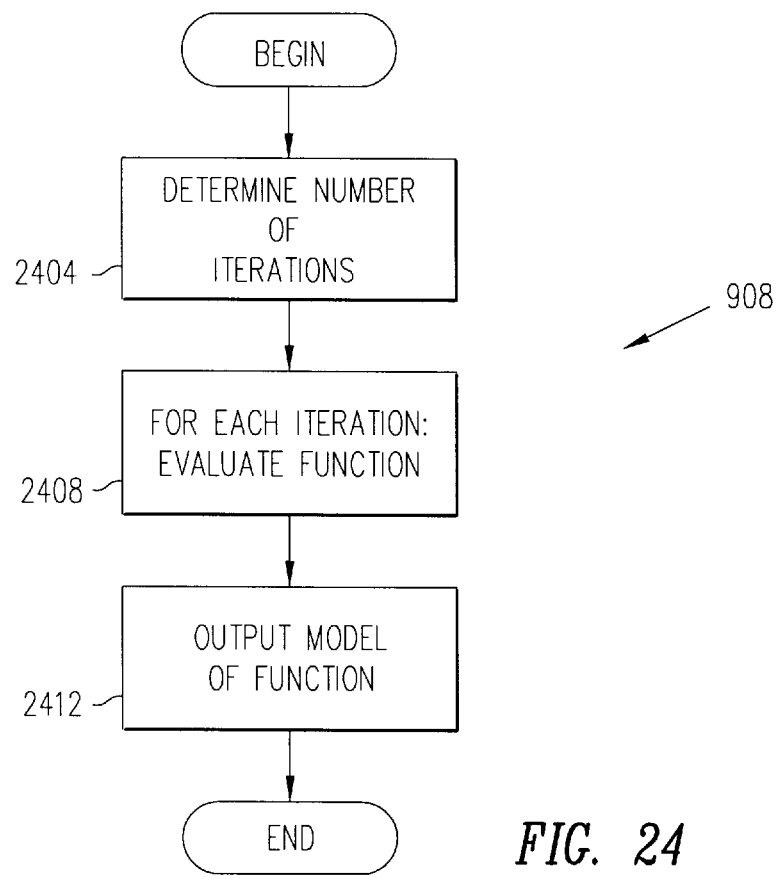
FIG. 24 is a logic flow diagram of the analysis of an individual computer program component according to an embodiment of the present invention.

Once the behavior of the subject function with respect to resources and externals of the subject function is determined, model parser 702 forms and stores in model description file 604 a function model describing the behavior of the subject function. Step 908 (FIG. 9) is described more completely below with respect to logic flow diagram 908 (FIG. 24).

Processing transfers from step 908 (FIG. 9) to test step 910 in which program parser 704 (FIG. 7) further parses computer program 610 (FIG. 6) to determine whether computer program 610 contains a function which has yet to be analyzed by dynamic inspection engine 706 (FIG. 7) according to step 908 (FIG. 9). In the alternative embodiment described above, program parser 704 (FIG. 6) determines whether a function structure representing a function of computer program 610 has yet to be analyzed by dynamic inspection engine 706 (FIG. 7) according to step 908 (FIG. 9). If dynamic inspection engine 706 (FIG. 7) has not processed a function structure representing a function of computer program 610, processing transfers to step 906 (FIG. 9) in which program parser 704 (FIG. 6) transfers the function structure to dynamic inspection engine 706 (FIG. 7) as described above. Conversely, if dynamic inspection engine 706 (FIG. 7) has processed every function structure representing a function of computer program 610, processing according to logic flow diagram 900 (FIG. 9) terminates.

Initialization of Models

As described above with respect to step 904 (FIG. 9) of logic flow diagram 900, function models describing the behavior of functions are initialized. Step 904 is shown in greater detail as logic flow diagram 904 (FIG. 10). Processing begins with step 1002 in which model description file 604 (FIG. 6), which contains function models as described above, is opened.

In one embodiment, function models are stored in textual format and are read in, then stored in data structures within memory 104 (FIG. 1), which are described more completely below. A function model includes information which identifies a function and a singly-linked list of external models for the externals of the function. The information which identifies the function includes (i) the name of the function, (ii) the name of the source code file in which the function is defined, (iii) the number of the textual line within the source code file at which the definition of the function begins, and (iv) a short description of the function. A source code file is a file stored in memory 104 (FIG. 1), typically in secondary storage such as a magnetic disk, which contains a computer program such as computer program 610. The external models, as stored in a singly-linked list, define the effect of execution of the function on externals of the function in terms of operations applied to those externals and any resources created on behalf of those externals.

An external model includes information specifying the type of external, information which identifies the external, and information which specifies the effect on the external of execution of the function. The information which identifies the external is either a parameter number, if the external is a parameter, a variable name, if the external is a global or static variable, or NULL, if the external is a returned item. The information which specifies the effect on the external of execution of the function includes (i) a list of the operations to be applied to the external, (ii) a flag specifying whether a new resource is created on behalf of the external, and (iii) the initial state of the new resource if one is created.

The textual format of the models as stored in model description file 604 (FIG. 6) is defined by the following Backus-Naur Form (BNF) definition (8). Backus-Naur Form is a well-known format for describing a formal language.

```
<function-spec> ::= ( <function-prefix> <extern-list> )           (8)
<function-prefix>
    <function-name>
       [<defining-file> [<defining-line> [<description>]]]
<extern-list> ::= <extern> | <extern> <extern-list>
<extern> ::= ( <extern-type> <result-list> )
<extern-type> ::=
                retval                       // returned item
              | ( param <param-number> )     // parameter
              | var <var-name> )             // global/static item
<result-list> ::= <result> | <result> <result-list>
<result> ::=
                ( op <state-op>)
              | new <initial-state> [<description>] )
<initial-state> ::= A | Q | U | X | E
<state-op> ::= a | m | k | x | i | c | p
```

A function model, in textual format, is represented by non-terminal <function-spec> of BNF definition (8). In BNF, a terminal is a term that is not expanded further in a particular BNF definition, and, conversely, a non-terminal is a term that is expanded further. Terminal <function-name> is the identifier assigned to the function, i.e., is the identifier used by another function to call the function represented by the function model. Terminal <function-name> can be any function identifier which is valid according to the computer language with which the function is defined. Terminal <defining-file> is an alphanumeric identification of the source code file within which the function is defined. The alphanumeric identification can be a path description of the source code file, for example. Terminal <defining-line> is a textual representation of a non-negative number, i.e., using digits 0–9, specifying at which textual line of the source code file identified by terminal <defining-file> the definition of the modelled function begins.

It should be noted that, in BNF, terms which are optionally present are enclosed in brackets ("[ ]"). Therefore, in the definition of terminal <function-prefix>, terminals <defining-file>, <defining-line>, and <description> are optionally present. If should be further noted that successive slashes ("//") denote the beginning of a comment and the slashes, and any text following the slashes to the end of a textual line, are not considered part of the BNF definition.

Terminal <description> of BNF definition (8) is a series of one or more characters (i.e., letters, numerals, and/or symbols). Terminal <description> is not used by the resource checker 602 (FIG. 6) but is instead provided for the convenience and understanding of a user reading the model in the textual format. Terminal <param-number> of BNF definition (8) is a textual representation of a non-negative integer using the digits 0–9 and specifies a particular parameter in a list of parameters. Parameter zero is the first, i.e., leftmost, parameter in a list of parameters in a call to a function. Subsequent parameters are numbered sequentially. Terminal <var-name> of BNF definition (8) is an identifier of a variable.

Thus, function models retrieved from model description file 604 (FIG. 6) each describe the effect of execution of a respective function on externals of the function. Processing transfers from step 1002 (FIG. 10) to loop step 1004 in which each function model stored in model description file 604 (FIG. 6) is retrieved and processed according to a loop defined by loop step 1004 (FIG. 10) and next step 1014. During each iteration of the loop, the function model which is processed is called the current function model. When each and every function model stored in the model description file has been processed according to the loop defined by loop step 1004 and next step 1014, processing transfers from loop step 1004 to step 1006 in which model description file 604 (FIG. 6) is closed and processing according to logic flow diagram 904 (FIG. 10) terminates.

For each function model retrieved from the model description file, processing transfers from loop step 1004 to step 1008 in which the portion of the current function model corresponding to non-terminal <function-prefix> of BNF definition (8) above is parsed from the current function model. Processing transfers to step 1010 in which a function model structure is initialized and the information parsed from the current function model in step 1008 is stored in a function model structure.

A function model structure 1100 (FIG. 11) includes a field "name" 1102, a field "file" 1110, a field "line" 1112, and a field "description" 1108. Portions of the function model corresponding to terminals <function-name>, <defining-file>, <defining-line>, and <description> of BNF definition (8), all of which are part of non-terminal <function-prefix>, are parsed from the function model and stored in field "name" 1102, field "file" 1110, field "line" 1112, and field "description" 1108, respectively, of function model structure 1100. Processing transfers from step 1010 (FIG. 10) to loop step 1012.

Loop step 1012 and next step 1028 define a loop, in each iteration of which an external specified in the portion of the function model corresponding to non-terminal <extern-list> of BNF definition (8) above is processed. During each iteration of the loop defined by loop step 1012 and next step 1028, the currently processed external is called the subject external. After every external defined in the current function model has been processed according to the loop defined by loop step 1012 and next step 1028, processing transfers from loop step 1012 to next step 1014. Processing transfers from next step 1014 to loop step 1004 in which another function model retrieved from model description file 604 (FIG. 6) is processed or, if all function models have been processed, from which processing transfers to step 1006 (FIG. 10) as described above.

For each external specified in the portion of the current function model corresponding to non-terminal <extern-list> of BNF definition (8), processing transfers from loop step 1012 to step 1016. In step 1016, a new external model structure, e.g., external model structure 1200 (FIG. 12), is created.

External model structure 1200 includes a field "equivalent" 1202, a field "type" 1204, a field "parameter_number" 1206, a field "name" 1208, a field "next" 1210, a field "number_of_operations" 1212, a field "operations" 1214, a field "new resource" 1218, a field "initial_state" 1220, and a field "description" 1222. In step 1016 (FIG. 10), the portion of the subject external model corresponding to terminal <param-number> in the definition of non-terminal <external> of BNF definition (8) is parsed from the subject external model and is stored in field "parameter_number" 1206 (FIG. 12) of external model structure 1200.

In one embodiment, field "equivalent" 1202 is used to identify a second external model structure. By doing so, external model structure 1200 is related to the second external model structure. Such would be appropriate if, for example, the returned item of a function is the first parameter. The embodiment described herein does not make use of field "equivalent" 1202, which is therefore initialized to a NULL value. From step 1016 (FIG. 10), processing transfers to step 1018.

In step 1018, the portion of the subject external model corresponding to non-terminal <extern-type> of BNF definition (8), which specifies the type of external represented by the subject external model, is parsed from the subject external model. As shown in BNF definition (8) above, an external represented by an external model can be a returned item, a parameter, or a globally-defined or static variable. Data specifying the type of external represented by the subject external model are stored in field "type" 1204 (FIG. 12) of external model structure 1200. Processing transfers from step 1018 (FIG. 10) to a loop step 1020.

As shown in BNF definition (8) above, execution of a function can have one or more effects or "results" on each external of the function. Each result is represented in BNF definition (8) as non-terminal <result>. One or more results are included in non-terminal <result-list>. Loop step 1020 and next step 1024 define a loop in which each result in the list of non-terminal <result-list> of the subject external model is processed. During an iteration of the loop defined by loop step 1020 and next step 1024, the result being processed is called the subject result. After every result of the subject external model has been processed according to the loop defined by loop step 1020 and next step 1024, processing transfers from loop step 1020 to step 1026 which is described below.

For each result for the subject external model, processing transfers from loop step 1020 to step 1022. In step 1022, the subject result is parsed from the subject external model. The result is then stored in an external model structure such as external model structure 1200 (FIG. 12). For example, function model (3), which is defined above, specifies one result for a first external, i.e., the returned item, and one result for a second external, i.e., parameter zero. The result of the returned item is specified as '(new Q "memory"', indicating that a new resource is created for the returned item, the initial state of the resource is state Q, and provides "memory" as a brief description of the resource. Accordingly, if external model structure 1200 represents the external model for the returned item, (i) field "new_resource" 1218 is set to a boolean value of "true" to indicate that a new resource is created, (ii) field "initial_state" 1220 is set to indicate that the initial state of the new resource is state Q, and (iii) the text "memory" is stored in field description 1222.

As a second example, function model (3) above specifies a result "(op c)" for the second external, i.e., parameter zero. Result "(op c)" specifies that operation c is applied to the external. Accordingly, if external model structure 1200 represents the external model for parameter zero, field "number_of_operations" 1212, which initially has a value of zero, is incremented and an operation identifier "c" is stored in field "operations" 1214 corresponding to a position indicated by field "number_of_operations" 1212. In this example, field "number_of_operations" 1212 stores a value of one and the first operation identifier in field "operations" 1214 is an identifier of operation c. If a second operation is applied to the second external, field "number of operations" 1212 is again incremented to a value of two and the second operation identifier in field "operations" 1214 is the identifier of the second operation. Processing transfers from step 1022 (FIG. 10) through next step 1024 to loop step 1020 which is described above. As described above, processing transfers from loop step 1020 to step 1026 once all results for the subject external model have been processed.

Figure 13:
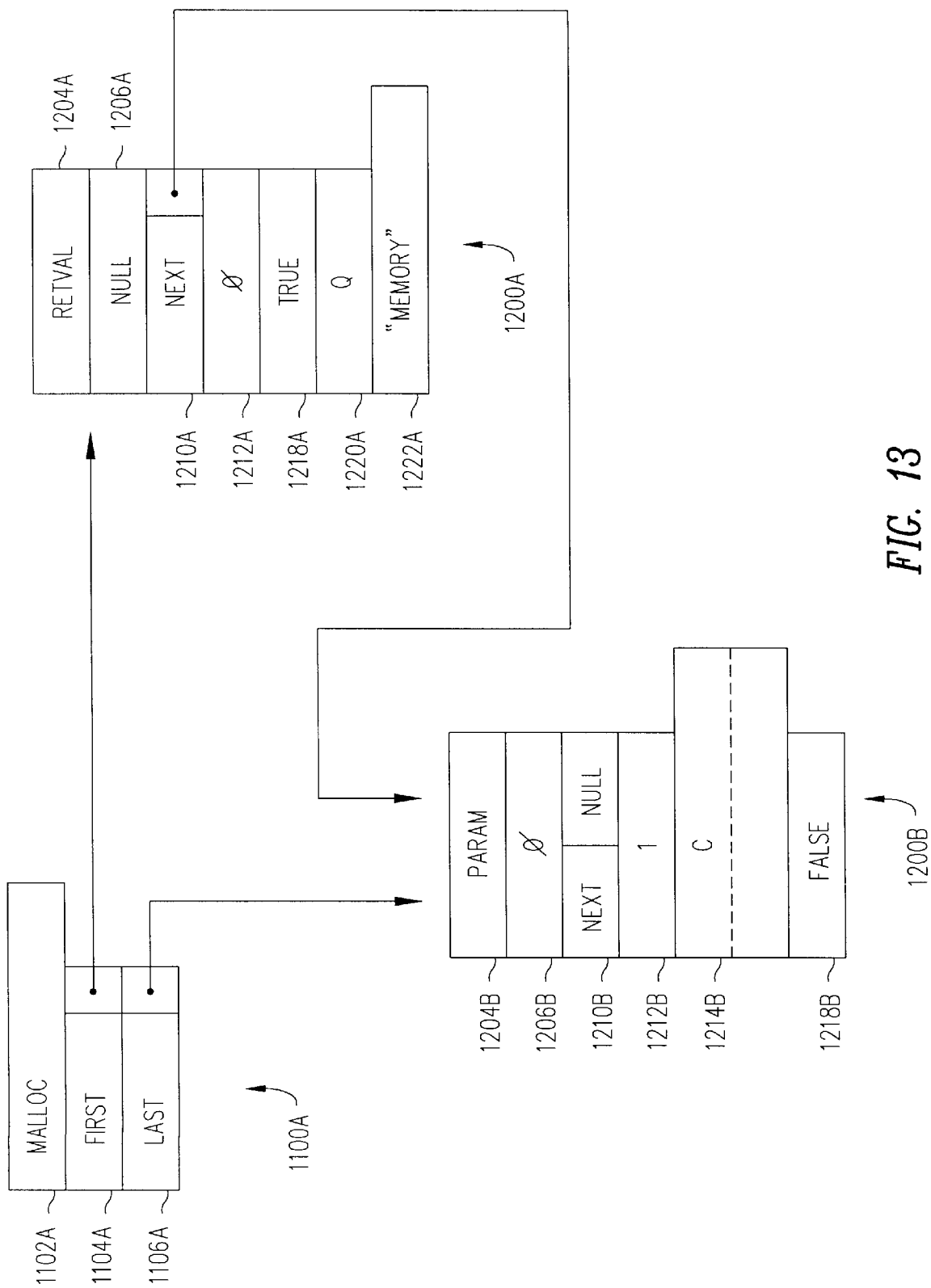
FIG. 13 is a block diagram of a function model structure and two external model structures associated with the function model structure.

In step 1026, the external model structure representing the subject external model is added to a singly linked list of externals in the current function model structure. An illustrative example is discussed in the context of function model (3) above. An external model structure 1200A (FIG. 13) is first added to a function model structure 1100A by storing in fields "first_external" 1104A and "last_external" 1106A pointers to external model structure 1200A. A second external model structure 1200B is then added to function model structure 1100A by storing in field "next" 1210A of external model structure 1200A, and in field "last_external" 1106A of function model structure 1100A (superseding the pointer previously stored in field "last_external" 1106A), a pointer to external model structure 1200B as shown in FIG. 13.

Processing transfers from step 1026 (FIG. 10) through next step 1028 to loop step 1012. After every external model has been processed as described above, processing transfers from loop step 1012 through next step 1014 to loop step 1004. After every function model has been processed as described above, processing transfers from loop step 1004 to step 1006 in which the file containing function models in the textual format described above is closed as described above. Processing according to logic flow diagram 904 terminates after step 1006.

Internal Representation of a Function

Once computer program 610 (FIG. 6) is parsed by program parser 704 (FIG. 7), computer program 610 is represented in memory 104 by a series of function structures. In an alternative embodiment as described above, program parser 704 retrieves from computer program 610 function structures which have been formed by a previous parsing of a source computer program conforming to a particular computer language, e.g., the C computer language. The source computer program is parsed by a source code preprocessor which parses the source computer program according to the computer language to which the source computer program comports and forms and stores in computer program 610 function structures representing the functions defined in the source computer program. The source code preprocessor (not shown) is a separate computer process from resource checker 602.

In this alternative embodiment, the source code preprocessor is based on the known GNU C compiler available from Free Software Foundation, Inc. of Cambridge, Mass. Appendix B, which is a part of this disclosure and is incorporated herein in its entirety, is a list of computer instructions which define data structures and functions for transporting parsed functions of a computer program from a source code preprocessor into data structures described more completely below for representing a parsed function. In one embodiment, a conventional compiler, such as the known GNU C compiler described above, is used to parse a computer program and the parsed program is represented in data structures such as those defined in Appendix B.

Figure 7:
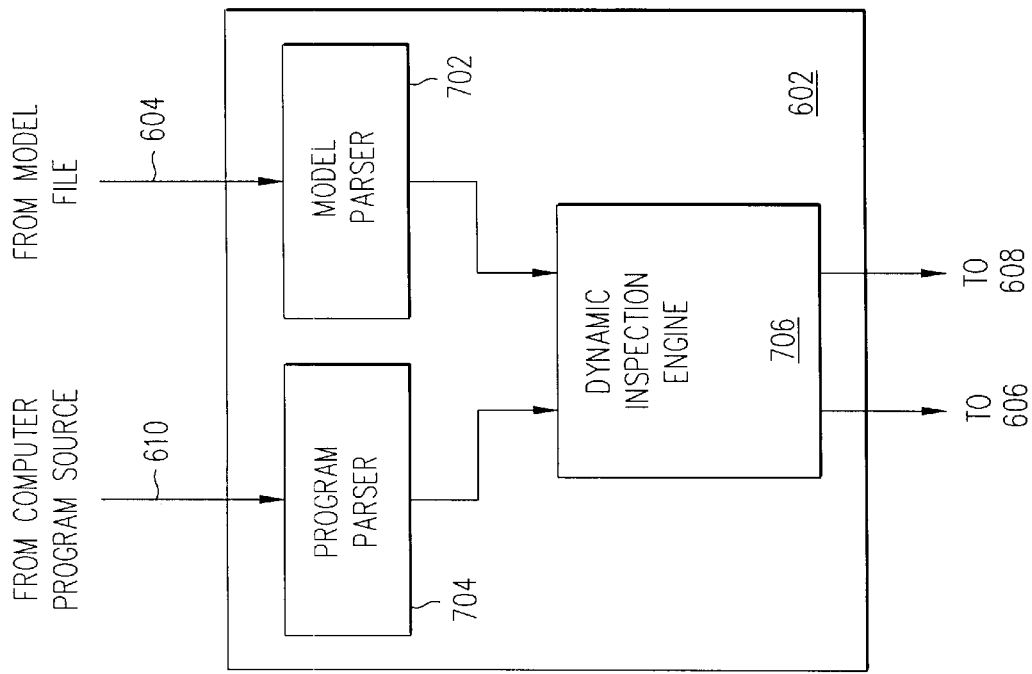

The following is a description of a function structure. Familiarity with fields and relationships within a function structure facilitates the subsequent description of the processing of dynamic inspection engine 706 (FIG. 7).

Figure 14:
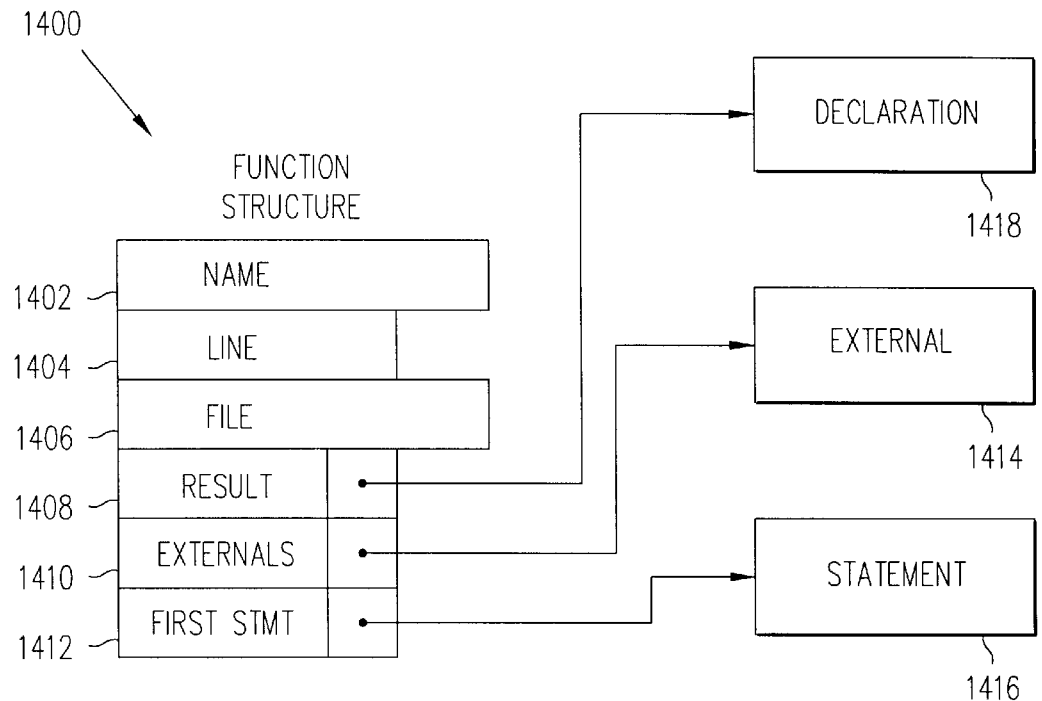
FIG. 14 is a block diagram of a function structure in accordance with an embodiment of the present invention.

Function structure 1400 (FIG. 14) represents a function defined by computer program 610 or, in an alternative embodiment as described above, the source computer program and includes (i) a field "name" 1402, (ii) a field "line" 1404, (iii) a field "file" 1406, (iv) a field "result" 1408, (v) a field "externals" 1410, and (vi) a field "statement". Field "name" 1402 of function structure 1400 specifies the identifier of the function represented by function structure 1400. For example, the identifier of function example_1( ) of source code excerpt (1) above is "example_1".

Field "file" 1406 and field "line" 1404 specify the source code file and line number within that file, respectively, at which the function represented by function structure 1400 is defined. For example, if source code excerpt (1) above represents the entire contents of a single source code file whose file name is "example_1.c", field "file" 1406 and field "line" 1404 of a function structure representing function example_1( ) contain, respectively, data specifying the text "example_1.c" and an integer value of seven (7).

Field "result" 1408 points to a declaration structure 1418, which is analogous to declaration structure 1506 described below and which specifies the type of result returned by the function represented by function structure 1400. For example, function example_1( ) of source code excerpt (1) above returns a result which is an integer, i.e., data of the type "int", as specified at line 7 of source code excerpt (1). Thus, if function structure 1400 represents function example_1( ), field "result" 1408 points to declaration structure 1418 which specifies integer data.

Field "externals" 1410 of function structure 1400 is a pointer to an external list structure 14 14, which is described below in greater detail. As described more completely below, external list structures such as external list structure 1414 include a pointer which is used to link external list structures in a singly-linked list. Thus, pointing to an external list structure is to point to a singly-linked list of external list structures, even if the length of the list is one. Such a singly-linked list, which is pointed to by field "externals" 1410 of function structure 1400, includes external list structures representing the externals of the function represented by function structure 1400.

Field "first_stmt" 1412 of function structure 1400 is a pointer to a statement structure 1416, which is described below in greater detail. As described more completely below, statement structures such as statement structure 1416 include a pointer which is used to link statement structures in a singly-linked list. Thus, pointing to a statement structure is to point to a singly-linked list of statement structures, even if the length of the list is one. Such a singly-linked list, which is pointed to by field "first_stmt" 1412 of function structure 1400, includes statement structures representing the statements of the function represented by function structure 1400.

External List Structures

Figure 15:
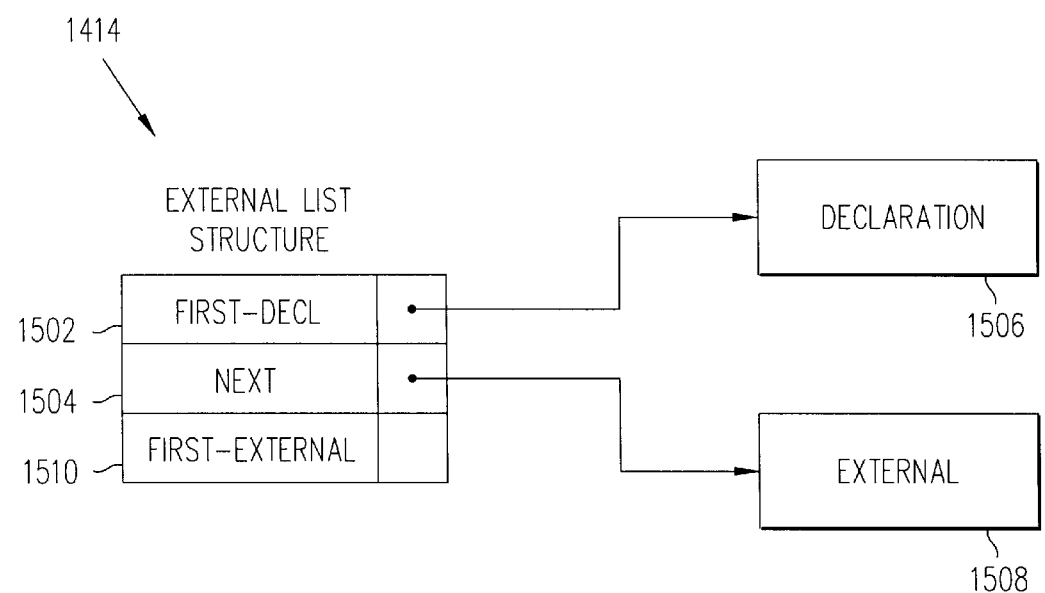
FIG. 15 is a block diagram of an external list structure in accordance with an embodiment of the present Invention.

External list structure 1414 is shown in greater detail in FIG. 15. External list structure 1414 represents an external of the function represented by function structure 1400 (FIG. 14) and includes a field "first_decl" 1502 (FIG. 15), a field "next" 1504, and a field "first_external" 1510. Field "first_decl" 1502 is a pointer to a declaration structure 1506, which specifies the data type of the external represented by external list structure 1414 and which is described below in greater detail. Field "next" 1504 is a pointer to another external list structure 1508 if external list structure 1508 immediately follows external list structure 1414 in the singly-linked list of externals. If no external list structure follows external list structure 1414 in the singly-linked list of external list structures, field "next" 1504 of external list structure 1414 is NULL, i.e., contains NULL data. Field "first_external" 1510 is a pointer to an external state structure (not shown) which specifies the state of the external represented by external list structure 1414 and which is described below in greater detail.

Declaration Structures

Figure 16:
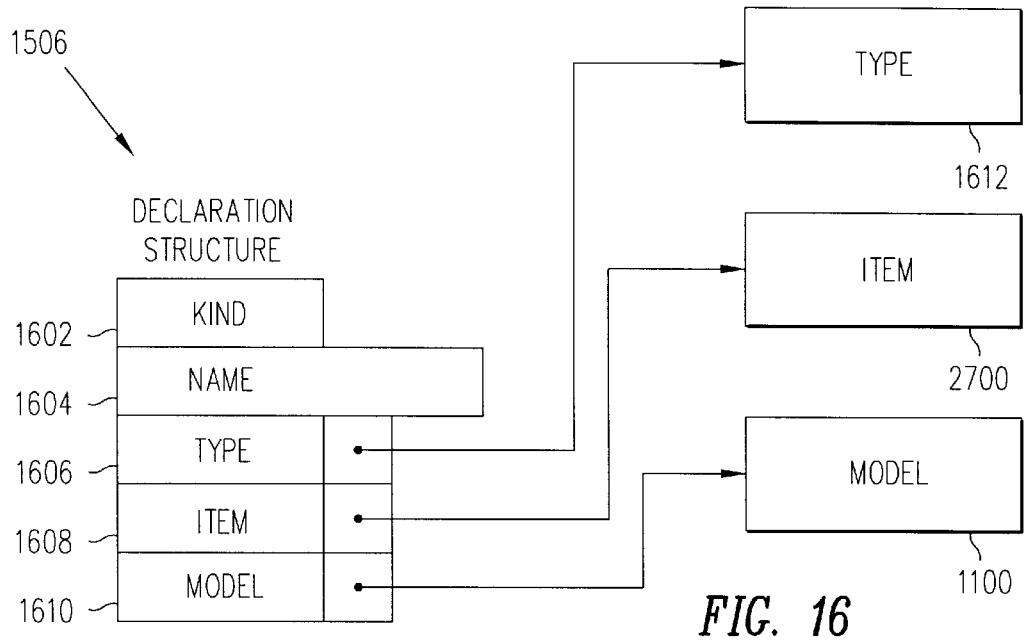
FIG. 16 is a block diagram of a declaration structure in accordance with an embodiment of the present invention.

Declaration structure 1506 is shown in greater detail in FIG. 16. A declaration structure is a structure which specifies a declared variable or function, i.e., a variable or function, respectively, specified in a declaration. Declarations in the context of the C computer language are well-known and are described in the C Standard. Declaration structure 1506 includes a field "kind" 1602, a field "name" 1604, and field "type" 1606, a field "item" 1608, and a field "model" 1610.

Field "kind" 1602 contains data specifying whether the declared item or function is globally defined, static, or a locally defined. Field "name" 1604 contains textual data specifying an identifier of the item or function. As described above, in the context of the C computer language, an item or function is identified by a textual identifier and identifiers must conform to a specific format, which is described in Section 6.1.2 of the C Standard.

Field "type" 1606 of declaration structure 1506 is a pointer to a type structure 1612 which specifies the particular type of data represented by the declared item or function. Type structure 1612 is described below. Field "item" 1608 is a pointer to item structure 2700 which represents the declared item. If declaration structure 1506 represents a declared function, field "item" 1608 is NULL and therefore points to no item structure.

Field "model" 1610 of declaration structure 1506 is a pointer to function model structure 1100 if declaration structure 1506 represents a declaration of a function whose model is represented by function model structure 1100. If declaration structure 1506 does not represent a declaration of a function, field "model" 1610 is NULL, i.e., contains NULL data, and therefore points to no function model structure. Furthermore, if declaration structure 1506 represents a declaration of a function for which no function model structure exists, field "model" 1610 is NULL.

Type Structures

Figure 17:
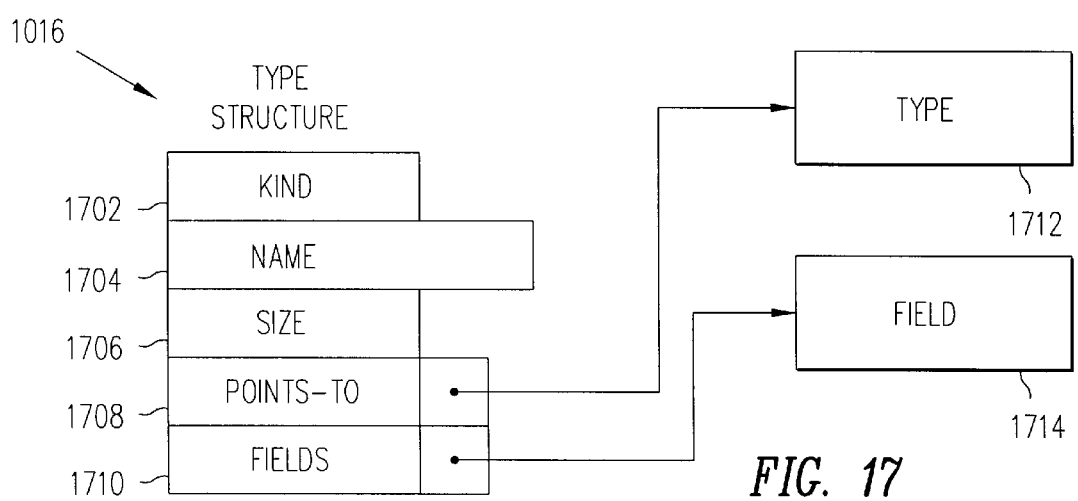
FIG. 17 is a block diagram of a type structure in accordance with an embodiment of the present invention.

Type structure 1612 is shown in greater detail in FIG. 17. A type structure such as type structure 1612 specifies a particular data type, such as integer, floating point, alphanumeric characters, and user-defined types such as structures. Type structure 1612 includes a field "kind" 1702, a field "name" 1704, a field "size" 1706, a field "points_to" 1708, and a field "fields" 1710. Field "kind" 1702 contains data specifying whether the type represented by type structure 1612 is integer, real (i.e., floating point numerical data), pointer, array, structure (i.e., data type "struct" as defined for the C computer language), or union. Each of these types are well-known and are described in the C Standard at Sections 6.1.2.5 and 6.5 et seq.

Field "name" 1704 of type structure 1612 contains alphanumeric data specifying the identifier of the type if the type represented by type structure 1612 is user-defined. Otherwise, if the type represented by type structure 1612 is predefined by the C computer language, field "name" 1704 is NULL.

Field "size" 1706 specifies the size of the type represented by type structure 1612. If the type is not an array, field "size" 1706 specifies the number of bits of data included in an item of the type represented by type structure 1612. For example, if the type is a 32-bit integer, field "size" 1706 of type structure 1612 specifies the value 32. If the type is an array, field "size" 1706 specifies the number of bits of data included in the entire array, i.e., the number of bits of data included in an item of the type represented by an element of the array multiplied by the number of elements in the entire array. For example, a declaration "int array[10];" declares an array with ten (10) elements. If the type "int" is a 32-bit integer, the size of the declared array is therefore ten (10) elements multiplied by 32 bits. The size of the array is therefore 320 bits.

If the type represented by type structure 1612 is a pointer to a second type of data, field "points-to" 1708 is a pointer to a type structure representing the second type of data, i.e., to type structure 17 12. Type structure 17 12 is analogous to type structure 1612. Conversely, if the type represented by type structure 1612 is not a pointer, field "points_to" 1708 is NULL.

If the type represented by type structure 1612 is a structure type (i.e., type "struct" of the C computer language) or a union type, field "fields" 1710 is a pointer to field structure 1714 representing the first field of the structure type or union type, respectively. As described more completely below, field structures corresponding to fields of a particular structure type or union type are linked to form a singly-linked list. If the type represented by type structure 1612 is neither a structure type nor a union type, field "fields" 1710 of structure type 1612 is NULL.

Field Structures

Figure 18:
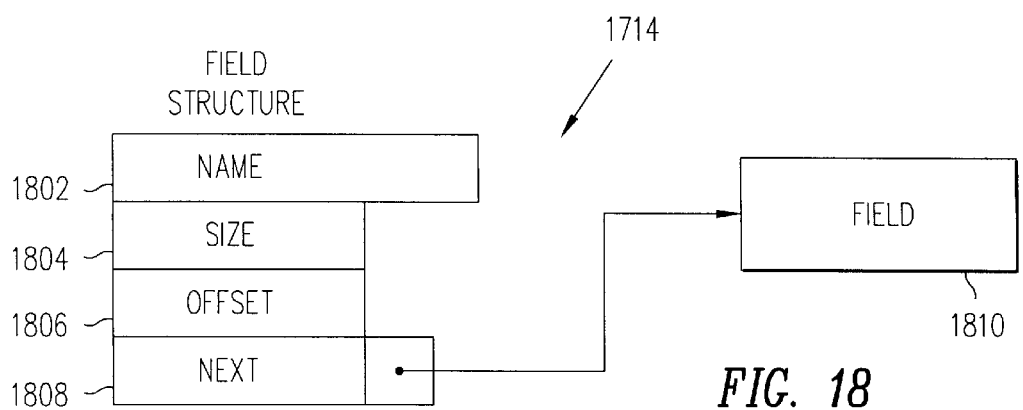
FIG. 18 is a block diagram of a field structure in accordance with an embodiment of the present invention.

Field structure 1714 is shown in greater detail in FIG. 18. Field structure 1714 includes a field "name" 1802, a field "size" 1804, a field "offset" 1806, and a field "next" 1808. Field structure 1714 is described in the context of the illustrative example of the following type definition according to the C computer language.

```
typedef struct {                        (9)
    int x;
    int y;
} point;
```

The type definition of source code excerpt (9) defines a structure type whose identifier is "point" and which has two fields. Type "point" is therefore a structure type. Each field is of the type "int", which is typically a 32-bit integer, and has either of respective identifiers "x" and "y".

Field "name" 1802 of field structure 1714 contains alphanumeric data specifying the identifier of the field represented by field structure 1714. For example, field "name" of a field structure representing the first field of the structure defined in source code excerpt (9) contains the text "x".

Field "size" 1804 of field structure 1714 specifies the number of bits of data contained in the field represented by field structure 1714. For example, in a typical implementation of the C computer language, such as that compiled by the SunOS C compiler available from Sun Microsystems, Inc. of Mountain View, Calif., an item of type "int" is 32 bits in length. In the example of source code excerpt (9), each field is a 32-bit integer and therefore contains 32 bits of data. Accordingly, field "size" of each field structure representing each respective field specifies the integer value 32.

Figure 19:
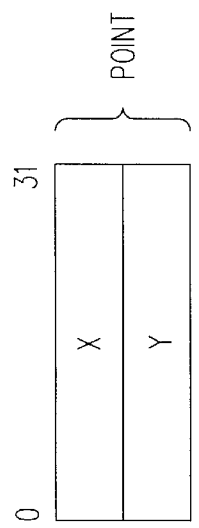
FIG. 19 is a block diagram of a two-field data object.
Figure 20:
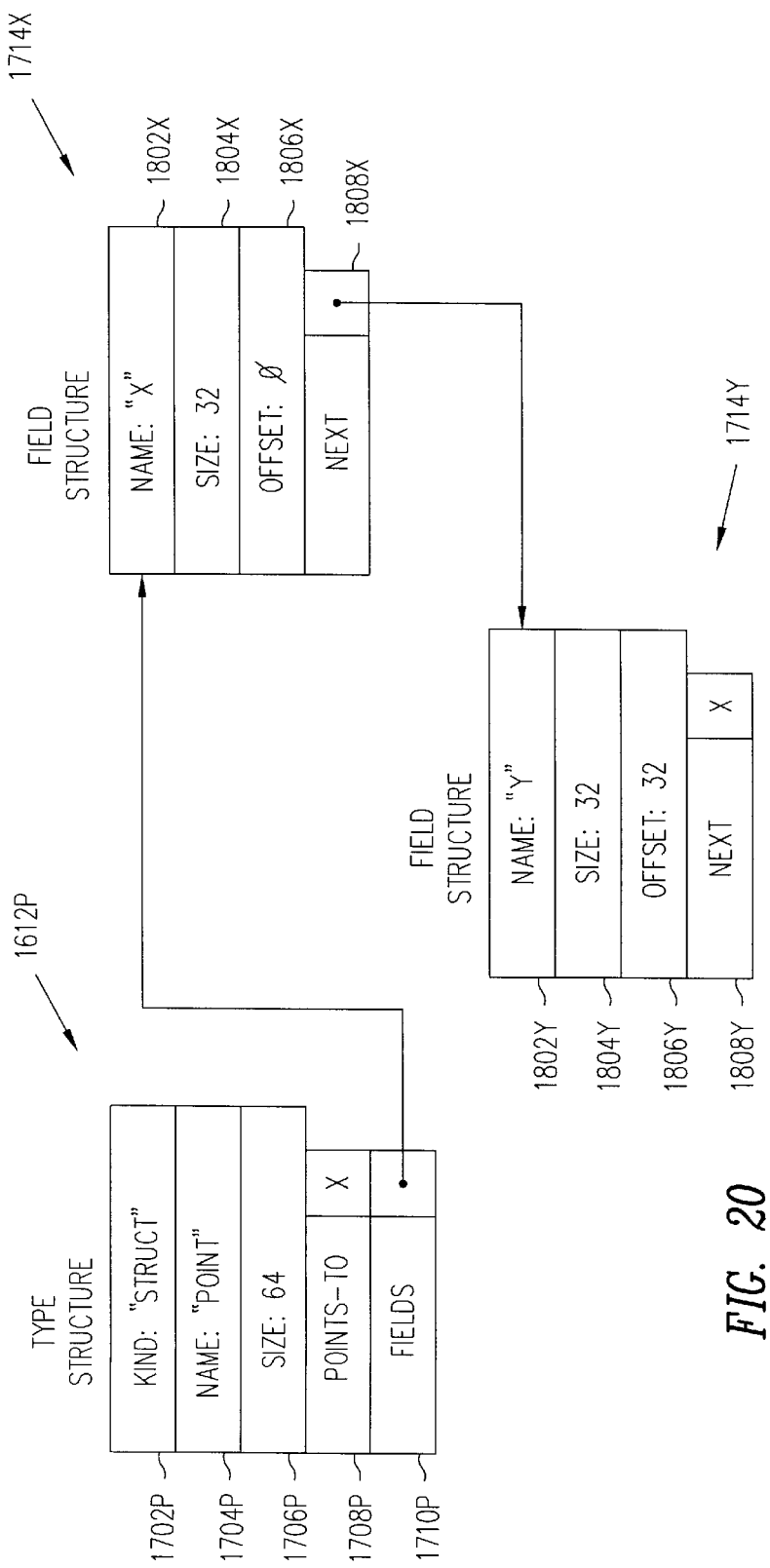
FIG. 20 is a block diagram of a type structure and two field structures representing the data object of FIG. 19.

Field "offset" 1806 of field structure 1714 specifies the offset from the beginning of the structure to the data of the field represented by field structure 1714. For example, field "x" in source code excerpt (9) is the first field of type "point" and therefore has an offset of zero. Type "point" is shown diagrammatically in FIG. 19. Field "x" of type "point" is 32 bits in length and begins at offset zero (0). Field "y" of type "point" is 32 bits in length and begins at offset 32. Accordingly, field "offset" 1806X (FIG. 20) of field structure 1714X, which is directly analogous to field structure 1714 (FIG. 18) and which represents field "x" of type "point"specifies the integer value of zero (0). Similarly, field "offset" 1806Y (FIG. 20) of field structure 1714Y, which is also directly analogous to field structure 1714 (FIG. 18) and which represents field "y" of type "point", specifies the integer value of thirty-two (32).

Field "next" 1808 (FIG. 18) of field structure 1714 is a pointer to the next field structure in a singly-linked list of field structures of a given structure type. For example, field "fields" 1710P (FIG. 20) of type structure 1612P representing type "point" points to field structure 1714X, which represents field "x" which in turn is the first field of type "point". The next field of type "point" is field "y"Field "next" 1808X of field structure 1714X therefore points to field structure 1714Y which represents field "y" of type "point". Field "y" of type "point" is the last field of type "point" and is therefore not followed by any other field of type "point". Accordingly, field "next" 1810Y of field structure 1714Y is NULL.

Statement Structures

Figure 21:
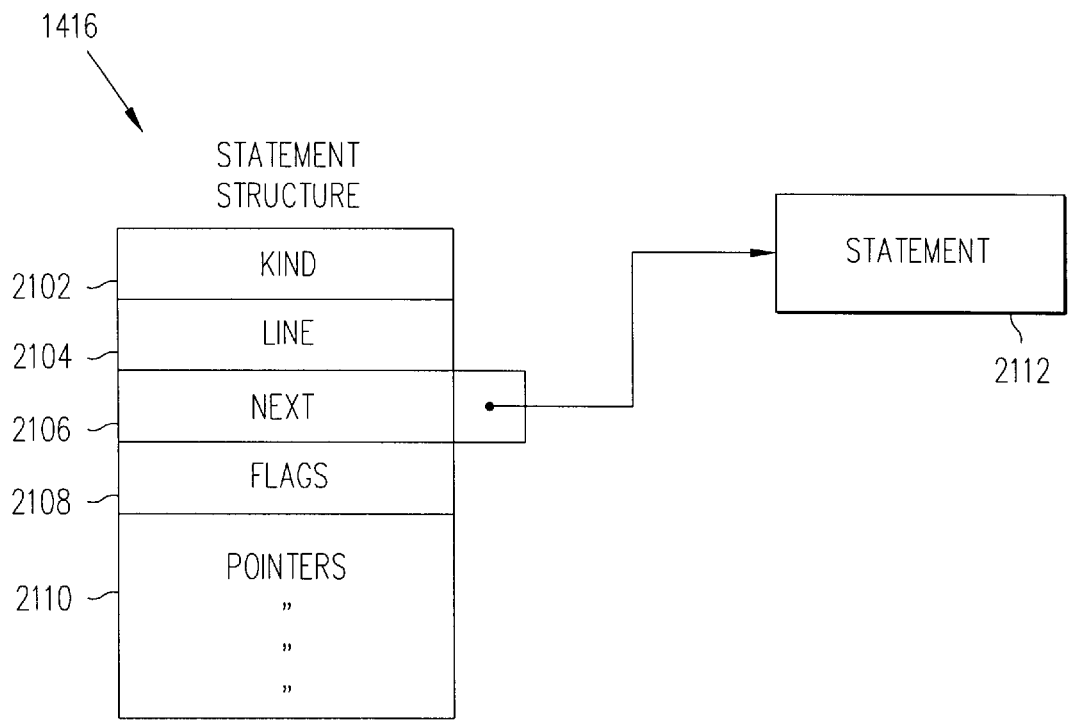
FIG. 21 is a block diagram of a statement structure in accordance with an embodiment of the present invention.

As described above, field "first_stmt" 1412 (FIG. 14) of function structure 1400 points to statement structure 1416. Statement structure 1416 is shown in greater detail in FIG. 21. Statement structures such as statement structure 1416 represent statements which collectively form a function according to the C computer language. Statement structure 1416 includes the following fields: (i) a field "kind" 2102, (ii) a field "line" 2104, (iii) a field "next" 2106, (iv) a field "flags" 2108, and (v) a field "pointers" 2110.

Field "kind" 2102 of statement structure 1416 specifies the kind of statement represented by statement structure 1416. Field "kind" 2102 identifies one of the following kinds of statement: error, declaration, expression, block, "if", "else", "return", loop, "switch", "break", "continue", and "goto". The representation of each of these kinds of statement by a statement structure is described below more completely.

Field "line" 2104 of statement structure 1416 specifies the textual line on which the statement represented by statement structure 1416 appears within the source code file defining the function represented by function structure 1400 (FIG. 14), and therefore including the statement represented by statement structure 1416. The line on which the statement appears is maintained in statement structure 1416 so that reports of detected errors can specify to the user the specific statement causing the error.

Field "next" 2106 (FIG. 21) of statement structure 1416 is a pointer to a second statement structure 2112, which represents the statement immediately following the statement represented by statement structure 1416 in a block of statements. In this way, the statements of a block of statements are represented by statement structures which are linked to form a singly-linked list. If the statement represented by statement structure 1416 (FIG. 21) is the last statement of the block of statements, field "next" 2106 is NULL, and therefore points to no other statement structure.

Field "flags" 2108 of statement structure 1416 is an unsigned 32-bit integer whose individual bits are used as flags to indicate which errors associated with the statement represented by statement structure 1416 have been reported to the user. Each time an error is to be reported, the flag of field "flags" 2108 corresponding to the error to be reported is checked. If the flag is set, the error is not reported since the flag indicates that the error has already been reported in the context of the statement represented by statement structure 1416. If the flag is not set, the error is reported and the flag is set to reflect the reporting of the error. In this way, each type of error is reported only once with respect to any particular statement.

Field "pointers" 2110 of statement structure 1416 is an array of one or more pointers to structures representing the respective parts of the statement represented by statement structure 1416. The number of pointers in the array depends on the particular kind of statement represented by statement structure 1416.

Error, "break", and "continue" statements have no parts; therefore, field "pointers" 2110 is NULL if statement structure 1416 represents an error, "break", or "continue" statement. An error statement is a statement which does not conform to the C computer language. "Break" and "continue" statements are well-known and are described in the C Standard at Sections 6.6.6.3 and 6.6.6.2, respectively.

A declaration statement includes a declared variable having data of a specified type and perhaps an initial value for that variable. Accordingly, if statement structure 1416 represents a declaration statement, field "pointers" 2110 is an array of two pointers. The first pointer points to a declaration structure representing the declared variable. The second pointer points to an expression structure representing an expression which evaluates to the initial value of the declared variable, if an initial value is specified. Conversely, if no initial value is specified for the declared variable, the second pointer is NULL.

An expression statement is a statement which is itself an expression. An expression is a well-known component of the C computer language and is a collection of one or more items, calls to functions, and operators. Every expression in the C computer language has a value. Evaluation of an expression results in an item, whose value is the value of the expression and which is sometimes called the item of the expression. The value of the item of an expression is sometimes called herein the value of the expression. The evaluation of an expression is described more completely below.

Figure 22:
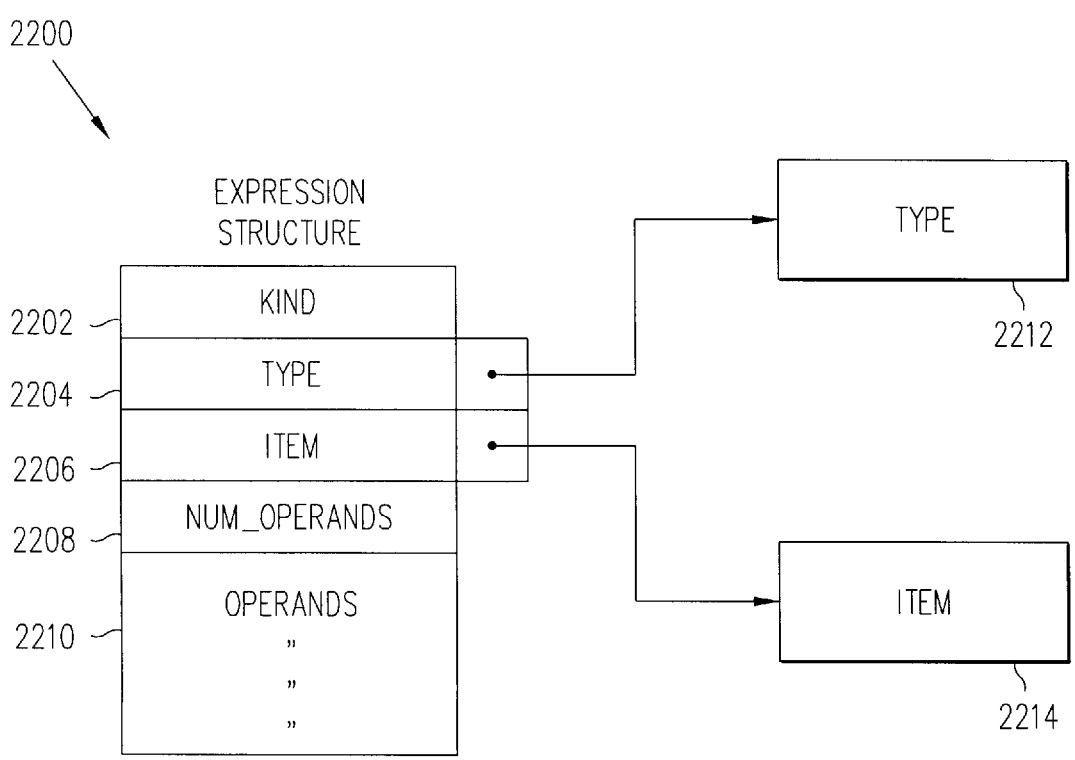
FIG. 22 is a block diagram of an expression structure in accordance with an embodiment of the present invention.

If statement structure 1416 represents an expression statement, field "pointers" 2110 is an array of one pointer which points to an expression structure, such as expression structure 2200 (FIG. 22). Expression structure 2200 includes a field "kind" 2202, a field "type" 2204, a field "item" 2206, a field "num_operands" 2208, and a field "operands" 2210. Field "kind" 2202 specifies the kind of expression represented by expression structure 2200. If the expression involves an operator, field "kind" 2202 specifies that operator.

Field "type" 2204 is a pointer to a type structure 2212 which represents the data type of the expression, i.e., the type of item to which the expression evaluates. Type structure 2212 is analogous to type structure 1612 described above. Field "item" 2206 of expression structure 2200 is a pointer to an item structure 2214 which represents the item to which the expression evaluates. Item structure 2214 is analogous to item structure 2700 (FIG. 27) described above. Prior to evaluation of the expression represented by expression structure 2200, field "item" 2206 is NULL.

Field "num_operands" 2208 specifies the number of operands in the expression represented by expression structure 2200. Field "operands" 2210 is an array of expression structures, each of which represents an operand of the expression represented by expression structure 2200. The length of the array is equal to the number of operands specified in field "num_operands" 2208. The various types of expression, which are defined in the C computer language, and the number and type of operands of each type of expression, are well-known and are described in the C Standard.

A block statement is a statement which groups together one or more statements. Execution of a block statement is execution of the one or more statements. A block statement has one part, namely, the one or more statements. If statement structure 1416 (FIG. 21) represents a block statement, field "pointers" 2110 is a single pointer which in turn points to the statement structure representing the first statement of the one or more statements. The statement structures representing the one or more statements are linked to form a singly-linked list by using field "next" 2106 as described above.

An "if" statement evaluates an expression, which is sometimes called the predicate of the "if" statement, and causes a second statement to be executed if the expression evaluates to a boolean value of "true"If statement structure 1416 represents an "if" statement, field "pointers" 2110 is an array of two pointers. The first pointer points to an expression structure which represents an expression whose value determines whether the second statement is executed. The second pointer points to a statement structure representing the second statement.

An "else" statement is immediately preceded by an "if" statement and causes a third statement to be executed if the predicate of the "if" statement evaluates to a boolean value of "false". If statement structure 1416 represents an "else" statement, field "pointers" 2110 is an array of two pointers. The first pointer points to a statement structure which represents the third statement. The second pointer points to an expression structure or is NULL. The expression represented by the expression structure is sometimes called the predicate of the "else" statement. If the second pointer points to an expression structure, the third statement is executed only if the predicate of the "if" statement evaluates to a boolean value of "false" and the predicate of the "else" statement evaluates to a boolean value of "true". This represents an "else if" statement which is generally known and described in the C Standard. If the second pointer is NULL, the third statement is executed only if the predicate of the "if" statement evaluates to a boolean value of "false".

A "return" statement terminates execution of a called function and transfers control to a calling function while optionally supplying to the calling function a returned item. Transferring control to a calling function while supplying a returned item to the calling function is called returning the returned item to the calling function. If statement structure 1416 represents a "return" statement, field "pointers" 2110 is a single pointer which points to an expression structure or is NULL. If the pointer points to an expression structure, the expression structure represents the expression which is evaluated to an item which in turn is returned to the calling function.

A loop statement causes a second statement to be executed zero or more times. Examples of loop statements in the C computer language are a "for" statement, a "do" statement, and a "while" statement, each of which is generally known and described in the C Standard at Section 6.6.5. If statement structure 1416 represents a loop statement, field "pointers" 2110 is a single pointer which points to a statement structure representing the second statement.

A "switch" statement evaluates an expression and transfers control within a block statement to a particular statement within the block statement according to the value to which the expression evaluates. The expression is sometimes called the predicate of the "switch" statement. If statement structure 1416 represents a "switch" statement, field "pointers" 2110 is an array of two pointers. The first pointer points to an expression structure which represents an expression according to whose value control transfers. The second pointer points to a statement structure representing the block statement.

A "goto" statement causes a transfer of control to a second statement. In one embodiment, if statement structure 1416 represents a "goto" statement, field "pointers" 2110 is an array of a single pointer, which points to a statement structure representing the second statement. In a simpler embodiment, a "goto" statement is treated as terminating execution of the called routine. In this embodiment, a "goto" statement has no parts, and field "pointers" 2110 is an array of zero pointers.

Thus, function structure 1400 (FIG. 14) represents a function to be analyzed by dynamic inspection engine 706.

Analysis of a Function

As described above, dynamic inspection engine 706 (FIG. 7) analyzes each function structure resulting from parsing of computer program 610 (FIG. 6) step 908 (FIG. 9). Step 908 is shown in greater detail in logic flow diagram 908 (FIG. 24). The function structure processed in a performance of step 908 is called the subject function structure. Similarly, the function represented by the subject function structure is called the subject function. In steps 2404 and 2408 of logic flow diagram 908, the subject function is analyzed under different assumptions.

As described above in greater detail, the control flow path through a particular function sometimes depends on events which are not know until the function is executed. Even then, the events of one execution of the function may not always occur in every execution of the function. Thus, a function whose flow of control depends on an unknown event is repeatedly analyzed under different assumptions with respect to the unknown event.

In one embodiment, every possible control flow path through the function is determined and analyzed. For example, control can flow along one of two possible paths for every "if" statement in the function, and control can flow along one of a number of possible paths for every "switch" statement in the function. In the case of a "switch" statement, the number of possible paths is equal to the number of "case" statements, including a "default" statement if one is present, associated with the "switch" statement. Once all of the possible control flow paths through a function are determined, the function is repeatedly analyzed, once using each possible control flow path through the function. In this way, the function is analyzed in view of all possible events which might affect flow of control through the function.

In a simpler embodiment, the particular control flow path through a function is chosen randomly by making random assumptions with respect to events at each "if" statement and each "switch" statement within the function. The function is analyzed repeatedly and different control flow paths are selected randomly. The number of times the function is analyzed is chosen such that there is a substantial likelihood that every possible control flow path through the function is analyzed, or alternatively can be chosen to limit the amount of effort that is expended to analyze any one routine.

Figure 25:
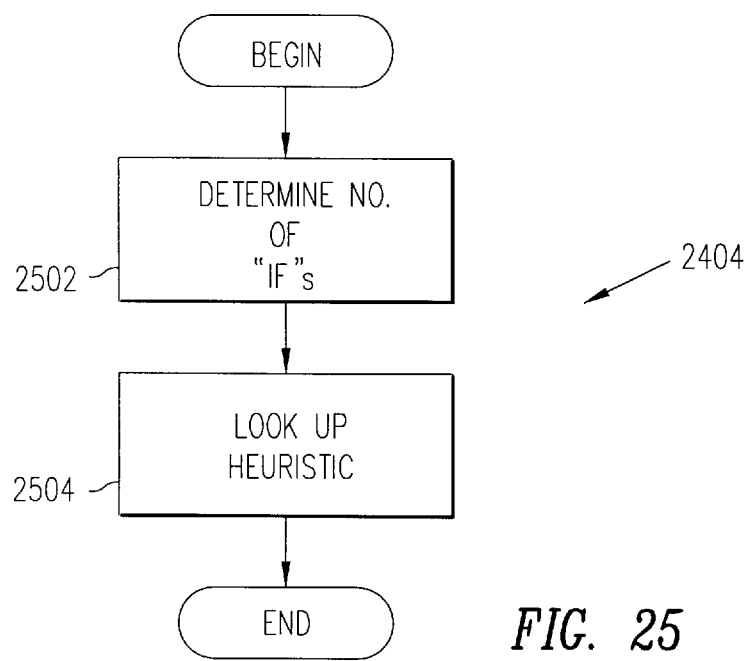
FIG. 25 is a logic flow diagram of a step in the logic flow diagram of FIG. 24.

Steps 2404 and 2408 (FIG. 24) illustrate the latter, simpler embodiment. In step 2404, the number of times the subject function is analyzed is determined. Step 2404 is shown in greater detail as logic flow diagram 2404 (FIG. 25). In step 2502, the number of times an "if" statement is used in the subject function is determined. Specifically, execution engine 802 (FIG. 8) compares field "kind" 2102 (FIG. 21) of each statement structure in the singly-linked list of statement structures pointed to, directly or indirectly, by field "first_ statement" 1412 (FIG. 14) of the function structure 1400 to data indicating an "if" statement. The number of times field "kind" of a statement structure matches data indicating an "if" statement is recorded as the number of times an "if" statement is used in the subject function.

From step 2502, processing transfers to step 2504 in which the number of times the subject function is analyzed is determined. In one embodiment, the number of times the subject function is analyzed corresponds to the number of times the "if" statement is used in the subject function as shown in Table M.

TABLE M

| No. of "if"'s | No. of times the function is analyzed |
|---|---|
| 0 | 1 |
| 1 | 3 |
| 2 | 5 |
| 3 | 10 |
| 4 | 15 |
| 5–6 | 20 |
| 7–8 | 30 |
| 9 or more | 50 |

Figure 26:
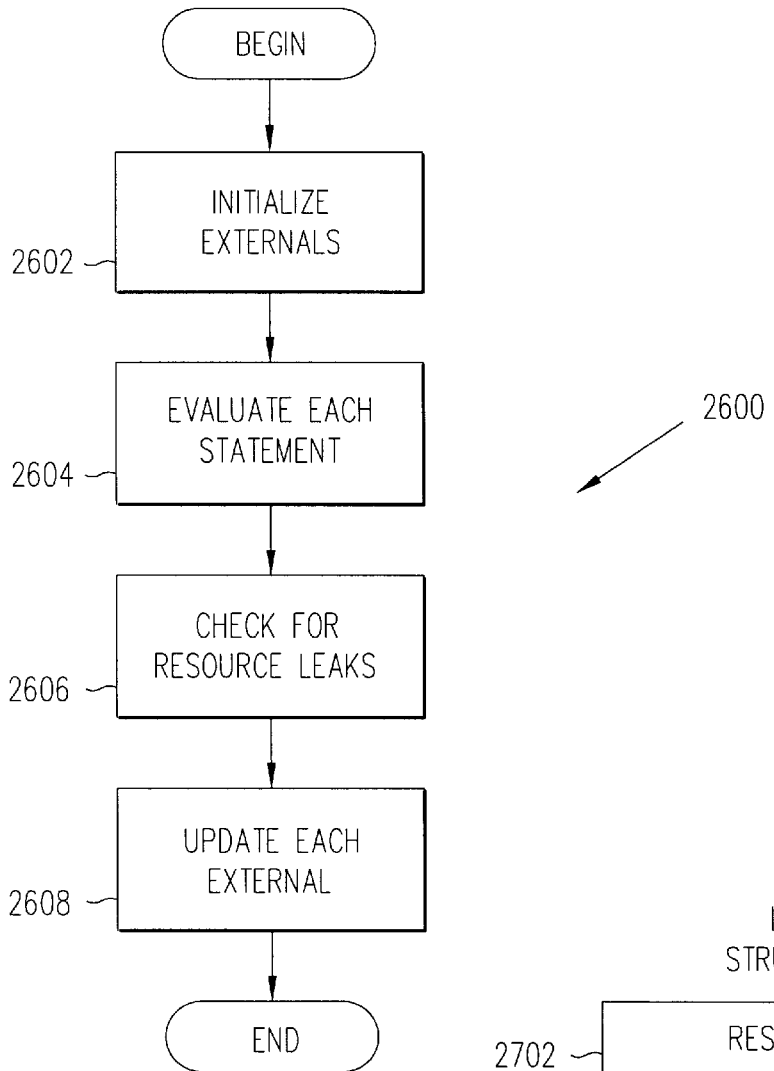
FIG. 26 is a logic flow diagram of a single iterative evaluation of a computer program component according to logic flow diagram 24.

After step 2504, processing according to logic flow diagram 2404, and therefore step 2404 (FIG. 24), terminates. Processing transfers from step 2404 to step 2408 in which the subject function is analyzed repeatedly as many times as determined in step 2404 described above. A single iteration of step 2408, i.e., a single analysis of the subject function is shown in logic flow diagram 2600 (FIG. 26).

A single iterative analysis of the subject function begins in step 2602 in which an external state structure for each external is initialized. An external state structure is initialized by first creating an item structure corresponding to the external state structure, and therefore corresponding to the external whose state is represented in the external state structure, then setting the DK and CP states of the external to state O. An item structure is a structure in memory 104 (FIG. 1) representing an item.

Item structure 2700 (FIG. 27) includes the following fields: a field "resource" 2702, a field "external" 2704, a field "value" 2706, a field "first_in_bunch" 2708, a field "size_of_bunch" 2710, a field "type_code" 2712, a field "initialized" 2714, a field "head_in_bunch" 2716, a field "known_bunch_size" 2718, and a field "invalid_pointer" 2720.

An item can be associated with a resource and/or an external. If the item represented by item structure 2700 is associated with a resource, field "resource" 2702 of item structure 2700 points to a resource state structure representing that resource. Conversely, if the item is not associated with a resource, field "resource" 2702 is NULL to so indicate. If the item represented by item structure 2700 is associated with an external, field "external" 2704 of item structure 2700 points to an external state structure representing that external. Conversely, if the item is not associated with an external, field "external" 2704 is NULL to so indicate.

Figure 27:
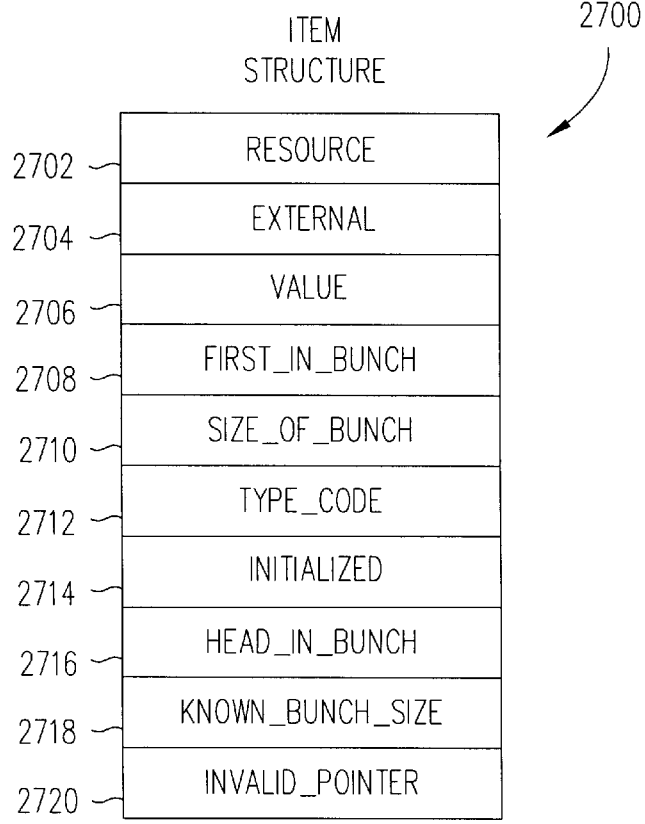
FIG. 27 is a block diagram of an item structure in accordance with an embodiment of the present invention.

Field "value" 2706 of item structure 2700 includes data defining the actual value of the item represented by item structure 2700. In other words, the data stored in field "value" 2706 represents the actual data stored in the location of memory 104 (FIG. 1) represented by the item represented in turn by item structure 2700 (FIG. 27). Field "type_code" 2712 of item structure 2700 specifies the type of data stored at the memory location of the item. The types of data supported in the disclosed embodiment include long, pointer, and double. As is true in most currently available implementations of the C computer language, "long" is a 32-bit signed integer, "pointer" is a value specifying an address in memory, e.g., memory 104, and "double" is a 64-bit floating point number. Within field "value" 2706 is a sub-field corresponding to each type. Only one sub-field is used, namely, the sub-field corresponding to the type of data specified in field "type_code" 2712.

Field "initialized" 2714 of item structure 2700 indicates whether the item represented by item structure 2700 is initialized, i.e., whether the item represented by item structure 2700 has a known value. Field "invalid_Pointer" 2720 of item structure 2700 indicates whether the item represented by item structure 2700 is known to be an invalid pointer. According to the C computer language, a pointer is valid if the pointer identifies a valid location in memory 104 (FIG. 1). Otherwise, the pointer is invalid. A NULL pointer is a specific invalid pointer which is chosen to be zero in many implementations of the C computer language. In one embodiment, fields "initialized" 2714 and "invalid_pointer" 2720 are each a single bit.

Fields "first_in_bunch" 2708, "size_of_bunch" 2710, "head_in_bunch" 2716, and "known_bunch_size" 2718 are used in analyzing bunches of memory. Bunches of memory are described in greater detail below.

Once the externals of the subject function are initialized in step 2602 (FIG. 26), processing transfers to step 2604. In step 2604, each statement of the subject function is evaluated. A statement is evaluated by emulating execution of the statement. Evaluation of a statement can result in the application of an operation to an external and/or to a resource resulting in a change in the state of the external and/or resource, respectively. Each statement is evaluated individually according to logic flow diagram 2800 (FIG. 28) as described more completely below.

Once each statement of the subject function is evaluated, processing transfers from step 2604 (FIG. 26) to step 2606. In step 2606, the states of the various resources of the subject function are checked for leaks. Step 2606 is shown in greater detail as logic flow diagram 2606 (FIG. 41) which is described more completely below. From step 2606, processing transfers to step 2608 in which each external of the subject function is updated. An external is updated by updating the composite DK, CP and RS states of the external according to the DK and CP states of the external, and according to the RS state of any resource associated with the external, resulting from the current iterative analysis of the subject function. The updating of a single external is illustrated by logic flow diagram 4200 (FIG. 42) which is described more completely below.

After step 2608 (FIG. 26), processing according to logic flow diagram 2600, and therefore a single iterative analysis of the subject function, terminates.

Evaluation of a Statement

Figure 28:
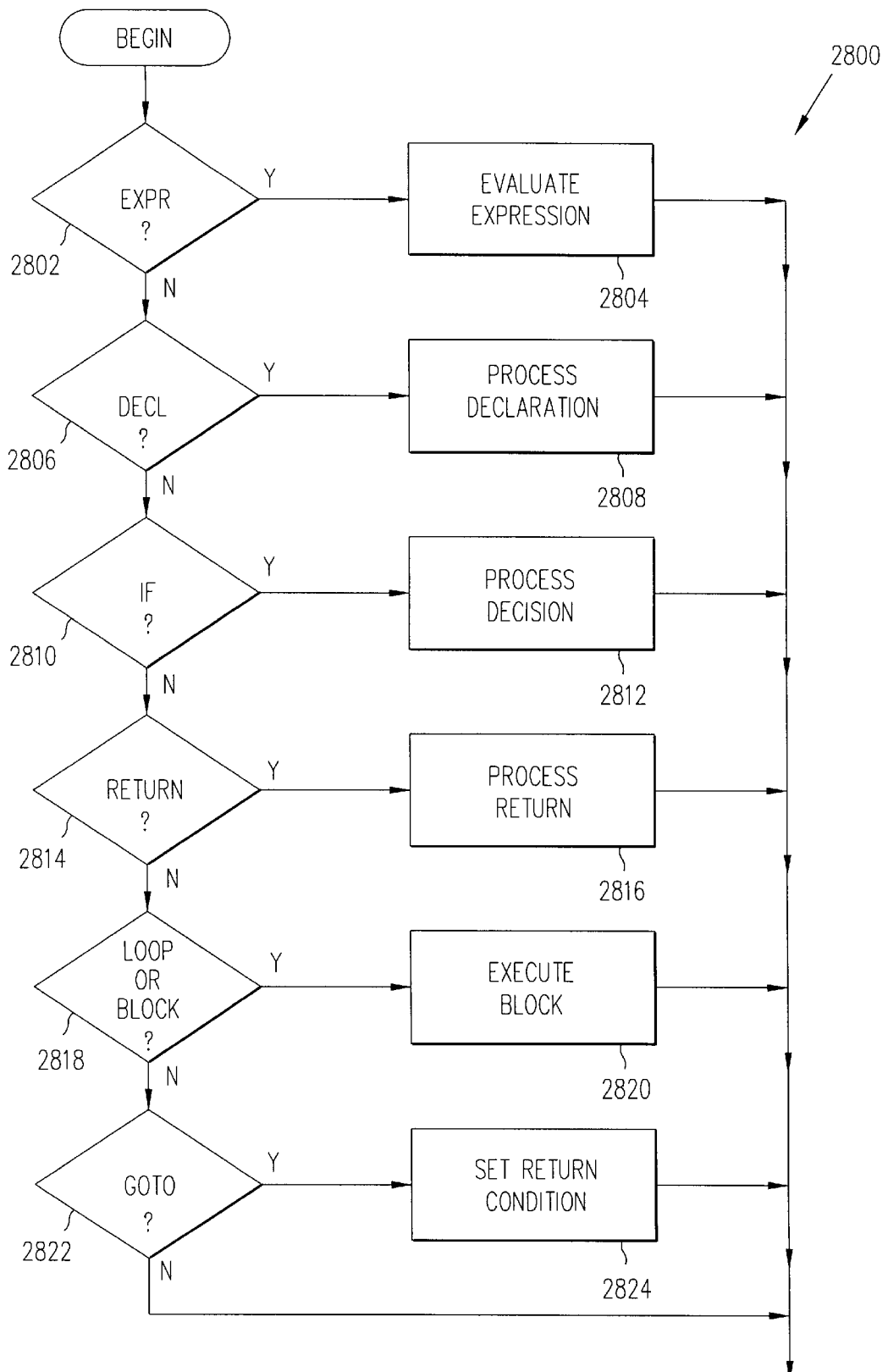
FIG. 28 is a logic flow diagram of the analysis of a statement in accordance with an embodiment of the present invention.

As described above, each statement of the subject function is evaluated individually according to logic flow diagram 2800 (FIG. 28). Processing begins in a test step 2802 in which execution engine 802 (FIG. 8) determines whether the statement is an expression by retrieving field "kind"

2102 (FIG. 21) of the statement structure representing the statement, i.e., the subject statement structure. The statement represented by the subject statement structure, i.e., the statement currently evaluated according to logic flow diagram 2800 (FIG. 28), is called the subject statement.

If the subject statement is an expression, i.e., if field "kind" 2102 indicates that the subject statement is an expression, processing transfers from test step 2802 (FIG. 28) to step 2804 in which execution engine 802 (FIG. 8) evaluates the expression, i.e., the subject statement. Execution engine 802 evaluates an expression by emulating execution of the functions and operators on the items included in the expression. Step 2804 (FIG. 28) is carried out according to logic flow diagram 2900 (FIG. 29) which is described in greater detail below.

As described more completely below, processing according to logic flow diagram 2900 can apply an operation to the item resulting from evaluation of an expression. In the context of step 2804, no operation is applied to the item of the expression. If, in test step 2802 (FIG. 28), the subject statement is not an expression, processing transfers to test step 2806.

In test step 2806, execution engine 802 (FIG. 8) compares field "kind" 2102 the subject statement structure to data indicating that the subject statement is a declaration. A defining declaration is a statement according to the C computer language which causes the creation of an item. A declaring declaration is a statement according to the C computer language directing CPU 102 (FIG. 1) to treat an item as if the item were of a specified type. Unless otherwise stated herein, a declaration is a defining declaration.

If the subject statement is a declaration, processing transfers from test step 2806 (FIG. 28) to step 2808 in which the declaration is processed and which is described in greater detail below. Conversely, if the subject statement is not a declaration, processing transfers from test step 2806 to test step 2810.

In test step 2810, execution engine 802 (FIG. 8) compares field "kind" 2102 (FIG. 21) of the subject statement structure to data indicating that the subject statement is an "if" statement. If the statement is an "if" statement, processing transfers from test step 2810 (FIG. 28) to step 2812 in which the subject statement is processed. Step 2812 is shown in greater detail as logic flow diagram 2812 (FIG. 35) which is described below. Conversely, if the subject statement is not an "if" statement, processing transfers from test step 2810 (FIG. 28) to test step 2814.

In test step 2814, execution engine 802 (FIG. 8) compares field "kind" 2102 (FIG. 21) of the subject statement structure to data indicating that the subject statement is a "return" statement. If the subject statement is a "return" statement, processing transfers from test step 2814 (FIG. 28) to step 2816 in which the statement is processed. Step 2816 is shown in greater detail as logic flow diagram 2816 (FIG. 39) which is described below. Conversely, if the subject statement is not a "return" statement, processing transfers from test step 2814 (FIG. 28) to test step 2818.

In test step 2818, execution engine 802 (FIG. 8) compares field "kind" 2102 (FIG. 21) of the subject statement to data indicating that the subject statement is a loop or a block statement. If the subject statement is a loop or a block statement, processing transfers from test step 2818 (FIG. 28) to step 2820 in which the statement is processed. Step 2820 is shown in greater detail as logic flow diagram 2820 (FIG. 40) which is described below. Conversely, if the subject statement is neither a loop statement nor a block statement, processing transfers from test step 2818 (FIG. 28) to test step 2822.

In test step 2822, execution engine 802 (FIG. 8) compares field "kind" 2102 (FIG. :21) of the subject statement structure to data indicating that the subject statement is a "goto" statement. If the subject statement is a "goto" statement, processing transfers from test step 2822 (FIG. 28) to step 2824 in which execution engine 802 (FIG. 8) stores in a control record, which is described more completely below, data indicating an "return" condition. The control record is used as described more completely below to properly transfer control through an emulated execution of the subject function. A "return" condition terminates an iterative analysis of the subject function.

If the subject statement is not a "goto" statement, processing according to logic flow diagram 2800 terminates.

After performance of any of steps 2804, 2808, 2812, 2816, 2820, or 2824, processing according to logic flow diagram 2800 terminates. Thus, evaluation of a statement by execution engine 802 (FIG. 8) is carried out by step 2804 (FIG. 28), 2808, 2812, 2816, 28:20, 2824, or 2828 according to whether the statement is an expression, a declaration, an "if" statement, a "return" statement, a block statement, a loop statement, or a "goto" statement, respectively.

Evaluation of an Expression

Figure 8:
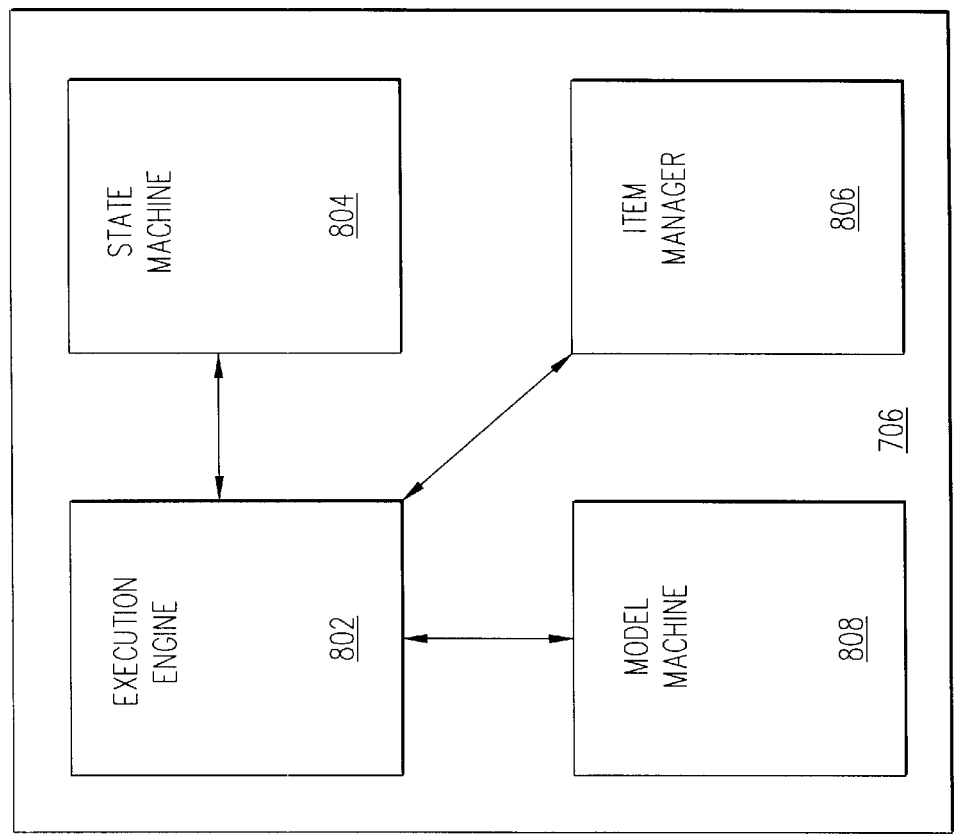
FIG. 8 is a block diagram of a dynamic inspection engine in accordance with the present invention.

As described above, an expression is evaluated according to logic flow diagram 2900 (FIG. 29), in which execution engine 802 (FIG. 8) causes a state machine 804, which is part of dynamic inspection engine 706, to apply an operation to the item of the expression if an operation is specified by execution engine 802. As further described above, in the context of step 2804 (FIG. 28), no such operation is specified by execution engine 802 (FIG. 8). By evaluating expressions, the disclosed embodiment of the present invention determines the effect of execution of a statement which is or includes an expression on the items which are operands of the expression.

Processing according to logic flow diagram 2900 (FIG. 29) begins in step 2902 in which processing prescribed by an operator in the expression is carried out to evaluate the expression. As described above, an expression is represented within dynamic inspection engine 706 (FIG. 7) by an expression structure such as expression structure 2200 (FIG. 22). Field "kind" 2202 of expression structure 2200 specifies the nature of the operator of the expression, and field "operands" 2210 contains the operands to which the operator is applied. Since the subject function is analyzed outside the context of an execution of the subject function within a computer process, initial values of externals of the subject function are not known. Therefore, an expression in the subject function may not evaluate to a known value. Thus, evaluation of an expression by execution engine 802 (FIG. 8) in step 2902 (FIG. 29) produces an item, if evaluating the expression produces a known or partially known value, or NULL, otherwise. As discussed more completely below, an item can have a partially known value. For example, an item can be known to have a value not equal to zero but the precise value of the item can still be unknown, in which case the value of the item is partially known. Step 2902 is shown in greater detail as logic flow diagram 2902 (FIGS. 33A, 33B, and 33C) and is described more completely below.

From step 2902 (FIG. 29), processing transfers to test step 2904 in which execution engine 802 (FIG. 8) determines whether evaluation of the expression produces an item rather than a NULL and whether an operation is to be applied to the item by state machine 804. If evaluation of the expression produces no item or if no operation is to be applied to the item, processing transfers from test step 2904 (FIG. 29) to step 2908 which is described below. Conversely, if evaluation of the expression produces an item and an operation is to be apply to the item, processing transfers from test step 2904 to step 2906 in which state machine 804 (FIG. 8) applies the operation to the item.

To apply an operation to the item of the evaluated expression, state machine 804 applies the operation to the external and the resource associated with the item if an external and a resource, respectively, are associated with the item. For example, field "external" 2704 of item structure 2700 (FIG. 27) points to an external state structure representing the external associated with the item represented by item structure. Similarly, field "resource" 2702 of item structure 2700 points to a resource state structure representing the resource associated with that item.

Figure 4A:
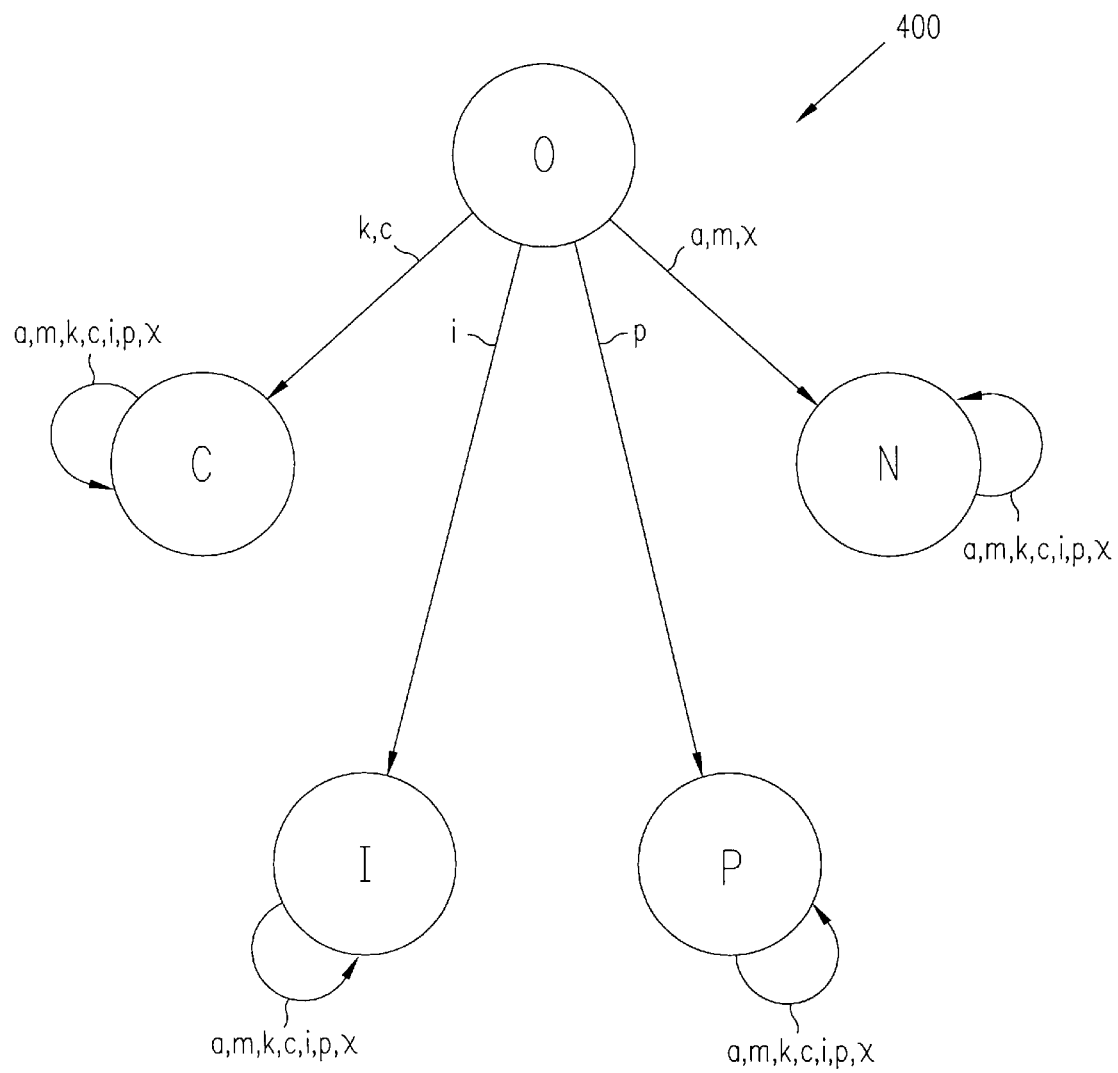
FIGS. 4A, 4B, 5A and 5B are state diagrams representing the modelling of an external according to one embodiment of the present invention.
Figure 4B:
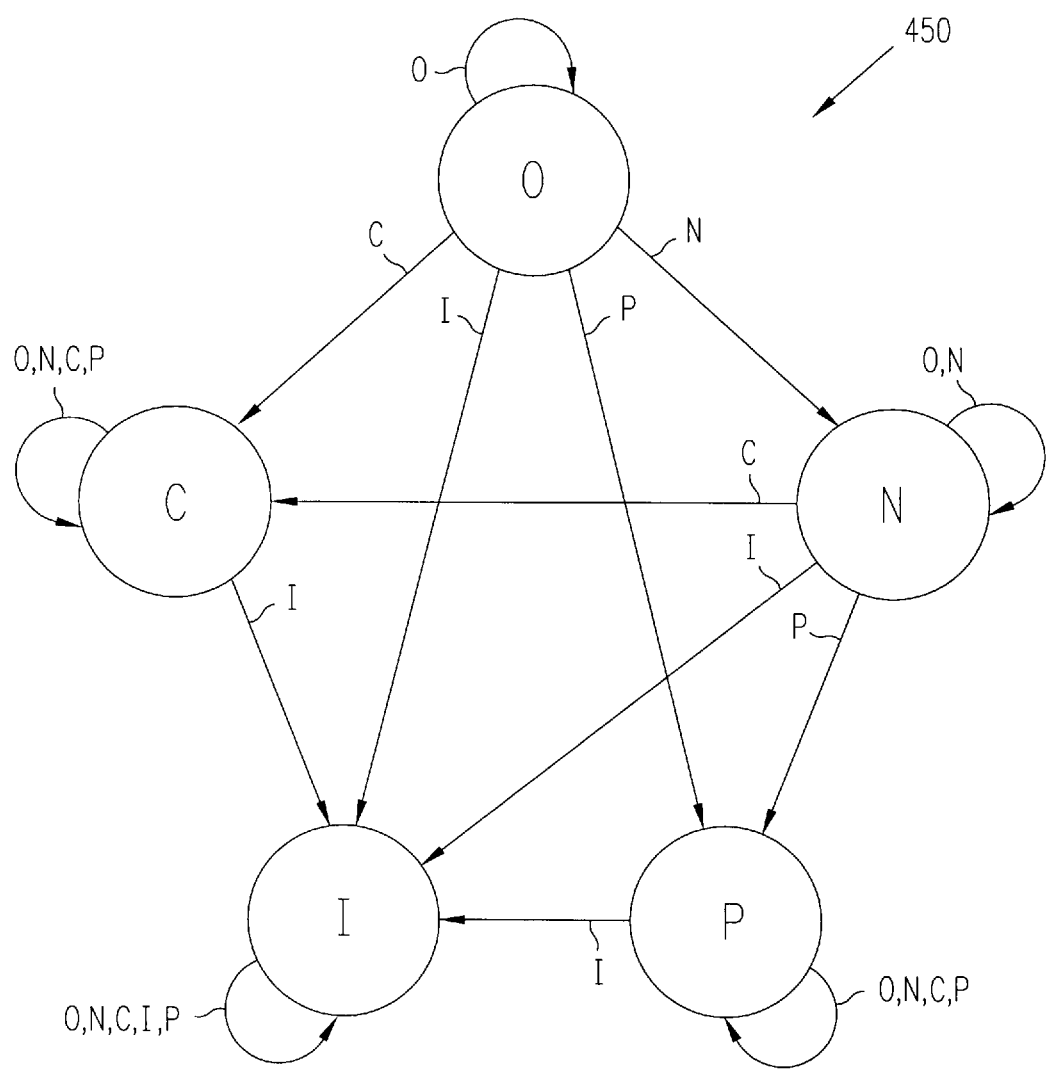
Figure 30:
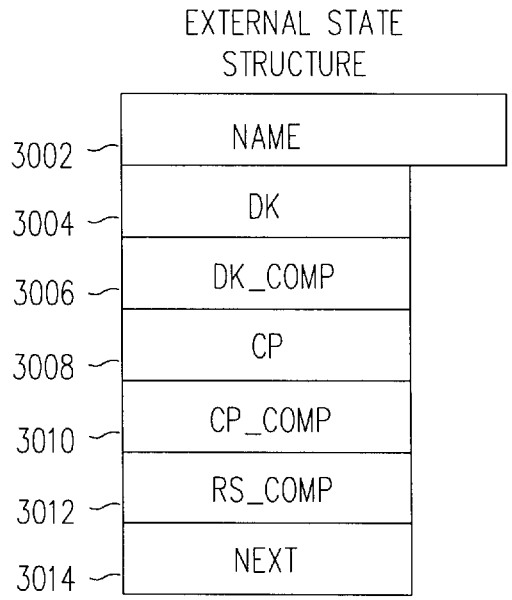
FIG. 30 is a block diagram of an external structure in accordance with an embodiment of the present invention.

The operation is applied to the external, for example, by updating fields "DK" 3004 (FIG. 30) and "CP" 3008 of external state structure 3000, which is the external state structure representing the external. Field "DK" 3004 is updated according to the operation applied to the external and according to state diagram 500 (FIG. 5A) as described above. For example, if field "DK" 3004 (FIG. 30) indicates state o and operation m is applied to the external, field "DK" 3004 is updated to indicate state Q. Field "CP" 3008 is updated according to state diagram 400 (FIG. 4A).

The operation is applied to the resource, for example, by updating fields "state" 3102 (FIG. 31) and "modified" 3108 of resource state structure 3100, which is the resource state structure representing the resource. Field "state" 3102 is updated according to state diagram 300 (FIG. 3A) as described above. Field "modified" 3108 (FIG. 31) is updated by storing in field "modified" 3108 data specifying the current line number, thereby indicating the statement last modifying the resource. The current line number is the line number of computer program 610 (FIG. 6) on which the subject statement is located. Reporting a programming error associated with a resource while indicating to the user the statement last modifying the resource assists the developer of the subject function in removing that programming error.

Figure 31:
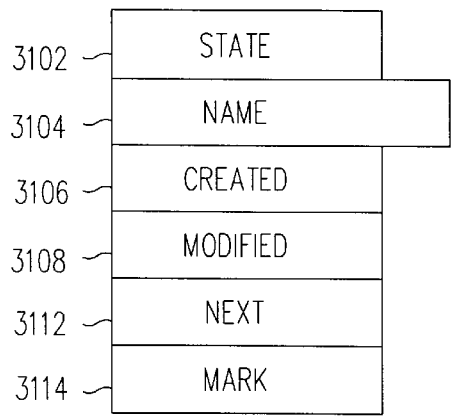
FIG. 31 is a block diagram of a resource structure in accordance with an embodiment of the present invention.
Figure 32:
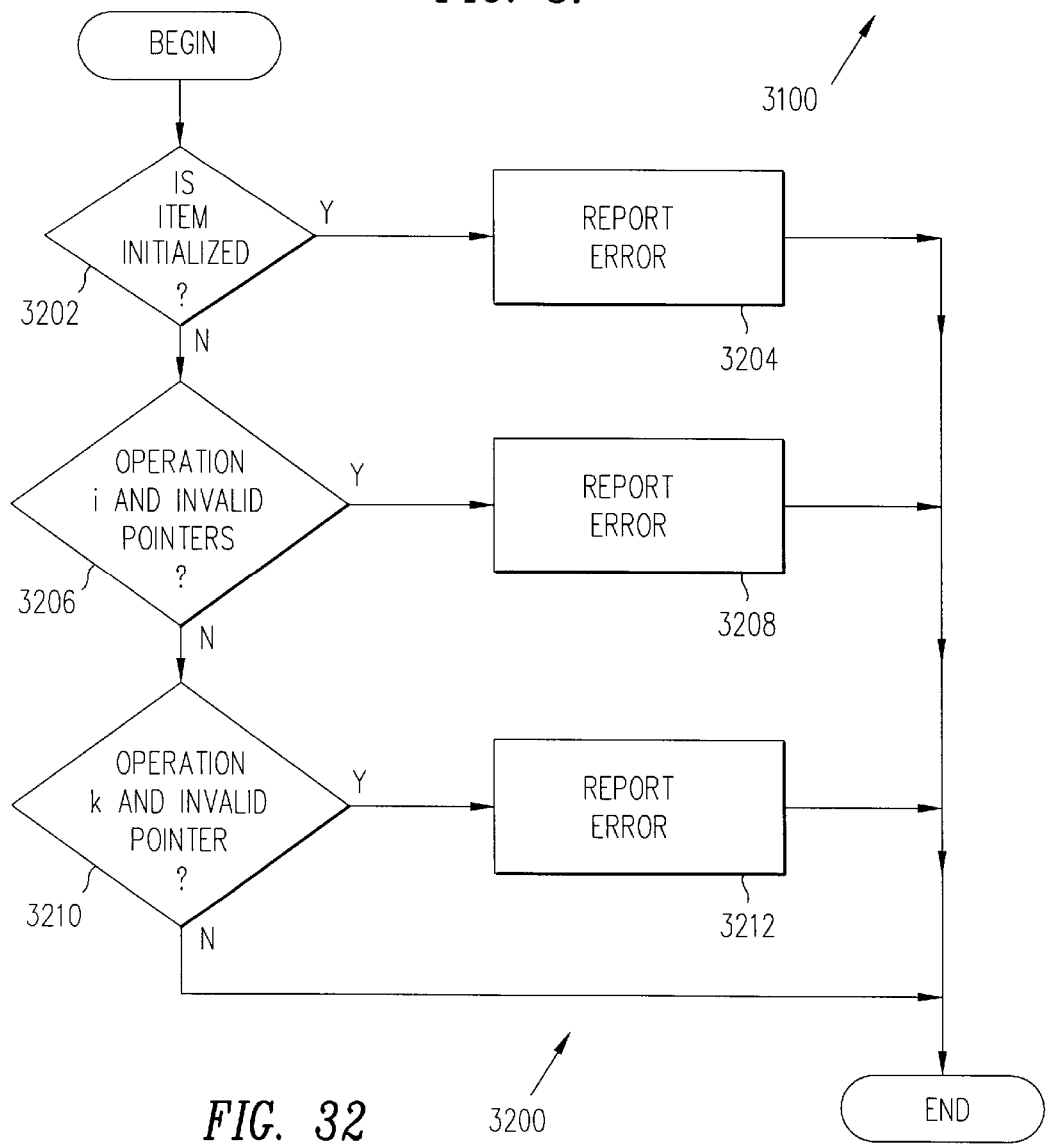
FIG. 32 is a logic flow diagram of the application of an operation to an item in accordance with an embodiment of the present invention.

If updating either of fields "DK" 3004 (FIG. 30) or "CP" 3008 of external state structure 3000 or if updating field "state" 3102 (FIG. 31) of resource state structure 3100 produces an error according to state diagrams 300, 400, or 500 (FIGS. 3A, 4, and 5, respectively) as described more completely above, the error is reported to the user. The item produced by evaluation of the expression is also checked for state violations according to logic flow diagram 3200 (FIG. 32).

In test step 3202 (FIG. 32), state machine 804 (FIG. 7) checks field "initialized" 2714 (FIG. 27) of item structure 2700 to determine whether the item represented by item structure 2700 is initialized. If the item is not initialized, processing transfers from test step 3202 (FIG. 32) to 3204 in which an error is reported. Since the steps of logic flow diagram 3200 are only performed within step 2906 (FIG. 29), an operation is being applied to the item in logic flow diagram 3200 (FIG. 32). Therefore, if the item is uninitialized, the item is used, as indicated by the application of an operation, before the item is initialized and this is an error.

If the item is initialized, processing transfers from test step 3202 to test step 3206. In test step 3206, state machine 804 (FIG. 8) determines whether the item is an invalid pointer, by examination of field "invalid_pointer" 2720 (FIG. 27) of item structure 2700, and compares the operation to be applied to operation i, i.e., an indirection operation. If the item is an invalid pointer and operation i is applied, processing transfers to step 3208 (FIG. 32) in which an error is reported. Conversely, if the item is not an invalid pointer or if an operation other than operation i is applied, processing transfers from test step 3206 to test step 3210.

In test step 3210, state machine 804 (FIG. 7) determines whether the item is an invalid pointer in the manner described above with respect to test step 3206 and compares the operation to be applied to operation k. In the context of the C computer language, it is an error to free an invalid pointer since doing so can corrupt data structures used by library functions to manage files and dynamically allocated memory. It is generally not an error to free a NULL pointer but such is generally considered poor programming practice and is reported as an error. If the item is an invalid pointer and operation k is applied to the item, processing transfers to step 3212 in which an error is reported. Conversely, if the item is not an invalid pointer or if an operation other than operation k is applied, processing according to logic flow diagram 3200 terminates. Additionally, after any of steps 3204, 3208, and 3212, processing according to logic flow diagram 3200 terminates.

Thus, in step 2906 (FIG. 29), an operation is applied to an item, including any resource or external associated with the item, and any errors are detected and reported to the user. From step 2906, processing transfers to step 2908. In addition, processing transfers directly from test step 2904 to step 2908 if no item is produced by evaluation of the expression or if no operation is to be applied to the expression as described above. In step 2908, execution engine 802 includes in the expression, i.e., the subject statement, the item, if one is produced, or an item whose value is NULL, otherwise. Specifically, execution engine 802 stores in field "item" 2206 (FIG. 22) of expression structure 2200, which represents the subject statement, a pointer to the item. Thus, future evaluations of the expression simply return the item to which field "item" 2206 points, thereby avoiding redundant processing. After step 2908 (FIG. 29), processing according to logic flow diagram 2900 terminates.

Constants

As described above, in step 2902 (FIG. 29), which is shown in greater detail as logic flow diagram 2902 (FIGS. 33A–C), execution engine 802 (FIG. 8) processes an expression as prescribed by an operator in the expression. Execution engine 802 processes the expression according to the type of operation. In test step 3301 (FIG. 33A), in which processing according to logic flow diagram 2902 begins, execution engine 802 (FIG. 8) determines whether the expression contains no operator but instead is a constant. If expression structure 2200 (FIG. 22) represents the expression of the subject statement, execution engine 802 (FIG. 8) makes such a determination by comparing field "kind" 2202 (FIG. 22) of expression structure 2200 to data indicating that the expression is a constant. A constant is an item whose value does not change during the execution of a computer process. For example, the expression, "10"is a constant which is an integer and always has a value of ten.

If the expression is not a constant, processing transfers to test step 3303 (FIG. 33A) which is described below. Conversely, if the expression is a constant, processing transfers from test step 3301 to step 3302. In step 3302, execution engine 802 (FIG. 8) creates an item structure representing the constant and initializes the item structure to have the value of the constant. After step 3302, processing according to logic flow diagram 2902, and thus step 2902 (FIG. 29), terminates.

Variables

As described above, if the expression is not a constant, processing transfers from test step 3301 (FIG. 33A) to test step 3303. In test step 3303, execution engine 802 (FIG. 8) determines whether the expression is a variable by comparing field "kind" 2202 (FIG. 22) of the expression structure representing the expression to data indicating that the expression is a variable. An expression which is a variable evaluates to the current value of the item of the variable. For example, if a previously processed statement of the subject function declares a variable whose identifier is "i", i.e., a variable "i", to be of the type "int", i.e. integer, the expression, "i", evaluates to the current value of the item of variable "i". If the expression is not a variable, processing transfers to test step 3305 (FIG. 33A) which is described below. Conversely, if the expression is a variable, processing transfers from test step 3303 to step 3304.

Figure 23:
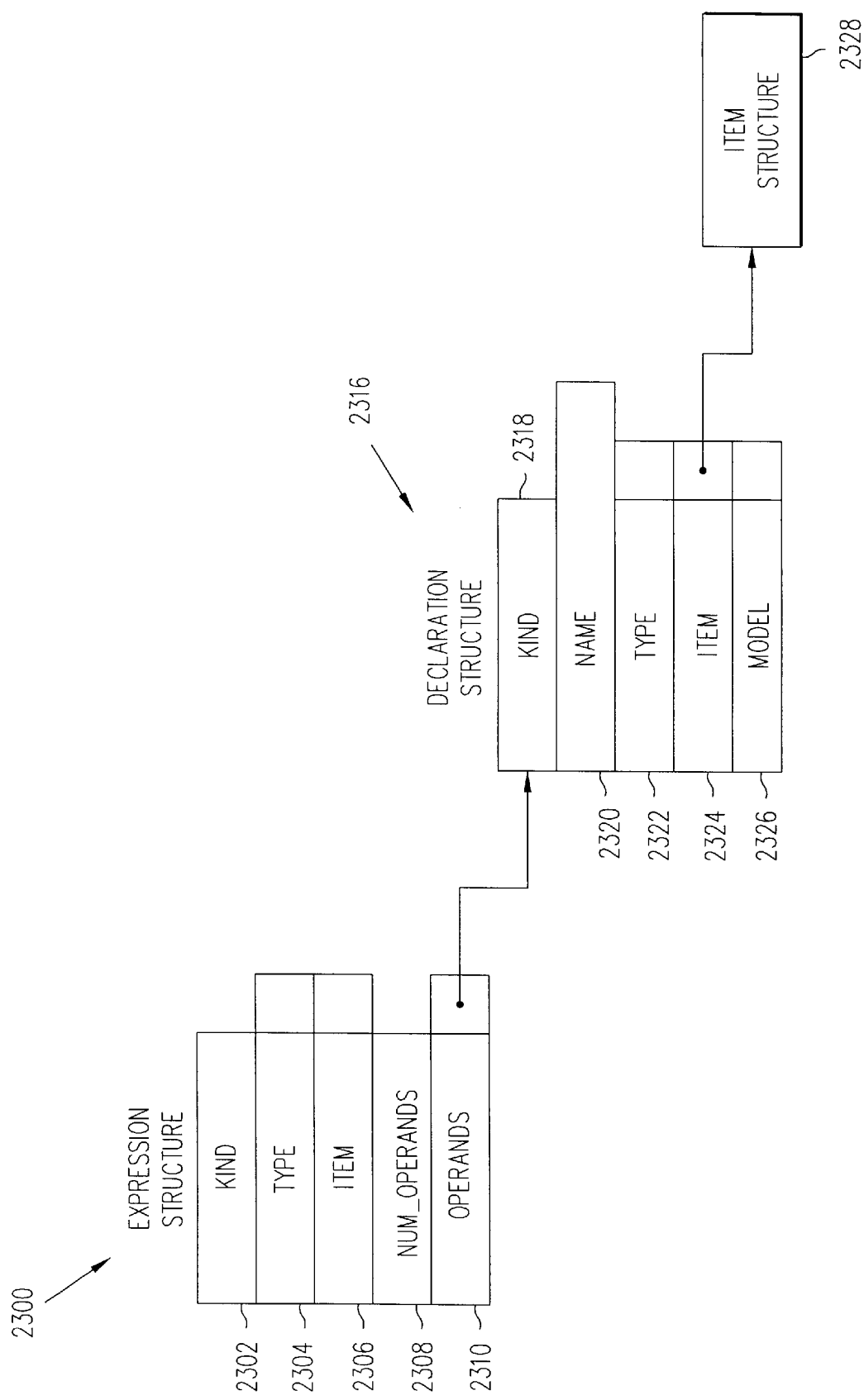
FIG. 23 is a block diagram of an expression structure, an associated declaration structure and an associated item structure in accordance with an embodiment of the present invention.

In step 3304, execution engine 802 (FIG. 8) retrieves the item of variable i. If expression structure 2300 (FIG. 23) represents the expression, i.e., represents a variable, (i) field "num_operands" 2308 contains the value one (1) specifying a single operand, and (ii) field "operands" 2310 is an array of a single pointer which points to a declaration structure 2316. Field "item" 2324 of declaration structure 2316 is retrieved as the value of expression 2300. If no item is associated with declaration structure 2316, then field "item" 2324 is NULL. Thus, either an existing item structure or NULL is retrieved in step 3304 (FIG. 33A). After step 3304, processing according to logic flow diagram 2902, and therefore step 2902 (FIG. 29), terminates.

Binary Operators

As described above, if the expression is not a declaration, processing transfers from test step 3303 (FIG. 33A) to test step 3305. In test step 3305, execution engine 802 (FIG. 8) determines whether the operator of the expression is a binary operator by comparing field "kind" 2202 (FIG. 22) of the expression structure representing the expression to data indicating a binary operator. A binary operator is an operator which operates on two operands and which is not a relational operator. For example, the expression "a+b" includes the binary operator "+" signifying addition. Relational operators are described below.

Figure 29:
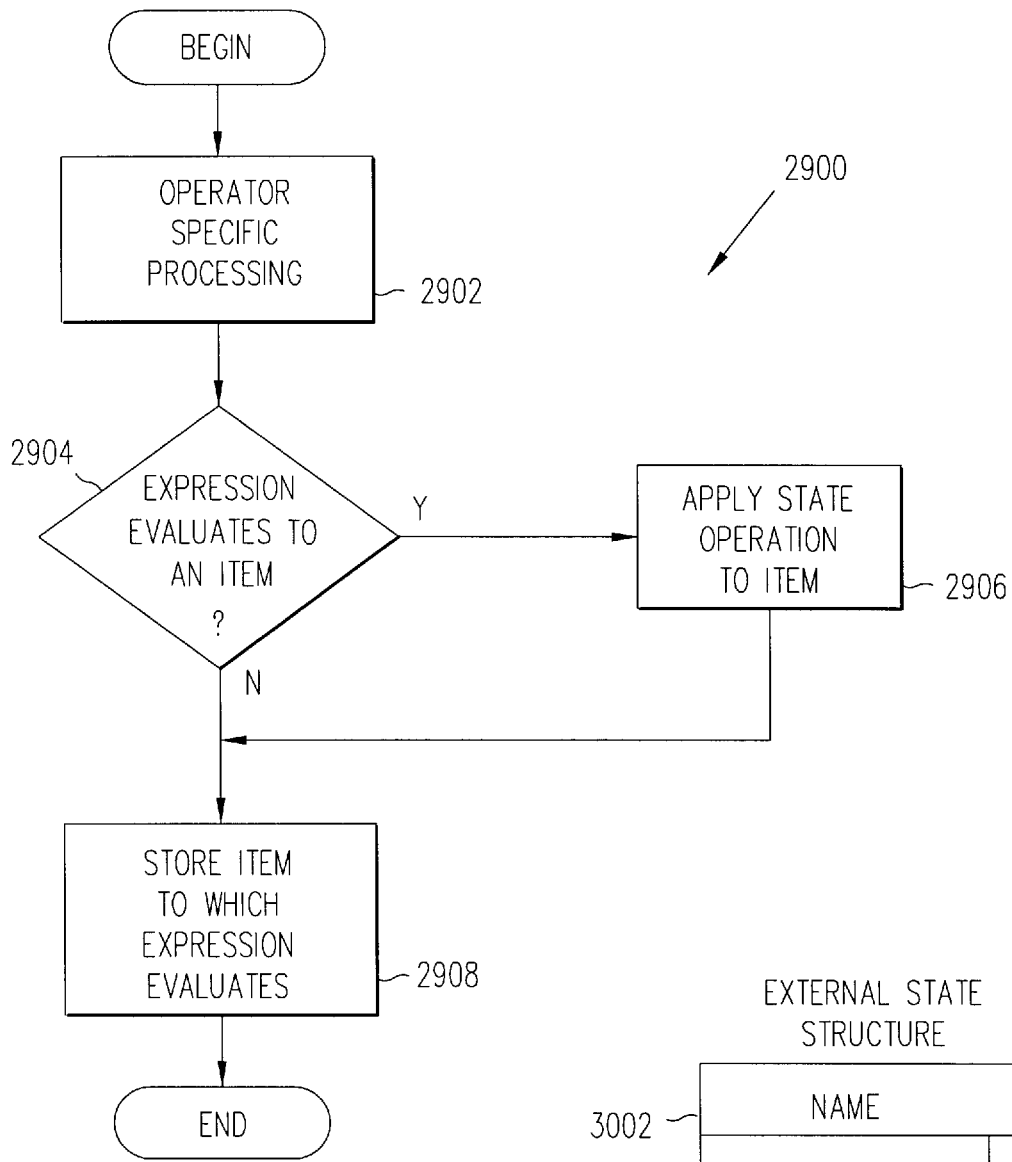
FIG. 29 is a logic flow diagram of the evaluation of an expression in accordance with an embodiment of the present invention.

If the operator of the expression processed according to logic flow diagram 2902 (FIG. 33A) is not a binary operator, processing transfers from test step 3305 to test step 3309. Conversely, if the operator of the expression is a binary operator, processing transfers from test step 3305 to step 3306. In step 3306, the left-hand side operand, i.e., the "lhs", is evaluated as an expression according to logic flow diagram 2900 (FIG. 29). The lhs of an expression which has two operands and which is represented by expression structure 2200 (FIG. 22) is represented by an expression structure which is the first element of field "operands" 2210. The lhs is evaluated according to logic flow diagram 2900 (FIG. 29) while applying operation c. The application of an operation according to logic flow diagram 2900 is described more completely above. Thus, evaluation of an expression according to logic flow diagram 2900 is performed recursively. In other words, evaluation of an expression according to logic flow diagram 2900 can cause evaluation of a subexpression of the expression according to logic flow diagram 2900. Recursive programming is a well-known technique.

A binary operator has a left-hand side operand and a right-hand side operand, i.e., "rhs". For example, the expression, "(a+b)*c", has a lhs of "(a+b)" and a rhs of "c", since the operator of the expression of highest precedence is "*", i.e., multiplication. The rhs of an expression which has two operands and which is represented by expression structure 2200 (FIG. 22) is represented by an expression structure which is the second element of field "operands" 2210. After the lhs of the expression is evaluated in step 3306 (FIG. 33A), processing transfers to step 3307 in which execution engine 802 (FIG. 8) evaluates the rhs of the expression according to logic flow diagram 2900 (FIG. 29) applying operation c. Operation c is applied to both the lhs and rhs of the expression since each is used in a calculation. Inappropriate use of either the lhs or rhs of the expression in such a calculation generates an error message by application of the operation as described above.

From step 3307 (FIG. 33A), processing transfers to step 3308 in which the binary operator of the expression is used to evaluate the expression. The data type of the lhs and the rhs of the expression influence the type of operation invoked by the operator. The types of operations performed for specific operators on specific types of operands according to the C computer language are well-known and are described in the C Standard at Section 6.3 et seq.

An operator of an expression is applied to the operand or operands of the expression in accordance with the prescribed application of the operator described in the C Standard. For example, if the operator is the arithmetic addition operator (i.e., "+", the result of application of the operator to two operands is the arithmetic sum of the two operands. As a second example, if the operator is the relational greater than operator (i.e., ">", the result of application of the operator to two operands, i.e., the lhs and the rhs, is a boolean value of "true" if the value of the lhs is greater than the value of the rhs, or a boolean value of "false" otherwise.

It is not imperative that every operator of the C computer language be properly applied by execution engine 802 (FIG. 8) for resource checker 602 (FIG. 6) to detect improper uses of resources in computer program 610. If an expression includes an operator which cannot be applied by execution engine 802 (FIG. 8), the expression evaluates to a NULL to indicate that the expression evaluates to an item whose value is unknown. However, it is preferred that execution engine 802 can apply as many of the operators of the C computer language as possible as such improves the accuracy in detection of improper uses of resources by resource checker 602.

After step 3308 (FIG. 33A), processing according to logic flow diagram 2902, and therefore step 2902 (FIG. 29), terminates.

Relational Operators

As described above, if the operator of the expression is not a binary operator, processing transfers from test step 3305 (FIG. 33A) to test step 3309. In test step 3309, execution engine 802 (FIG. 8) determines whether the operator of the expression is a relational operator. A relational operator is an operator which operates on two operands, i.e., an lhs and a rhs, to produce as a result an item whose value corresponds to a boolean value by comparison of the values of the two operands. A boolean value is either "true" or "false". Examples of relational operators include "==" (equal to), ">=" (greater than or equal to), "<=" (less than or equal to), and "!=" (not equal to).

If the operator of the expression is not a relational operator, processing transfers from test step 3309 (FIG.

33A) to test step 3313 which is described below. Conversely, if the operator of the expression is a relational operator, processing transfers from test step 3309 to step 3310. In step 3310, execution engine 802 (FIG. 8) evaluates the lhs of the expression as an expression according to logic flow diagram 2900 (FIG. 29) while applying operation p. From step 3310 (FIG. 33A), processing transfers to step 3311 in which execution engine 802 (FIG. 8) evaluates the rhs of the expression according to logic flow diagram 2900 (FIG. 29) applying operation p. Operation p is applied to both the lhs and rhs of the expression since each is used in a comparison. Inappropriate use of either the lhs or rhs of the expression in such a comparison generates an error message by application of the operation as described above.

Processing transfers from step 3311 (FIG. 33A) to step 3312 in which the relational operator of the expression is used to evaluate the expression. Step 3312 is analogous to step 3308, which is described above. After step 3312, processing according to logic flow diagram 2902, and therefore step 2902 (FIG. 29), terminates.

Unary Operators

As described above, if the operator of the expression is not a relational operator, processing transfers from test step 3309 (FIG. 33A) to test step 3313. In test step 3313, execution engine 802 (FIG. 8) determines whether the operator of the expression is a unary operator by comparison of field "kind" 2202 (FIG. 22) of the expression structure representing the expression to data indicating a unary operator. A unary operator is an operator which specifies an operation having a single operand. For example, the expression, "−a", includes the single operand "a" and a unary operator "−" which specifies a numeric negation operation on operand "a". If an expression has one operand and is represented by expression structure 2200, the single operand of the expression is represented by the expression structure that is the first element of field "operands" 2210.

If the operator of the expression is not a unary operator, processing transfers from test step 3313 (FIG. 33A) to test step 3317 (FIG. 33B) as described below. Conversely, if the operator of the expression is a unary operator, processing transfers from test step 3313 (FIG. 33A) to step 3314. In step 3314, execution engine 802 (FIG. 8) evaluates the operand of the expression as an expression according to logic flow diagram 2900 (FIG. 29) while applying operation c. Operation c is applied to the operand of the expression since the operand is used in a calculation. Inappropriate use of the operand of the expression in such a calculation generates an error message by application of the operation as described above.

Processing transfers from step 3314 (FIG. 33A) to step 3315 in which the unary operator of the expression is used to evaluate the expression. Step 3315 is analogous to step 3308, which is described above. After step 3315, processing according to logic flow diagram 2902, and therefore step 2902 (FIG. 29), terminates.

Processing by Specific Operator

Figure 33B:
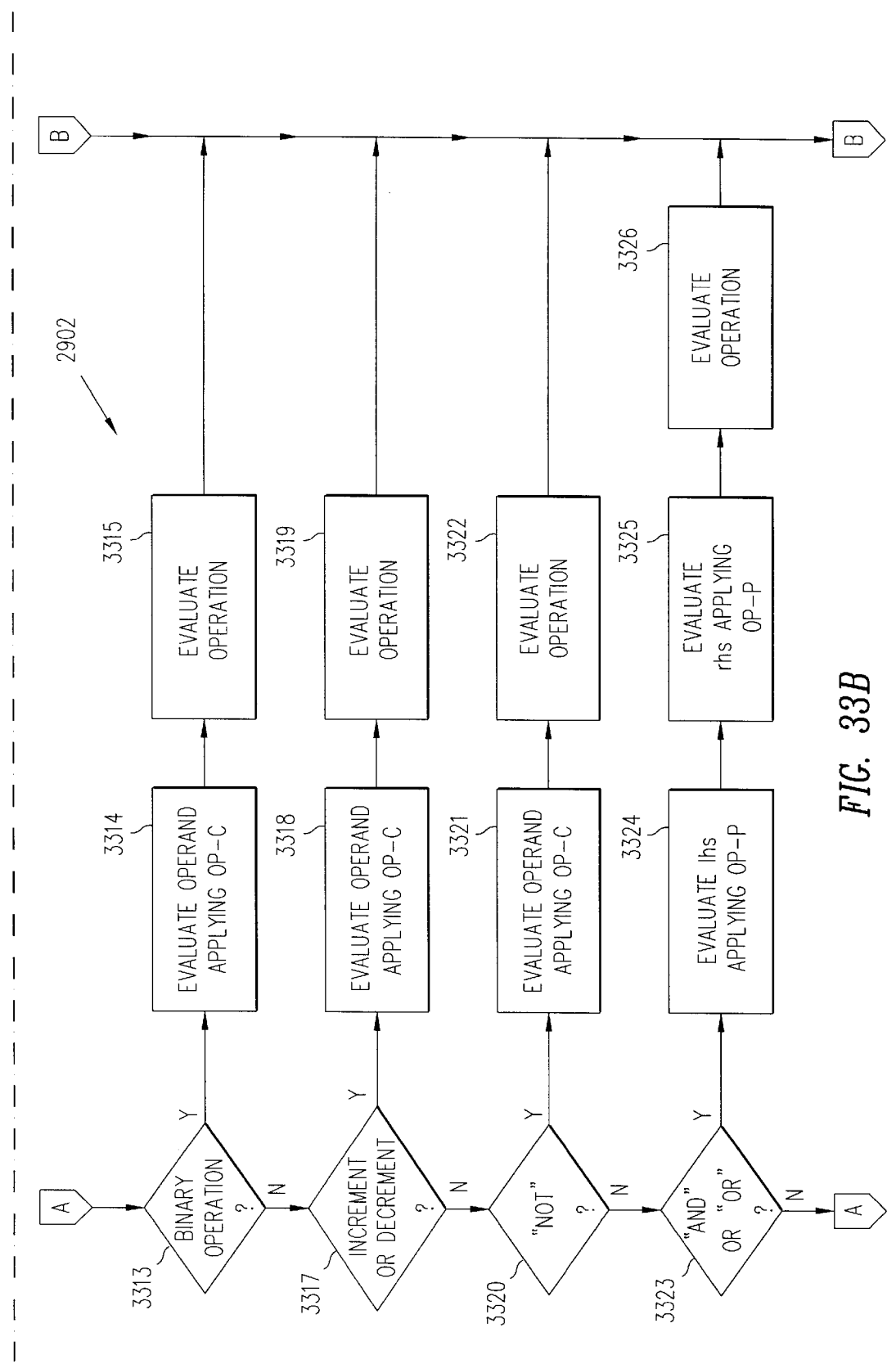

As described above, if the operator of the expression is not a unary operator, processing transfers from test step 3313 (FIG. 33A) to test step 3317 (FIG. 33B). As further described above, the above-described steps of logic flow diagram 2902 process the expression according to the type of operator of the expression. In test step 3317 and the steps with follow, execution engine 802 (FIG. 8) processes the expression according to the specific operator of the expression if the operator of the expression is not among the types of operators for which test steps 3301 (FIG. 33A), 3303, 3305, 3309 and 3313 test.

Incrementing or Decrementing Operator

In step 3317 (FIG. 33B), execution engine 802 (FIG. 8) compares the operator of the expression to an incrementing operator and to a decrementing operator. In other words, if expression structure 2200 (FIG. 22) represents the expression, execution engine 802 compares field "kind" 2202 (FIG. 22) to data specifying an incrementing or decrementing operator. An incrementing or decrementing operator operates on a single operand and increments or decrements, respectively, the operand. If the operator of the expression is neither an incrementing nor a decrementing operator, processing transfers to test step 3320 (FIG. 33B) which is described below. Conversely, if the operator of the expression is an incrementing or a decrementing operator, processing transfers from test step 3317 to step 3318.

In step 3318, execution engine 802 (FIG. 8) evaluates the operand according to logic flow diagram 2900 (FIG. 29) applying operation c since the operand is used in a computation. As described above, any errors resulting from application of operation c to the operand are detected and reported.

Processing transfers from step 3318 (FIG. 33B) to step 3319 in which the incrementing or decrementing operator of the expression is used to evaluate the expression. Step 3319 is analogous to step 3308 (FIG. 33A), which is described above. After step 3319 (FIG. 33B), processing according to logic flow diagram 2902, and therefore step 2902 (FIG. 29), terminates.

"Not" Operator

As described above, if the operator of the expression is neither an incrementing nor a decrementing operator, processing transfers from test step 3317 (FIG. 33B) to test step 3320. In test step 3320, execution engine 802 (FIG. 8) compares the operator of the expression to the "not" operator of the C computer language by comparing field "kind" 2202 (FIG. 22) of the expression structure representing the expression to data specifying the "not" operator. The "not" operator operates on a single operand and produces an item having a value corresponding to the boolean value which is the result of the logical negation of the operand, treating the operand as a boolean item itself. A boolean item is an item whose value corresponds to a boolean value of either true or false.

If the operator of the expression is not a "not" operator, processing transfers from test step 3320 (FIG. 33B) to test step 3323. Conversely, if the operator of the expression is a "not" operator, processing transfers from test step 3320 to step 3321. In step 3321, execution engine 802 (FIG. 8) evaluates the operand according to logic flow diagram 2900 (FIG. 29) applying operation p since the operand is used in a truth computation. As described above, any errors resulting from application of operation p to the operand are detected and reported.

Processing transfers from step 3321 (FIG. 33B) to step 3322 in which the "not" operator is used to evaluate the expression. Step 3322 is analogous to step 3308 (FIG. 33A), which is described above. After step 3322 (FIG. 33B), processing according to logic flow diagram 2902, and therefore step 2902 (FIG. 29), terminates.

"And" and "Or" Operators

As described above, if the operator of the expression is not a "not" operator, processing transfers from test step 3320

(FIG. 33B) to test step 3323. In test step 3323, execution engine 802 (FIG. 8) compares the operator of the expression to the "and" and the "or" operators of the C computer language by comparison of field "kind" 2202 (FIG. 22) of the expression structure representing the expression to data specifying the "and" and the "or" operators. The "and" and the "or" operators operate on two operands, i.e., lhs and rhs, and produce an item having a boolean value which is the result of the logical conjunction or disjunction, respectively, of the operands, treating the operands as boolean items.

If the aerator of the expression is neither an "and" nor an "or" operator, processing transfers from test step 3323 (FIG. 33B) to test step 3327. Conversely, if the operator of the expression is an "and" or an "or" operator, processing transfers from test step 3323 to step 3324.

In step 3324, execution engine 802 (FIG. 8) evaluates the lhs of the expression as an expression itself according to logic flow diagram 2900 (FIG. 29) while applying operation p. From step 3324 (FIG. 33B), processing transfers to step 3325 in which execution engine 802 (FIG. 8) evaluates the rhs of the expression according to logic flow diagram 2900 (FIG. 29) applying operation p. Operation p is applied to both the lhs and rhs of the expression since each is used in a truth computation. Inappropriate use of either the lhs or rhs of the expression in such a truth computation generates an error message by application of operation p as described above.

Processing transfers from step 3325 (FIG. 33B) to step 3326 in which the "and" or "or" operator of the expression is used to evaluate the expression. Step 3326 is analogous to step 3308 (FIG. 33A), which is described above. After step 3326 (FIG. 33B), processing according to logic flow diagram 2902, and therefore step 2902 (FIG. 29), terminates.

Compound Operator

As described above, if the operator of the expression is neither an "and" nor an "or" operator, processing transfers from test step 3323 (FIG. 33B) to test step 3327. In test step 3327, execution engine 802 (FIG. 8) determines whether the operator of the expression is a compound operator by comparison of field "kind" 2202 (FIG. 22) of the expression structure representing the expression to data specifying a compound operator. According to the C computer language, a compound operator, i.e., a comma (","), operates on two operands, i.e., the lhs and rhs of the expression, and produces as a result an item having the value to which the rhs evaluates. In other words, the two operands are evaluated independently and the value to which the rhs of the expression evaluates is the value of the expression.

If the operator of the expression is not a compound operator, processing transfers from test step 3327 (FIG. 33B) to test step 3330. Conversely, if the operator of the expression is a compound operator, processing transfers from test step 3327 to step 3328.

In step 3328, execution engine 802 (FIG. 8) evaluates the lhs of the expression as an expression itself according to logic flow diagram 2900 (FIG. 29) while applying no operation. From step 3328 (FIG. 33B), processing transfers to step 3329 in which execution engine 802 (FIG. 8) evaluates the rhs of the expression according to logic flow diagram 2900 (FIG. 29). The operation applied in the evaluation of the expression containing the compound operator according to logic flow diagram 2900 is similarly applied to the rhs in evaluating the rhs in step 3329 (FIG. 33B). The item produced by evaluation of the rhs of the expression is returned as the item of the expression itself.

After step 3329 (FIG. 33B), processing according to logic flow diagram 2902, and therefore step 2902 (FIG. 29), terminates.

Indirection Operator

As described above, if the operator of the expression is not a compound operator, processing transfers from test step 3327 (FIG. 33B) to test step 3330. In test step 3330, execution engine 802 (FIG. 8) determines whether the operator of the expression is an indirection operator by comparison of field "kind" 2202 (FIG. 22) of the expression structure representing the expression to data specifying an indirection operator. According to the C computer language, an indirection operator (i.e., "*") operates on a single operand and produces as a result an item whose value is the value stored in memory, e.g., memory 104 (FIG. 1), at the address indicated by the operand. For example, the expression "*a" evaluates to an item whose value is the value stored in memory at address "a". An indirection operator can also be used to reference an element of an array. For example, the second element of the array defined by the declaration "int array[10]" can be specified by either "array[1]" or "*(array+1)". The latter expression refers to the value stored at an offset from the begin of the array of the size of an element of the array, i.e., to the value of the item of the second element of the array.

If the operator of the expression is not an indirection operator, processing transfers from test step 3330 (FIG. 33B) to test step 3335. Conversely, if the operator of the expression is an indirection operator, processing transfers from test step 3330 to test step 3331.

In test step 3331, execution engine 802 (FIG. 8) determines whether the operand is an array. If expression structure 2200 (FIG. 22) represents the operand, field "type" 2204 (FIG. 22) points to a type structure specifying the type of the operand. If, for example, type structure 1612 (FIG. 17) is pointed to by field "type" 2204 (FIG. 22) of expression structure 2200, execution engine 802 (FIG. 8) determines whether the operand is an array by comparison of field "kind" 1702 (FIG. 17) to data specifying an array.

If the operand is an array, processing transfers from test step 3331 (FIG. 33B) to step 3332 in which execution engine 802 (FIG. 8) evaluates the operand as an expression itself according to logic flow diagram 2900 (FIG. 29) while applying no operation and treating the operator as an array indirection, i.e., as a reference to an element of an array of the form "*(array+1)" described above. Conversely, if the operand is not an array, processing transfers from test step 3331 (FIG. 33B) to step 3333 in which execution engine 802 (FIG. 8) evaluates the operand of the expression according to logic flow diagram 2900 (FIG. 29) applying operation i and treating the operator as a pointer indirection, e.g., as described above for the expression "*a".

Processing transfers from either step 3332 (FIG. 33B) or step 3333 to step 3334 in which execution engine 802 (FIG. 8) dereferences the operand. In dereferencing the operand, the expression evaluates to the item to which the operand points. If the operand does not point to an item, the expression evaluates to a NULL. After step 3334 (FIG. 33B), processing according to logic flow diagram 2902, and therefore step 2902 (FIG. 29), terminates.

Component Reference Operator

As described above, if the operator of the expression is not an indirection operator, processing transfers from test step 3330 (FIG. 33B) to test step 3335. In test step 3335, execution engine 802 (FIG. 8) determines whether the operator of the expression is a component reference operator by comparison of field "kind" 2202 (FIG. 22) of the expression structure representing the expression to data specifying a component reference operator. According to the C computer language, a component reference operator (i.e., "." or "->") operates on two operands, i.e., the lhs and rhs of the expression, and produces as a result the field item of the lhs specified by the rhs. For example, the declaration "struct {int a; char *b} c, *d" declares an item "c" and a pointer "d" to a second item, each having a first field item "a" of type "int", i.e., integer, and a second field item "b" which points to data of type "char", i.e., character. The expression "c.a" evaluates to the integer field item of item "c". Similarly, the expression "d->" all evaluates to the integer field item of the item to which pointer "d" points.

Figure 33C:
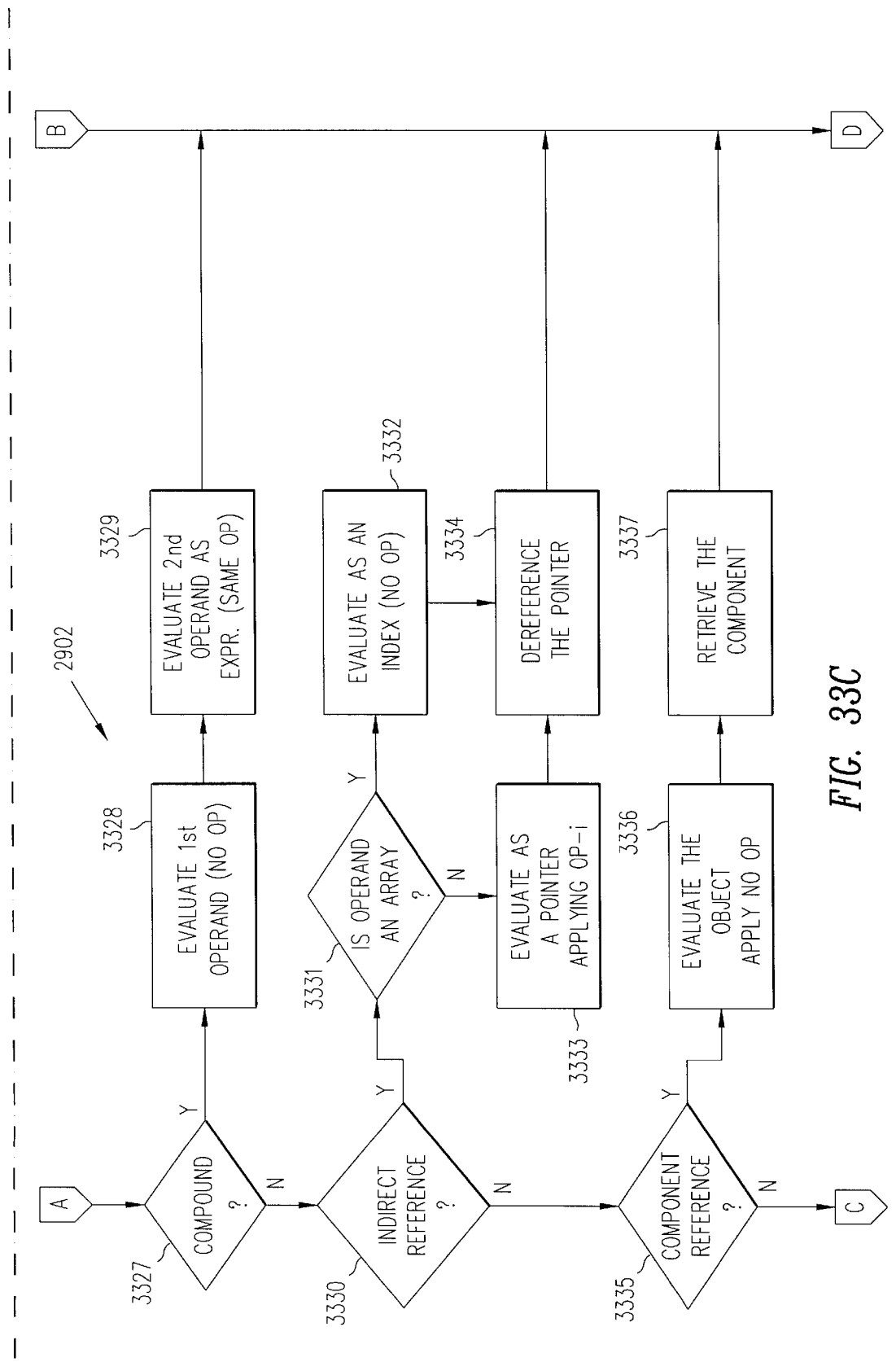

If the operator of the expression is not a component reference operator, processing transfers from test step 3335 (FIG. 33B) to test step 3338 (FIG. 33C). Conversely, if the operator of the expression is a component reference operator, processing transfers from test step 3335 (FIG. 33B) to step 3336.

In step 3336, execution engine 802 (FIG. 8) evaluates the lhs of the expression according to logic flow diagram 2900 (FIG. 29) while applying no operation. From step 3336 (FIG. 33B), processing transfers to step 3337 in which execution engine 802 (FIG. 8) retrieves the field specified by the rhs of the expression. After step 3337, processing according to logic flow diagram 2902, and therefore step 2902 (FIG. 29), terminates.

Array Reference Operator

As described above, if the operator of the expression is not a component operator, processing transfers from test step 3335 (FIG. 33B) to test step 3338 (FIG. 33C). In test step 3338, execution engine 802 (FIG. 8) determines whether the operator of the expression is an array reference operator by comparison of field "kind" 2202 (FIG. 22) of the expression structure representing the expression to data specifying an array reference operator. According to the C computer language, an array reference operator (i.e., "[ ]"operates on two operands, i.e., the lhs and rhs of the expression, and produces as a result the element of the array of the lhs specified by the rhs. For example, the declaration "int array [10]" declares an array of ten integers. The expression "array [b]" evaluates to the integer element of the array "array" at the position indicated by item "b". Item "b", i.e., the rhs, is sometimes called an index.

According to the C computer language, an array reference operator can also be used to reference offsets from non-array pointers. For example, if "datum" is a variable of the type "int", the expression "datum [2]" evaluates to the data stored in memory 104 (FIG. 1) at an offset of two memory locations from the item representing variable "datum". Two memory locations is equal to the length of two variables of the type of variable "datum", i.e., of the type "int". As described above, in the context of the C computer language, "array [i]" and "*(array+i)" are equivalent expressions (see the C Standard at Section 6.3.2.1).

If the operator of the expression is not an array reference operator, processing transfers from test step 3338 (FIG. 33C) to test step 3344. Conversely, if the operator of the expression is an array reference operator, processing transfers from test step 3338 to step 3339.

In step 3339, execution engine 802 (FIG. 8) evaluates the index of the expression according to logic flow diagram 2900 (FIG. 29) while applying operation c since the index is used in a computation. From step 3339 (FIG. 33C), processing transfers to test step 3340 in which execution engine 802 (FIG. 8) determines whether the lhs is an array in the manner described above with respect to test step 3331 (FIG. 33B). If the lhs is an array, processing transfers from test step 3340 (FIG. 33C) to step 3341 in which execution engine 802 (FIG. 8) evaluates the rhs of the expression as an index according to logic flow diagram 2900 (FIG. 29) while applying no operation. Conversely, if the lhs is not an array, processing transfers from test step 3340 (FIG. 33C) to step 3342 in which execution engine 802 (FIG. 8) evaluates the rhs of the expression as a pointer according to logic flow diagram 2900 (FIG. 29) applying operation i.

Processing transfers from either step 3341 (FIG. 33C) or step 3342 to step 3343 in which execution engine 802 (FIG. 8) retrieves the element, which is specified by the rhs, of the array, which is specified by the lhs. After step 3343 (FIG. 33C), processing according to logic flow diagram 2902, and therefore step 2902 (FIG. 29), terminates.

Address Operator

As described above, if the operator of the expression is not an array operator, processing transfers from test step 3338 (FIG. 33C) to test step 3344. In test step 3344, execution engine 802 (FIG. 8) determines whether the operator of the expression is an address operator by comparison of field "kind" 2202 of the expression structure representing the expression to data specifying an address operator. According to the C computer language, an address operator (i.e., "&") operates on a single operand and produces as a result an item whose value is the address of the operand. For example, the expression "&a" evaluates to an item whose value is the address within memory, e.g., memory 104, at which item "a" is stored.

If the operator of the expression is not an address operator, processing transfers from test step 3344 (FIG. 33C) to test step 3347. Conversely, if the operator of the expression is an address operator, processing transfers from test step 3344 to step 3345.

In step 3345, execution engine 802 (FIG. 8) evaluates the operand according to logic flow diagram 2900 (FIG. 29) while applying no operation. From step 3345 (FIG. 33C), processing transfers to test step 3346 in which the address operator is used to evaluate the expression. In other words, the address of the operand is determined. Step 3346 is analogous to step 3308 (FIG. 33A), which is described above. After step 3346 (FIG. 33C), processing according to logic flow diagram 2902, and therefore step 2902 (FIG. 29), terminates.

Call to a Function

As described above, if the operator of the expression is not an address operator, processing transfers from test step 3344 (FIG. 33C) to test step 3347. In test step 3347, execution engine 802 (FIG. 8) determines whether the operator of the expression is a call to a function by comparison of field "kind" 2202 (FIG. 22) of the expression structure representing the expression to data specifying a call to a function. According to the C computer language, a function operator (i.e., "( )") signifies a call to a function. A call to a function evaluates to the returned item of the function. For example, the expression "abc( )" calls, i.e., invokes execution of, a function whose identifier is "abc". Similarly, the expression "xyz(d,e,f)" calls a function whose identifier is "xyz" supplying items d, e, and f as parameters.

If the operator of the expression is not a call to a function, processing transfers from test step 3347 (FIG. 33C) to test step 3353. Conversely, if the operator of the expression is a call to a function, processing transfers from test step 3347 to loop step 3348.

Loop step 3348, step 3349, and next step 3350 form a loop in which each parameter is evaluated. In step 3349, execution engine 802 (FIG. 8) evaluates the parameter according to logic flow diagram 2900 (FIG. 29) while applying no operation. If expression structure 2200 (FIG. 22) represents the expression, i.e., represents a call to a function, (i) field "num_operands" 2208 specifies as the number of operands the number of parameters of the called function and (ii) field "operands" 2210 is an array of expression structures, each element of which is an expression structure representing a parameter of the called function. Each parameter is evaluated by evaluating each element of field operands 2210. An array of items representing the parameters of the called function is constructed in the loop formed by loop step 3348, step 3349, and next step 3350 and is used as described more completely below (with respect to FIG. 46) to emulate execution of the called function in step 3352.

Once each parameter of the called function is evaluated, processing transfers from loop step 3348 (FIG. 33C) to step 3351. In step 3351, execution engine 802 (FIG. 8) retrieves the function model structure which represents the effect of execution of the called function on externals of the called function. Function model structures are described above with respect to FIGS. 11–13. From step 3351 (FIG. 33C), processing transfers to step 3352 in which execution engine 802 (FIG. 8) emulates execution of the called function. The emulated execution of a called function is described more completely below. Briefly, a called function is emulated by applying operations specified in a function model structure, such as function model structures formed from function models (3), (4), and (5) above. The function model structure corresponding to the called function specifies operations which represent the effect of execution of the called function on the externals of the called function. After step 3352 (FIG. 33C), processing according to logic flow diagram 2902, and therefore step 2902 (FIG. 29), terminates.

Assignment

As described above, if the operator of the expression is not a call to a function, processing transfers from test step 3347 (FIG. 33C) to test step 3353. In test step 3353, execution engine 802 (FIG. 8) determines whether the operator of the expression is an assignment operator by comparison of field "kind" 2202 (FIG. 22) of the expression structure representing the expression to data specifying an assignment operator. According to the C computer language, an assignment operator (i.e., "=") operates on two operands, i.e., the lhs and the rhs, and transfers the value of the rhs to the lhs. An assignment evaluates to an item having the value transferred. For example, the expression "a=b" transfers the value of item "b" to item "a" and evaluates to an item having the new value of item "a".

If the operator of the expression is not an assignment operator, processing according to logic flow diagram 2902 (FIGS. 33A–C), and therefore step 2902 (FIG. 29) terminates and the expression processed according to logic flow diagram 2902 evaluates to a NULL. A NULL is generally used to indicate no valid value.

An expression evaluates to a NULL when execution engine 802 (FIG. 8) is unable to properly evaluate the expression absent the context of the execution of the subject function within a computer process. Of primary importance is not the proper evaluation of the expression, but the tracking of changes in respective states of externals and resources. Expressions are evaluated as much as possible to ensure the most accurate tracking of such states.

Figure 45:
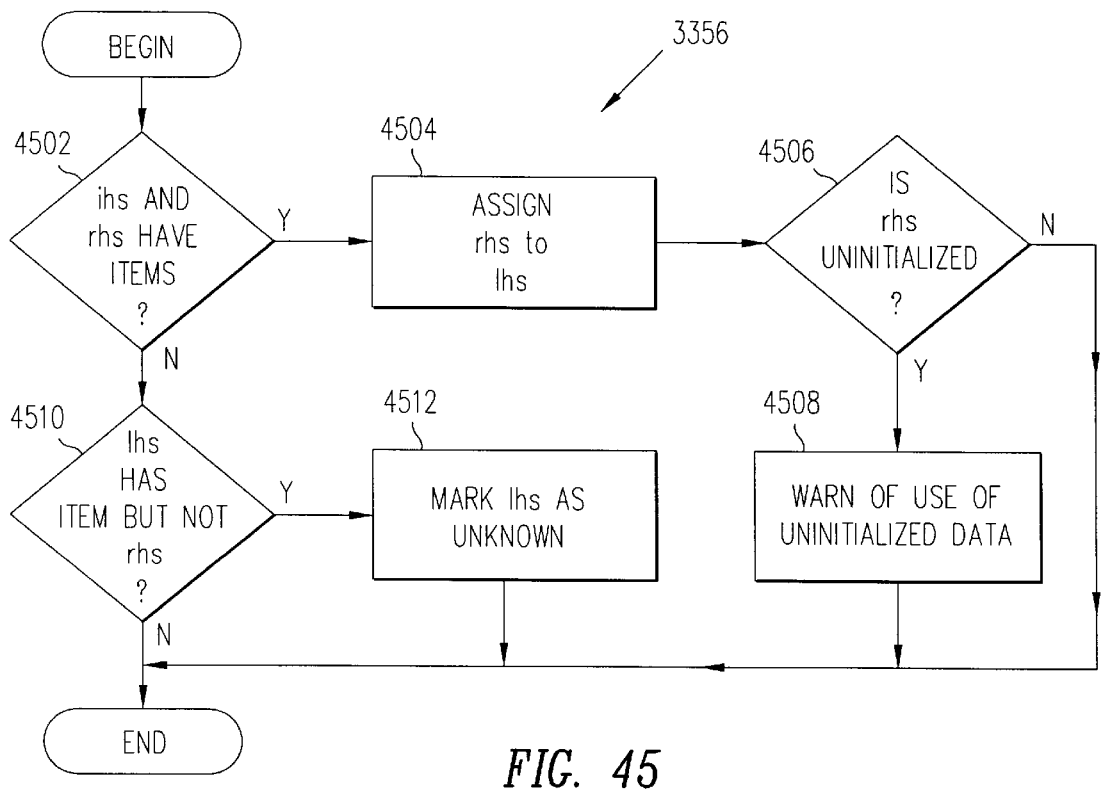
FIG. 45 is a logic flow diagram of the assignment of the value of one item to another item in accordance with an embodiment of the present invention.

Conversely, in test step 3353 (FIG. 33C), if the operator of the expression is an assignment operator, processing transfers to step 3354. In step 3354, execution engine 802 (FIG. 8) evaluates the lhs of the expression as an expression itself according to logic flow diagram 2900 (FIG. 29) while applying no operation. From step 3354 (FIG. 33C), processing transfers to step 3355 in which execution engine 802 (FIG. 8) evaluates the rhs of the expression according to logic flow diagram 2900 (FIG. 29) applying no operation. Processing transfers from step 3355 (FIG. 33C) to step 3356 in which execution engine 802 (FIG. 8) assigns the value of the item produced by evaluation of the rhs of the expression to the item produced by evaluation of the lhs of the expression. Step 3356 is described in greater detail below with respect to logic flow diagram 3356 (FIG. 45). After step 3356 (FIG. 33C), processing according to logic flow diagram 2902, and therefore step 2902 (FIG. 29), terminates.

Thus, in step 2804 (FIG. 28) execution engine 802 (FIG. 8) evaluates the expression according to logic flow diagram 2900 (FIG. 29). In evaluating the expression, execution engine 802 (FIG. 8) applies operations to the respective states of externals and resources when appropriate as described more completely above. As further described above, any state violations resulting from application of operations during evaluation of the expression are reported to the user as errors in computer program 610.

Processing of a Declaration

Figure 34:
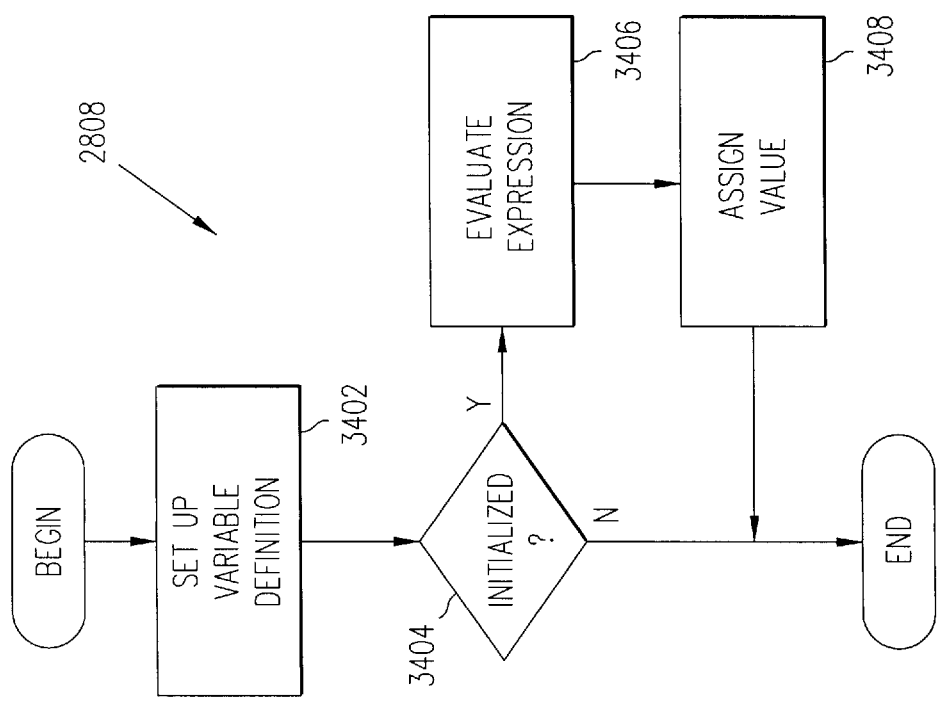
FIG. 34 is a logic flow diagram of the processing of a declaration in accordance with an embodiment of the present invention.

As described above, a declaration statement is processed in step 2808 (FIG. 28), which is shown in greater detail in logic flow diagram 2808 (FIG. 34). A declaration statement is represented by a statement structure, such as statement structure 1416 (FIG. 21), whose field "pointers" is an array of two pointers. As described above, the first pointer of a statement structure representing a declaration statement points to a declaration structure, such as declaration structure 1506 (FIG. 16), and the second pointer points to an expression structure which defines an initial value of the declared item.

Processing according to logic flow diagram 2808 (FIG. 34) begins in step 3402 in which an item structure, such as item structure 2700 (FIG. 27), is created for the declared item. A pointer to the created item structure is stored in field "item" 1608 (FIG. 16) of declaration structure 1506. Field "type_code" 2712 (FIG. 27) is set according to the data type specified in the declaration, i.e., according to field "type" 1606 (FIG. 16) of declaration structure 1506. Field "initialized" 2714 (FIG. 27) is set to indicate that the item is not initialized.

Processing transfers from step 3402 (FIG. 34) to test step 3404 in which execution engine 802 (FIG. 8) determines whether the declaration statement specifies an initial value for the declared item, i.e., whether the second pointer of the statement structure representing the declaration statement points to an expression structure or is NULL. If the declaration statement specifies no initial value, i.e., if the second pointer is NULL, processing according to logic flow diagram 2808 (FIG. 34) terminates. Conversely, if the declaration statement includes an expression specifying an initial value, i.e., if the second pointer points to an expression statement, processing transfers from test step 3404 to step 3406. In step 3406, execution engine 802 (FIG. 8) evaluates the expression represented by the expression structure according to logic flow diagram 2900 (FIG. 29) as described more completely above. In evaluating the expression according to logic flow diagram 2900, no operation is applied. Processing transfers from step 3406 (FIG. 34) to step 3408 in which the item to which the expression evaluates is assigned to the declared item. In addition, field "initialized" 2714 (FIG. 27) of the item structure representing the declared item is set to indicate that the item is initialized. After step 3408 (FIG. 34), processing according to logic flow diagram 2808, and thus step 2808 (FIG. 28), terminates. Thus, in step 2808, a new item is created and, if an initial value is specified, the new item is initialized to that initial value.

Decision Processing

Figure 35:
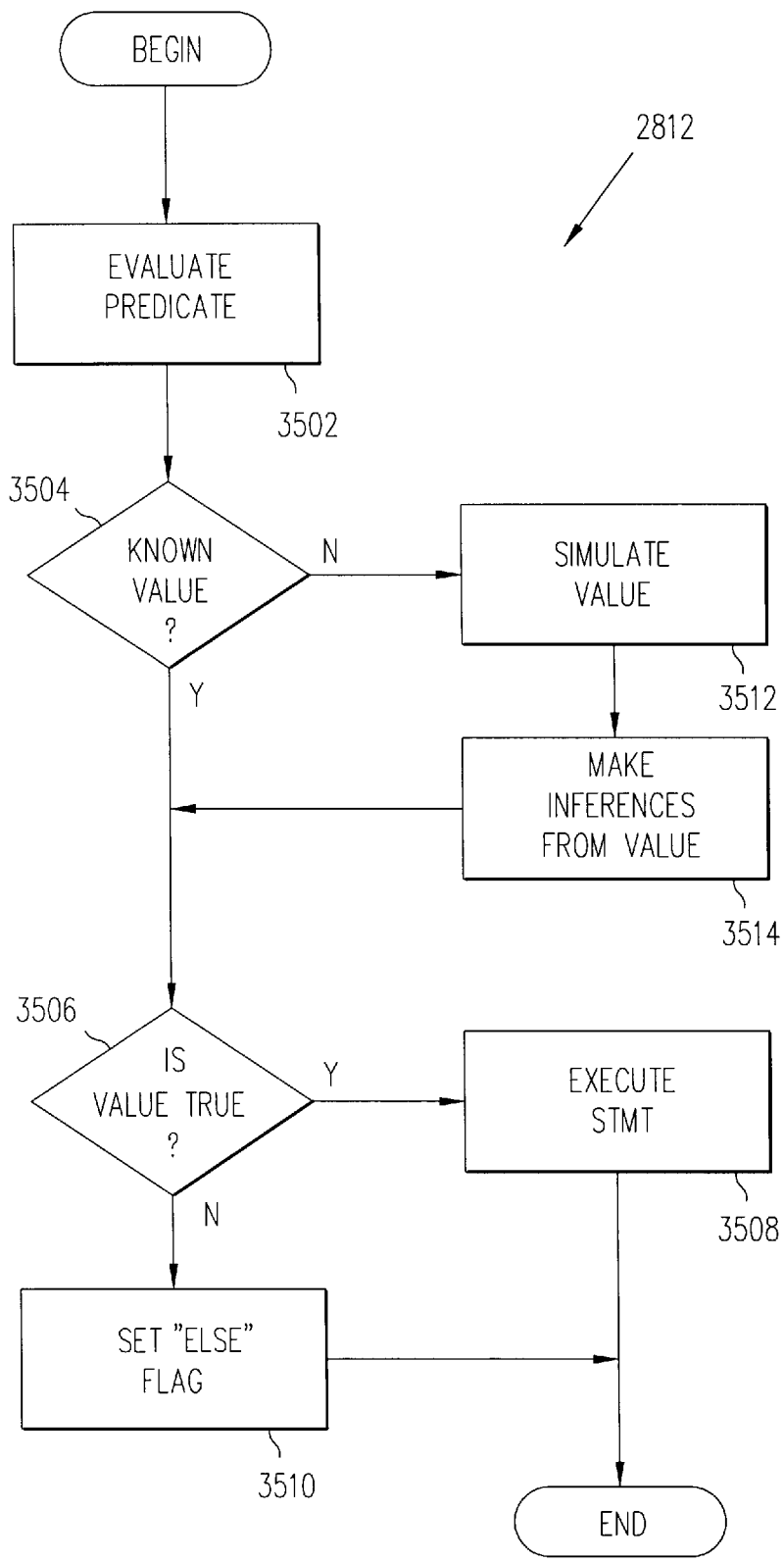
FIG. 35 is a logic flow diagram of the processing of an "if" statement in accordance with an embodiment of the present invention.

As described above, execution engine 802 (FIG. 8) processes a decision, i.e., an "if" statement, in step 2812 (FIG. 28), which is shown in greater detail in logic flow diagram 2812 (FIG. 35). Processing begins in step 3502 in which execution engine 802 (FIG. 8) evaluates an expression, which is the predicate of an "if" statement, according to logic flow diagram 2900 (FIG. 29) while applying operation p. According to the C computer language, an "if" statement includes a predicate and a second statement. The predicate is an expression which evaluates to a boolean item which determines whether the second statement is executed. For example, the statement "if (a==) ci1;" specifies that the second statement, i.e., statement "ci1", is executed if the predicate, i.e., the expression "a==b", evaluates to a boolean item whose value is "true", i.e., if item "a" is equal to item "b". If item "a" is not equal to item "b", statement "ci1" is not executed.

Processing transfers from step 3502 (FIG. 35) to test step 3504 in which execution engine 802 (FIG. 8) determines whether the predicate evaluates to an item having a known value. Execution engine 802 makes such a determination by comparison of the item produced by evaluation of the predicate to NULL. As described above, an expression evaluates to NULL if execution engine 802 is unable to properly evaluate the expression. If the predicate evaluates to an item having a known value, i.e., to an value other than NULL, processing transfers from test step 3504 (FIG. 35) to test step 3506.

In test step 3506, execution engine 802 (FIG. 8) compares the value of the item produced by evaluation of the predicate to a boolean value of "true". If the predicate evaluates to a boolean item whose value is "true", processing transfers to step 3508 (FIG. 35) in which execution engine 802 (FIG. 8) executes the second statement of the "if" statement. The second statement is processed according to logic flow diagram 2800 (FIG. 28) as described more completely above. Thus, logic flow diagram 2800 is performed recursively.

If, on the other hand, the predicate evaluates to a boolean value of "false", processing transfers from test step 3506 (FIG. 28) to step 3510 in which execution engine 802 (FIG. 8) stores in a control record, which is described more completely below, data indicating an "else" condition. The control record is used as described more completely below to properly transfer control through an emulated execution of the subject function. After either step 3508 (FIG. 35) or step 3510, processing according to logic flow diagram 2812, and therefore step 2812 (FIG. 28), terminates.

As described above, execution engine 802 (FIG. 8) determines whether the predicate evaluates to a known value in test step 3504 (FIG. 35). If the predicates does not evaluate to a known value, i.e., evaluates to a NULL or evaluates to an item whose value is unknown, processing transfers from test step 3504 to step 3512. In step 3512, execution engine 802 (FIG. 8) simulates a boolean value to which the predicate could evaluate. In one embodiment, execution engine 802 (FIG. 8) randomly chooses a boolean value of "true" or a boolean value of "false". From step 3512 (FIG. 35), processing transfers to step 3514.

Figure 36:
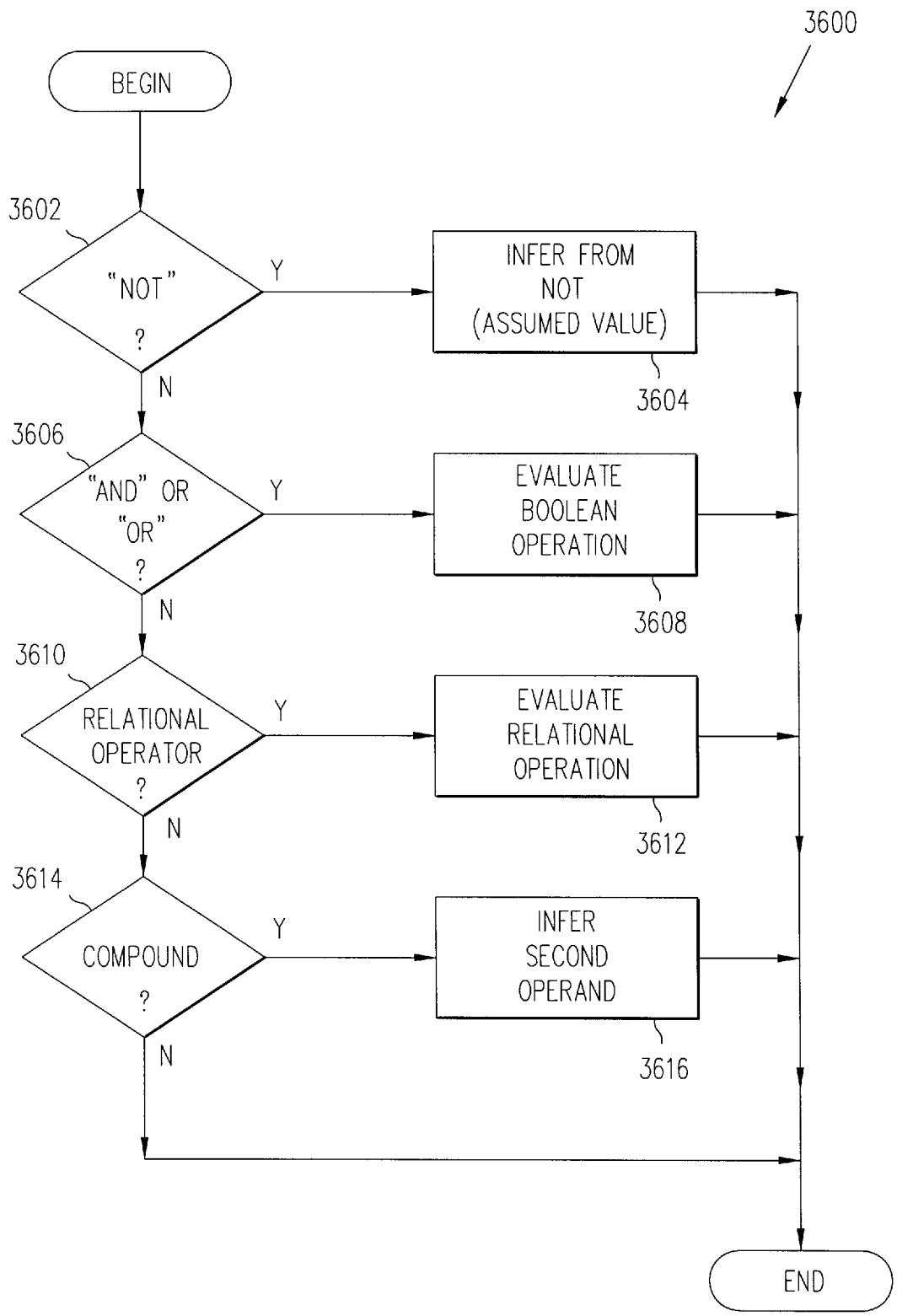
FIG. 36 is a logic flow diagram of the processing of a logical operator in accordance with the present invention.

In step 3514, execution engine 802 (FIG. 8) makes as many inferences as possible from the boolean value selected in step 3512 (FIG. 35). For example, if the predicate is the expression "a&&b" (i.e., a AND b), and the predicate is chosen to have a boolean value of "true", execution engine 802 (FIG. 8) infers that item "a" and item "b" each have a boolean value of "true". This can be inferred because the expression "a&&b" can only evaluate to "true" if a and b are both "true". Step 3514 (FIG. 35) includes processing the predicate according to logic flow diagram 3600 (FIG. 36). The steps of logic flow diagram 3600 infer values in an expression from an assumed boolean value to which the expression is assumed to evaluate.

"Not" Operator

Processing according to logic flow diagram 3600 begins in test step 3602 in which execution engine 802 (FIG. 8) compares the operator of the expression to the "not" operator, i.e., compares field "kind" 2202 (FIG. 22) of the expression structure representing the expression to data specifying the "not" operator. The "not" operator (i.e. "!") operates on a single operand and produces as a result an item whose value is the logical negation of the value of the operand. For example, the expression "!a" is the logical negation of the operand, i.e., the expression "a".

If the operator of the expression is not the "not" operator, processing transfers from test step 3602 (FIG. 36) to test step 3606 which is described below. Conversely, if the operator of the expression is the "not" operator, processing transfers from test step 3602 to step 3604. In step 3604, execution engine 802 (FIG. 8) processes the operand according to logic flow diagram 3600 (FIG. 36) assuming the logical negation of the assumed value. For example, if the expression "!(a&&b)", i.e., NOT (a AND b), is assumed to be "true", the expression "a&&b" is assumed to be "false". Thus, processing according to logic flow diagram 3600 is performed recursively. After step 3604, processing according to logic flow diagram 3600 terminates.

"And" or "Or" Operator

As described above, if the operator of the expression is not the "not" operator, processing transfers from test step 3602 (FIG. 36) to test step 3606. In test step 3606, execution engine 802 (FIG. 8) compares the operator of the expression to the "And" and the "Or" operators. In other words, execution engine 802 compares field "kind" 2202 (FIG. 22) of the expression structure representing the expression to data specifying the "And" and the "Or" operators. As described above, the "And" and the "Or" operators (i.e. "&&" and "||", respectively) operate on two operands, i.e., the lhs and the rhs, and produce as a result an item whose value is the logical conjunction and logical disjunction, respectively, of the values of the two operands. If the operator of the expression is neither the "And" nor the "Or" operator, processing transfers from test step 3606 (FIG. 36) to test step 3610 which is described below. Conversely, if the operator of the expression is either the "And" or the "Or" operator, processing transfers from test step 3606 to step 3608.

Figure 37:
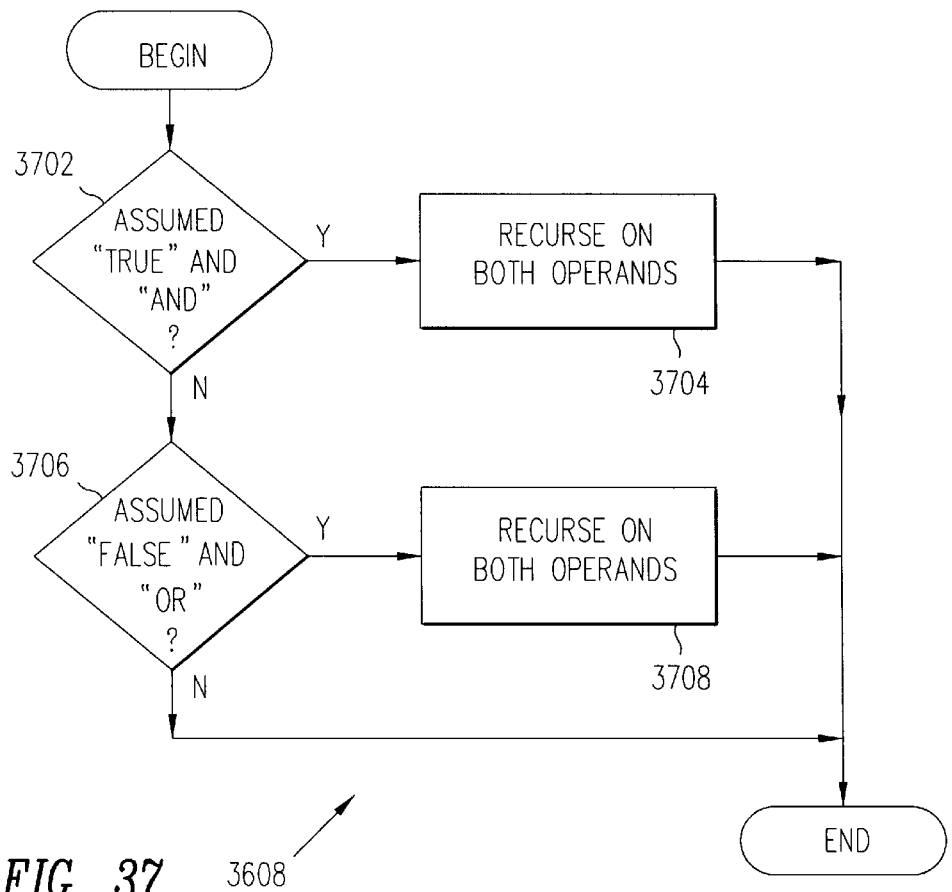
FIG. 37 is a logic flow diagram of the processing of a step of the logic flow diagram of FIG. 36.

Step 3608 is shown in greater detail as logic flow diagram 3608 (FIG. 37) in which processing begins in test step 3702. In test step 3702, execution engine 802 (FIG. 8) compares the operator of the expression to the "And" operator and compares the boolean value to which the expression is assumed to evaluate, i.e., the assumed value, to a boolean value of "true". If the operator is not the "And" operator or the assumed value is not "true", processing transfers from test step 3702 to test step 3706, which is described below. Conversely, if the operator is the "And" operator and the assumed value is "true", processing transfers from test step 3702 to step 3704.

In step 3704, each operand, i.e., each of the lhs and the rhs of the expression, is processed as an expression according to logic flow diagram 3600 (FIG. 36) with an assumed value of "true". Such an inference that both the lhs and the rhs are "true" is proper since, if the expression "a && b" is "true", both operands, i.e., expression "a" and expression "b", must be "true". As described above, the operator "&&" of the C computer language signifies a logical or truth-wise AND operation. After step 3704 (FIG. 37), processing according to logic flow diagram 3608, and therefore step 3608 (FIG. 36), terminates.

As described above, if the operator is not the "And" operator or the assumed value is not "true", processing transfers from test step 3702 (FIG. 37) to test step 3706. In test step 3706, execution engine 802 (FIG. 8) compares the operator of the expression to the "Or" operator and the assumed value to the boolean value of "false". If the operator of the expression is not the "Or" operator or the assumed value is not "false", processing according to logic flow diagram 3608, and therefore step 3608 (FIG. 36), terminates. Conversely, if the operator is the "Or" operator and the assumed value is "false", processing transfers from test step 3706 (FIG. 37) to step 3708.

In step 3708, each operand, i.e., each of the lhs and the rhs of the expression, is processed as an expression according to logic flow diagram 3600 (FIG. 36) with an assumed value of "false". Such an inference that the lhs and the rhs are "false" is proper since, if the expression "a ||b" is "false", both operands, i.e., expression "a" and expression "b", must be "false". As described above, the operator "||" of the C computer language signifies a logical or truth-wise OR operation. After step 3708 (FIG. 37), processing according to logic flow diagram 3608, and therefore step 3608 (FIG. 36) terminates.

After step 3608, processing according to logic flow diagram 3600 terminates.

Relational Operator

As described above, if the operator of the expression is neither the "And" operator nor the "Or" operator, processing transfers from test step 3606 to test step 3610. In test step 3610, execution engine 802 (FIG. 8) compares the operator of the expression to the following relational operators: less than ("<"), less than or equal to ("<="), greater than (">"), greater than or equal to (">="), equal to and not equal to ("!="). Specifically, execution engine 802 compares field "kind" 2202 (FIG. 22) of the expression structure representing the expression to data specifying each of those relational operators. As described above, a relational operator operates on two operands, i.e., the lhs and rhs of the expression, and produces as a result a boolean item whose value corresponds to the relation between the lhs and the rhs. If the operator of the expression is not a relational operator, processing transfers from test step 3610 (FIG. 36) to test step 3614, which is described below. Conversely, if the operator of the expression is a relational operator, processing transfers from test step 3610 to step 3612.

Figure 38:
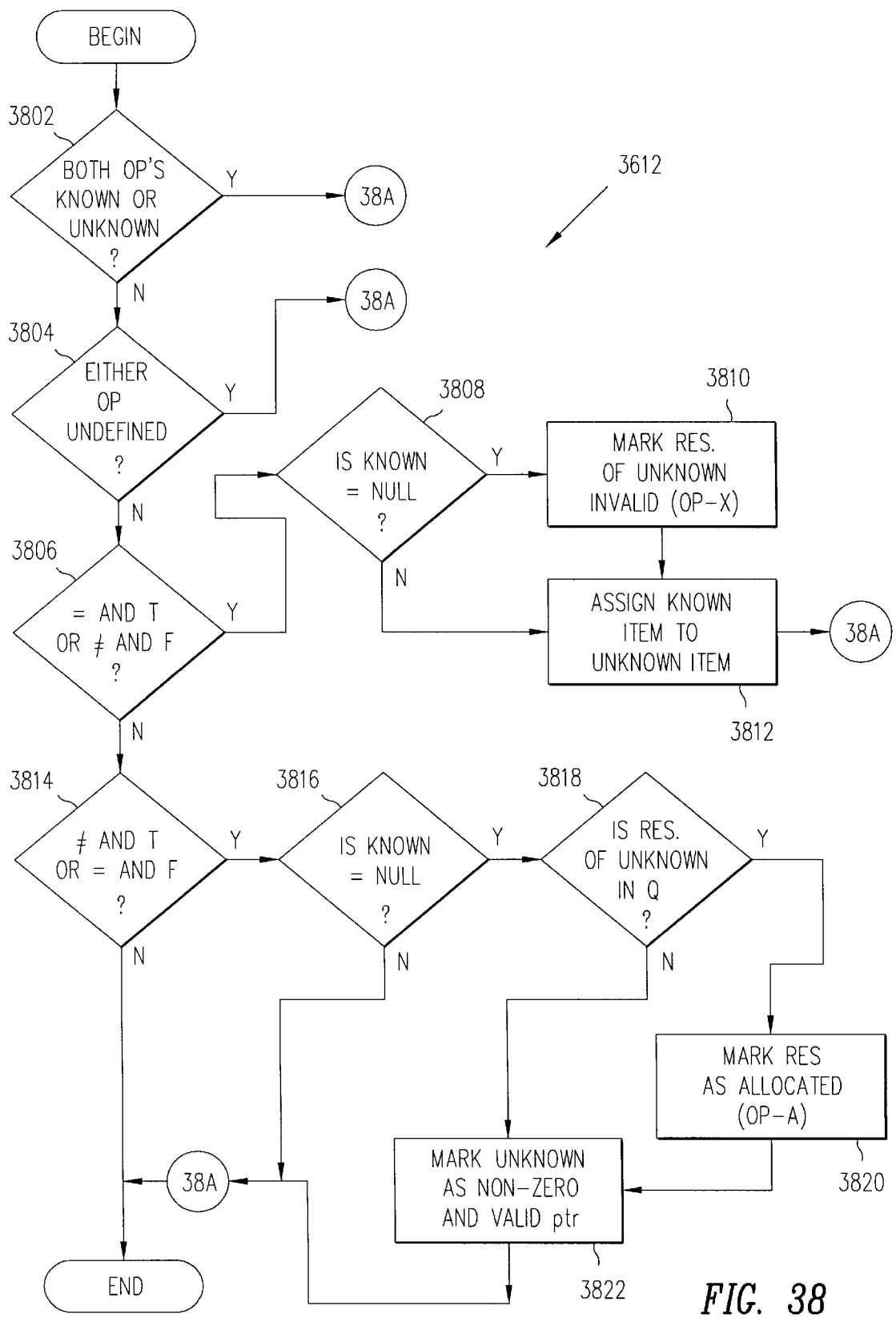
FIG. 38 is a logic flow diagram of the processing of another step of the logic flow diagram of FIG. 36.

In step 3612, execution engine 802 (FIG. 8) evaluates the relational operator. Step 3612 (FIG. 36) is shown in greater detail as logic flow diagram 3612 (FIG. 38) in which processing begins in step 3802. In step 3802, execution engine 802 (FIG. 8) determines whether both the lhs and rhs are known, i.e., evaluate to an item with a known value, and whether both the lhs and rhs are unknown, i.e., evaluate to an item whose value is unknown. If an item represented by item structure 2700 (FIG. 27) has an unknown value, field "type_code" 2712 specifies that the type of the item is unknown. If both the lhs and rhs of the expression are known or both are unknown, processing according to logic flow diagram 3612 (FIG. 38), and therefore step 3612 (FIG. 36), terminates since nothing is left to be inferred if both operands are known and since nothing more can be inferred if both operands are unknown. Conversely, if one operand is known and one operand is unknown, processing transfers from test step 3802 (FIG. 38) to test step 3804.

In test step 3804, execution engine 802 (FIG. 8) determines whether either operand is undefined. An operand is undefined if the operand does not evaluate to an item which is represented by an item structure, i.e., if the operand evaluates to NULL. In such a case, there is no item to which to assign an inferred value. Therefore, if either operand is undefined, processing according to logic flow diagram 3612 (FIG. 38), and therefore step 3612 (FIG. 36), terminates. Conversely, if neither operand is undefined, processing transfers from test step 3804 (FIG. 38) to test step 3806.

In test step 3806, execution engine 802 (FIG. 8) compares the operator of the expression to the "equal" operator and to the "not-equal" operator and compares the assumed value to the boolean values "true" and "false". If neither (i) the operator of the expression is the "equal" operator and the assumed value is "true" nor (ii) the operator of the expression is the "not-equal" operator and the assumed value is "false", processing transfers from test step 3806 (FIG. 38) to test step 3814 which is described below. Conversely, if either (i) the operator of the expression is the "equal" operator and the assumed value is "true" or (ii) the operator of the expression is the "not-equal" operator and the assumed value is "false"processing transfers from test step 3806 to test step 3808.

At test step 3808, one operand has a known value, and the other operand has an unknown value. The operand whose value is known evaluates to a "known item". The operand whose value is unknown evaluates to an "unknown item". Furthermore, at test step 3808, the two operands are assumed to have equivalent values. In test step 3808, execution engine 802 (FIG. 8) determines whether the known item has a NULL value. An item has a NULL value if (i) the type of the item, as specified in field "type_code", e.g., field "type_code" 2712 (FIG. 27) of item structure 2700, indicates that the type of the item is either "long" or "pointer" and (ii) the value of the item, as specified in field "value", e.g., field "value" 2706 of item structure 2700, indicates that the value of the item is zero.

If the known item has a NULL value, processing transfers from test step 3808 (FIG. 38) to step 3810 in which any resource associated with the unknown item is marked invalid by application of operation x. The resource is invalid since the value of the unknown item to which the resource is associated is assumed to be equal to the known item whose value is NULL, i.e., since a pointer to the resource is assumed to be NULL.

Processing transfers from step 3810 to step 3812. In addition, if the known item does not have a NULL value, processing transfers from test step 3808 directly to step 3812. In step 3812, the value of the known item is assigned to the unknown value in a manner described more completely below. Thus, the value of the unknown item is inferred from the value of the known item if the known item and the unknown item are assumed to be equal. After step 3812, processing according to logic flow diagram 3612, and therefore step 3612 (FIG. 36), terminates.

As described above, if neither (i) the operator of the expression is the "equal" operator and the assumed value is "true" nor (ii) the operator of the expression is the "not-equal" operator and the assumed value is "false", processing transfers from test step 3806 (FIG. 38) to test step 3814. In test step 3814, execution engine 802 (FIG. 8) determines whether (i) the operator of the expression is the "not-equal" operator and the assumed value is "true" or whether (ii) the operator of the expression is the "equal" operator and the assumed value is "false". If neither condition (i) nor condition (ii) exists, processing according to logic flow diagram 3612, and therefore step 3612 (FIG. 36), terminates. Otherwise, if either condition (i) or condition (ii) exists, processing transfers from test step 3814 (FIG. 38) to test step 3816.

At test step 3816, execution engine 802 (FIG. 8) infers that the two operands, i.e, lhs and rhs, are not equal to one another. If the known item has a NULL value, the unknown item is inferred to have a non-NULL value. In the context of many implementations of the C computer language, NULL is zero. Therefore, the unknown item is inferred to have a non-zero value. In test step 3816 (FIG. 38), execution engine 802 (FIG. 8) compares the value of the known item to NULL. If the value of the known item is not NULL, processing according to logic flow diagram 3612 (FIG. 38) terminates. Conversely, if the value of the known item is NULL, processing transfers to test step 3818.

In test step 3818, execution engine 802 (FIG. 8) determines whether a resource in state Q is associated with the unknown item. As described above, a resource is in state Q when it is unknown whether the resource is in an allocated state or in an unallocated or invalid state. If the unknown item is associated with a resource in state Q, processing transfers to step 3820 (FIG. 38) in which operation a is applied to the resource associated with the unknown item. Operation a is applied to place the resource in a definitely allocated state since the item with which the resource is associated is assumed to be not equal to NULL. From step 3820, processing transfers to step 3822. In addition, if the unknown item is not associated with a resource in state Q, processing transfers from test step 3818 directly to step 3822.

In step 3822, field "type_code" 2712 (FIG. 27) of the item structure representing the unknown item is set to indicate that the item is non-zero, and field "invalid_ pointer" 2720 of the item structure representing the unknown item is set to indicate that the unknown item is not an invalid pointer, i.e., does not have a NULL value. After step 3822, processing according to logic flow diagram 3612 terminates.

Thus, according to logic flow diagram 3612, and therefore step 3612 (FIG. 36), inferences are drawn when one operand of the expression is known and the other operand is unknown and the two operands are assumed to be equal or are assumed to be not equal. Inferences are drawn both with respect to the value of operands of the expression and with respect to the state of resources associated with operands of the expression. After step 3612, processing according to logic flow diagram 3600 terminates.

Compound Operator

As described above, if the operator of the expression is not a relational operator, processing transfers from test step 3610 to test step 3614. In test step 3614, execution engine 802 (FIG. 8) compares the operator of the expression to a compound operator (","). In other words, execution engine 802 compares field "kind" 2202 (FIG. 22) of the expression structure representing the expression to data specifying a compound operator. A compound operator operates on two operands, i.e., the lhs and rhs. Both the lhs and rhs are evaluated, and the expression evaluates to the rhs. For example, evaluation of the expression "a,b" evaluates both operand "a" and operand "b", and the expression "a,b" evaluates to "b".

If the operator is a compound operator, processing transfers to step 3616 (FIG. 36) in which execution engine 802 (FIG. 8) processes the rhs according to logic flow diagram 3600 (FIG. 36) supplying as the assumed value the boolean value to which the expression is assumed to evaluate. The value of the rhs is inferred from the assumed value of the expression since the expression evaluates to the rhs. For example, if the expression "a==b, c==d" is assumed to be true, it is inferred that the rhs, namely, the expression "c==d", is true. Thus, processing according to logic flow diagram 3600 is recursively applied to the rhs of the expression in step 3616. After step 3616, processing according to logic flow diagram 3600 terminates. If the operator is not a compound operator, processing according to logic flow diagram 3600 terminates and step 3616 is skipped.

Thus, by recursively processing expressions and subexpressions according to logic flow diagram 3600 as described above, execution engine 802 (FIG. 8) infers as much about the items of an expression, and resources associated with items of an expression, from the assumed value of the expression as is practicable in step 3514 (FIG. 35). Processing transfers from step 3514 to test step 3506 which is described in greater detail above.

Thus, according to logic flow diagram 2812, execution engine 802 (FIG. 8) processes a decision in an "if" statement in step 2812 (FIG. 28).

Return Processing

As described above, a "return" statement is processed in step 2816. A "return" statement terminates execution of a function and assigns a value to the returned item of the function if a returned item is defined. Step 2816 is shown in greater detail as logic flow diagram 2816 (FIG. 39) in which processing begins in step 3902.

In step 3902, execution engine 802 (FIG. 8) determines whether the "return" statement specifies a returned item. The "return" statement specifies a returned item if the "return" includes an expression. For example, if statement structure 1416 (FIG. 21) represents a "return" statement, field "pointers" 2110 is a single pointer which points to an expression structure or is NULL. If the "return" statement specifies a returned item, i.e., if field "pointers" 2110 points to an expression structure, processing transfers from test step 3902 (FIG. 39) to step 3904 in which the expression of the "return" statement is evaluated according to logic flow diagram 2900 (FIG. 29) applying no operation. While no operation is applied in evaluating the expression of the "return" statement in step 3904 (FIG. 39), an operation can be applied to an operand of the expression as described above with respect to steps 3306, 3307, and 3314 (FIG. 33A). From step 3904 (FIG. 39) processing transfers to step 3906 in which execution engine 802 (FIG. 8) assigns the item produced by evaluation of the expression in step 3904 (FIG. 39) to the item structure representing the returned item of the subject function. The assignment of the value of one item to another item is described in greater detail below.

Processing transfers from step 3906 to step 3908. In addition, if the "return" statement does not specify a returned item, processing transfers directly from test step 3902 to step 3908. In step 3908, execution engine 802 (FIG. 8) stores in the control record data indicating a "return" condition which is used as described more completely below to control flow through the subject function during emulated execution of the subject function. After step 3908 (FIG. 39), processing according to logic flow diagram 2816, and therefore step 2816 (FIG. 28), terminates.

Block Processing

In most functions, a block of statements define the behavior of the function. In the context of the C computer language, a block of statements is enclosed between an open bracket, i.e., "{", which is itself a block statement, and a closing bracket, i.e., "}". It is common in functions defined in the C computer language for a first block of statements to include a second block of statements. For example, source code excerpt (1) includes a first block of statements from line 9 to line 32 which includes a second block of statements from line 16 to 21. Herein, the first block of statements is a superblock of the second block of statements, and the second block of statements is a subblock of the first block of statements.

As described above, a block statement structure includes a pointer to the statement structure, e.g., statement structure 1416 (FIG. 21), representing the first statement of the block. Statement structure 1416 includes a field "next" 2106 which is used as described above to maintain a singly-linked list of statement structures representing the statements of the block. As described above, a block statement is processed in step 2820 (FIG. 28), which is shown in greater detail as logic flow diagram 2820 (FIG. 40) which in turn illustrates the processing of the statement structures of a block of statements to emulate execution of the statements of the block.

In step 4002, execution engine 802 (FIG. 8) retrieves the statement structure representing the first statement of the block. As described above, the statement structure representing the first statement of the block is pointed to by the block statement structure. The retrieved statement structure is the current statement structure. Processing transfers from step 4002 (FIG. 40) to test step 4004.

In test step 4004, execution engine 802 (FIG. 8) determines whether the current statement structure represents an "else" statement and the control record indicates an "else" condition. An "else" statement according to the C computer language is well-known and is described in the C Standard at Section 6.6.4.1. A statement structure, such as statement structure 1416 (FIG. 21), represents an "else" statement if field "kind" 2102 so indicates. A control record in maintained within execution engine 802 (FIG. 8) to manage flow of control during emulated execution of the subject function. As described above with respect to step 3510 (FIG. 35), the control record is set to indicate an "else" condition when processing an "if" statement and the predicate of the "if" statement evaluates to a boolean value of "false". If the current statement structure does not represent an "else" statement or the control record indicates an "else" condition, processing transfers from test step 4004 (FIG. 40) to step 4006 in which execution of the statement represented by the current statement structure is emulated according to logic flow diagram 2800 (FIG. 28) as described above. Conversely, if the current statement structure represents an "else" statement and the control record does not indicate an "else" condition, processing transfers from test step 4004 (FIG. 40) to step 4014, which is described below, thereby bypassing step 4006.

As described above, a block of statements can include a subblock. As described above, in step 4006 the current statement structure is processed according to logic flow diagram 2800 (FIG. 28). Therefore, execution of a block statement in step 4006 (FIG. 40) causes a recursive performance of step 2820 (FIG. 28), and therefore the steps of logic flow diagram 2820 (FIG. 40), to emulate execution of the subblock. Once the statements of the subblock are processed according to logic flow diagram 2820, processing of the block statement in step 4006 completes and processing of the statements of the superblock according to logic flow diagram 2820 continues. Processing transfers from step 4006 to test step 4008.

In test step 4008, execution engine 802 (FIG. 8) compares the control record, which is set by emulated execution of a statement as described above with respect to logic flow diagram 2800 (FIG. 28), to data indicating a "return" condition, an "exit" condition, or a "long jump" condition. The control record is set to indicate a "return" condition upon emulated execution of a return statement in step 4006 (FIG. 40) as described above with respect to step 3908 (FIG. 39). An "exit" condition arises when execution engine 802 (FIG. 8) processes a call to a library function exit ( ), which is described in the C Standard at Section 7.10.4.3. A "long jump" condition arises when execution engine 802 processes a call to a library function longjmp ( ), which is described in the C Standard at Section 7.6.2.1. If the control record indicates a "return" condition, an "exit" condition, or a "long jump" condition, processing according to logic flow diagram 2820 (FIG. 40) terminates. Conversely, if the control record indicates neither a "return" condition, an "exit" condition, nor a "long jump" condition, processing transfers from test step 4008 to test step 4010.

In test step 4010, execution engine 802 (FIG. 8) compares the control record to data indicating a "break" condition or a "continue" condition. The control record is set to indicate a "break" condition or a "continue" condition upon emulated execution of a "break" statement or a "continue" statement, respectively, in step 4006. If the control record is set to indicate either a "break" condition or a "continue" condition, processing transfers to step 4012 in which the control record is set to indicate a "next" condition and processing according to logic flow diagram 2820 terminates.

A "next" condition is the normal processing condition in which execution of the next statement of a block is emulated. Thus, if a current block of statements executes a "break" statement, processing of the current block terminates and processing transfers to the statement which immediately follows the current block within a superblock of the current block. By contrast, a "return" condition does not reset the control record. Thus, emulated execution of a "return" statement in step 4006 terminates processing of a current block through test step 4008 as described above and similarly terminates processing of any superblocks of the current block.

If, on the other hand, the control record indicates neither a "break" condition nor a "continue" condition, processing transfers from test step 4010 to step 4014. In addition, processing transfers from test step 4004 to step 4014 if the current statement structure represents an "else" statement and the control record does not indicate an "else" condition as described above. In step 4014, execution engine 802 (FIG. 8) retrieves field "next" 2106 (FIG. 21) of the current statement structure and makes the retrieved statement structure the current statement structure, thereby replacing the previous current statement structure.

Processing transfers from step 4014 (FIG. 40) to test step 4016 in which execution engine 802 (FIG. 8) compares a pointer to the current statement structure to a NULL. If the pointer to the current statement structure is NULL, the last statement of the block of statements has been processed according to logic flow diagram 2820 (FIG. 40) and processing according to logic flow diagram 2820 terminates. Conversely, if the pointer to the current statement structure is not NULL, processing transfers from test step 4016 to test step 4004 which is described above.

Figure 40:
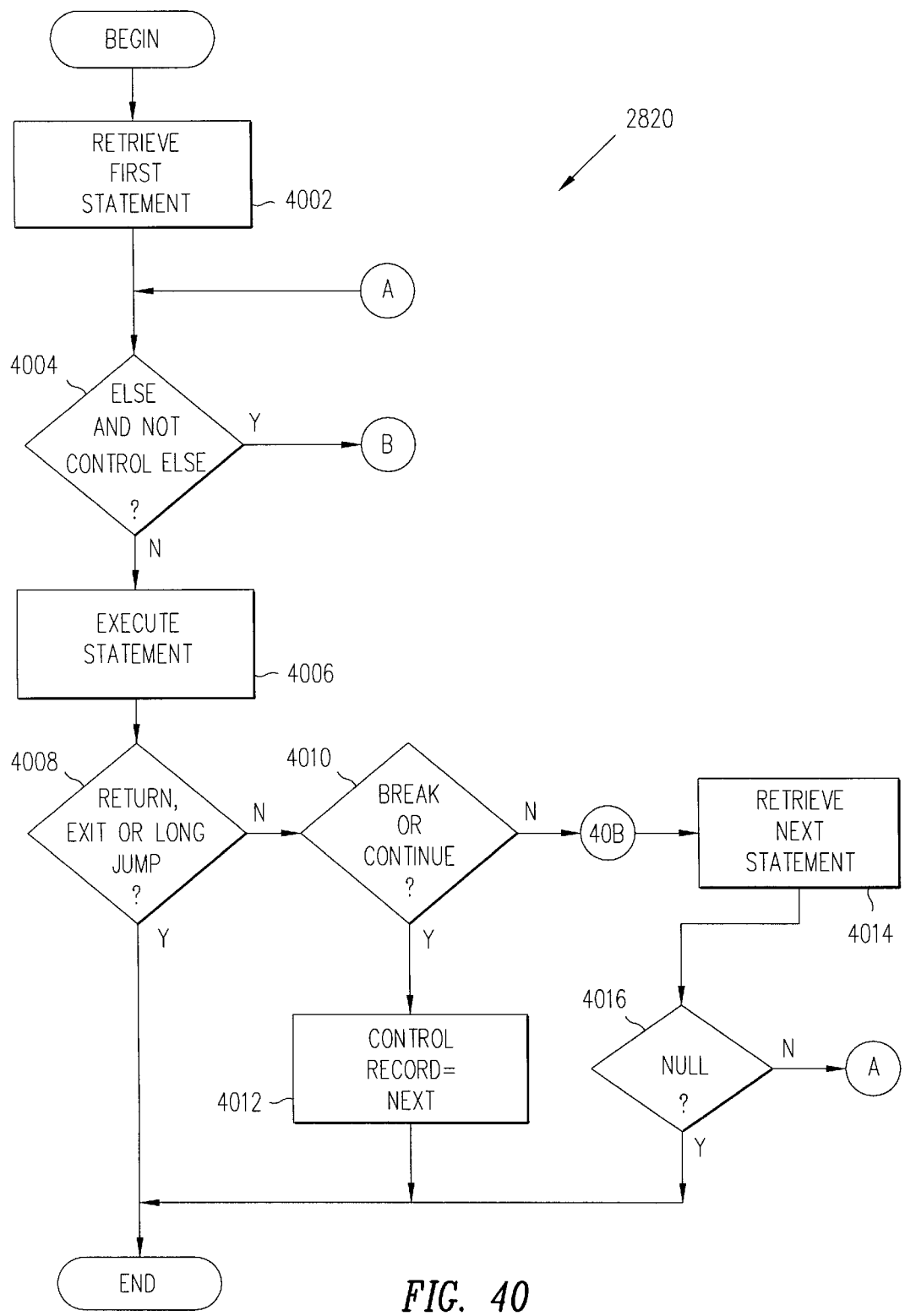
FIG. 40 is a logic flow diagram of the processing of a "block" statement in accordance with an embodiment of the present invention.

Thus, execution of a block of statements is emulated and flow of control through the block of statements is tracked according to logic flow diagram 2820 (FIG. 40).

Leak Processing

Figure 41:
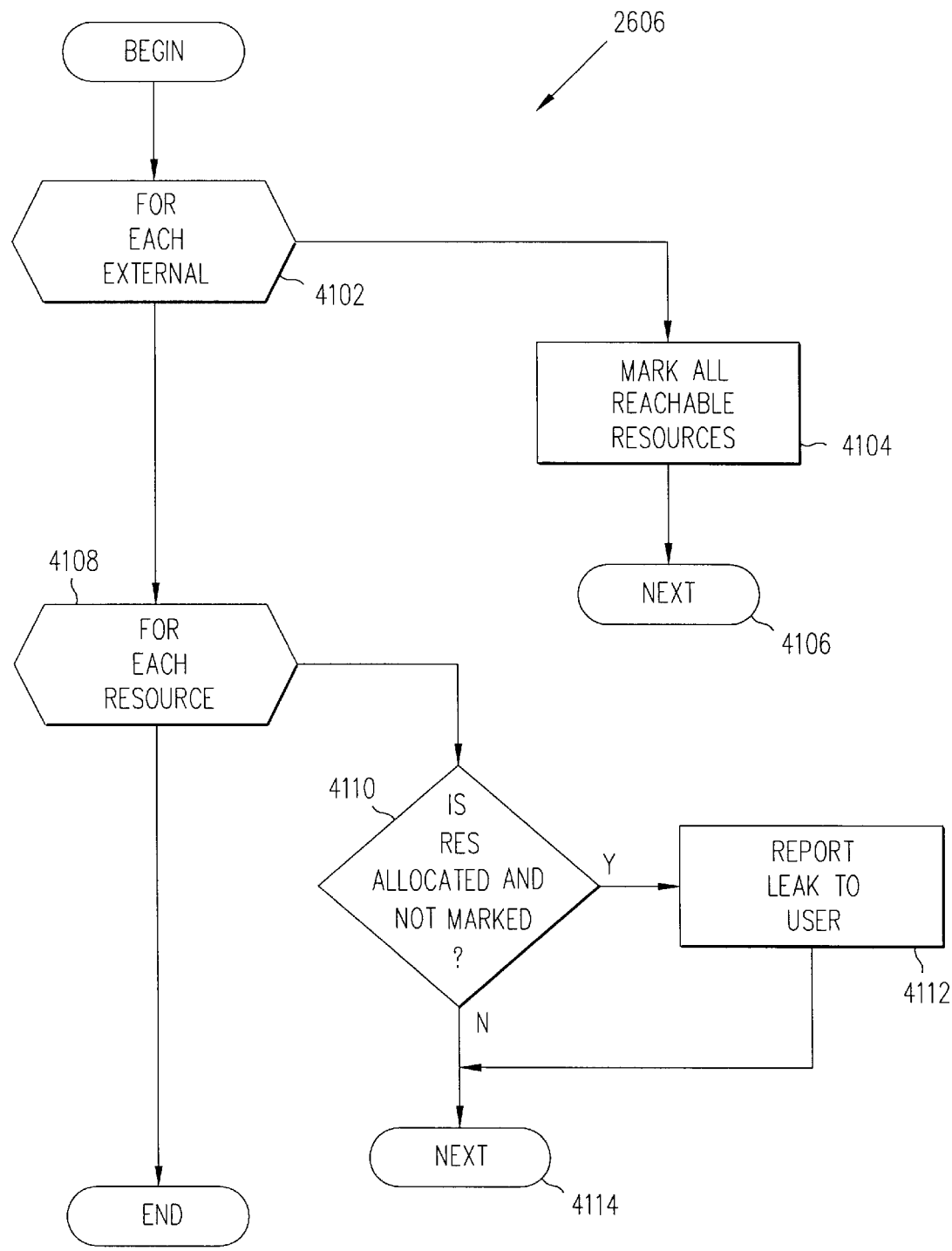
FIG. 41 is a logic flow diagram of the detection of resource leaks in accordance with one embodiment of the present invention.

As described above, leaks are detected in step 2606 (FIG. 26) once execution of the statements of the subject function has been emulated. Step 2606 is shown in greater detail as logic flow diagram 2606 (FIG. 41). Processing according to logic flow diagram 2606 begins in loop step 4102. Loop step 4102 and next step 4106 form a loop in which each external of the subject function is processed according to step 4104. In step 4104, execution engine 802 (FIG. 8) marks all resources reachable by an external. A resource is reachable by an external if the resource is associated with the external or any item in the bunch which includes the external. Bunches are described in greater detail below. As an illustrative example, a resource associated with an element of an array, which is a type of bunch, is reachable by any element of that array.

A resource, e.g., a resource represented by resource state structure 3100 (FIG. 31), is marked by setting field "mark" 3114 of resource state structure 3100 to so indicate. Once each resource reachable by each external is marked in the loop formed by loop step 4102 (FIG. 41) and next step 4106, processing transfers from loop step 4102 to loop step 4108.

Loop step 4108 and next step 4114 form a loop in which each resource is processed. Resource state structures are kept in a singly-linked list to facilitate processing of all resource state structures. For example, resource state structure 3100 (FIG. 31) includes a field "next" 3112 which points to the next resource state structure in the singly-linked list. For each resource represented by a resource state structure in memory 104 (FIG. 1), processing transfers from loop step 4108 (FIG. 41) to test step 4110.

In test step 4110, execution engine 802 (FIG. 8) determines whether a resource is allocated, i.e., in state A or state Q, and is not marked. A resource which is allocated and is not marked, i.e., is not reachable by any external, is leaked. If the resource is allocated and not marked, processing transfers from test step 4110 (FIG. 41) to step 4112 in which the leak is reported to the user. If the resource is not allocated, i.e., not in state A or state Q, or is marked, processing transfers from test step 4110 directly to next step 4114. In addition, processing transfers from step 4112 to next step 4114. Processing transfers from next step 4114 1:o loop step 4108 in which the next resource is processed as described above until all resources have been processed. Once every resource is processed according to the loop defined by loop step 4108 and next step 4114, processing according to logic flow diagram 2606, and therefore step 2606 (FIG. 26), terminates.

Thus, leaks are detected and reported according to logic flow diagram 2606, and therefore step 2606 (FIG. 26).

Compose Externals

Figure 42:
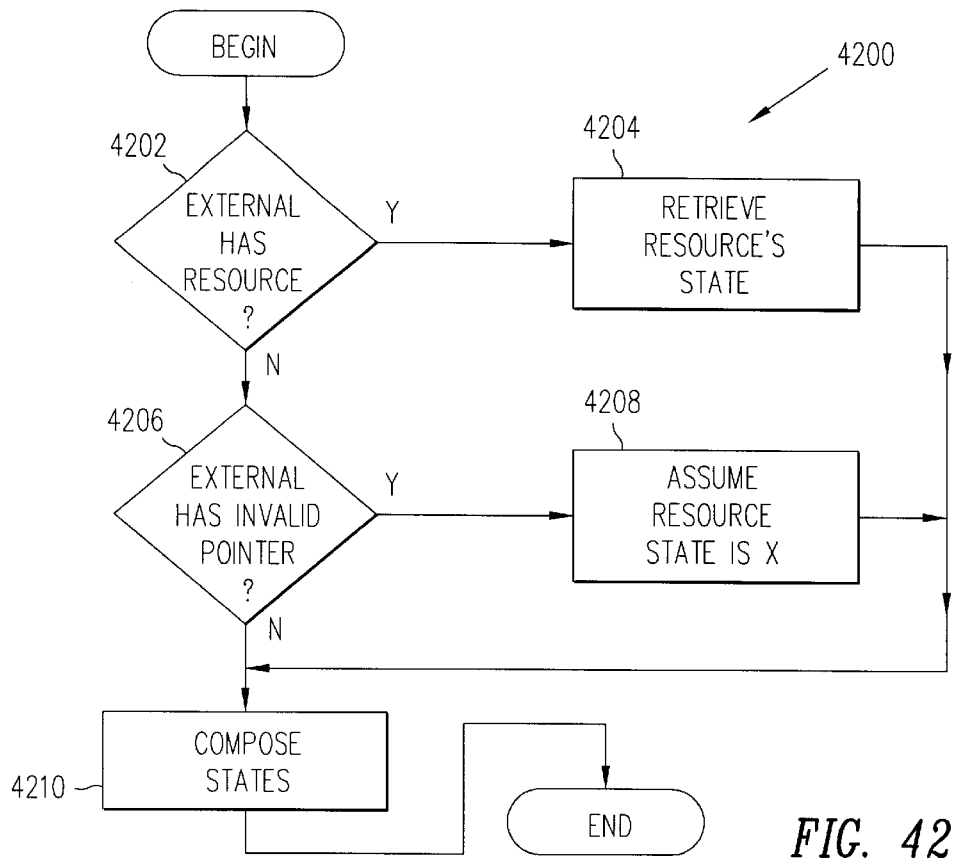
FIG. 42 is a logic flow diagram of the composition of the composite states of an external in accordance with an embodiment of the present invention.

As described above, in step 2608, each external is composed according to logic flow diagram 4200 (FIG. 42). Processing according to logic flow diagram 4200 begins in test step 4202 in which execution engine 802 (FIG. 8) determines whether a resource is associated with the external. As an illustrative example, determining whether a resource is associated with the external represented by external list structure 1414 (FIG. 15) is described. Field "first_decl" 1502 points to declaration structure 1506, which includes a field "item" 1608. Field "item" 1608 points to an item structure, e.g., item structure 2700. If field "resource" 2702 (FIG. 27) of item structure 2700 points to a resource state structure, a resource is associated with the external represented by external list structure 1414 (FIG. 15). If the external is associated with a resource which is represented, for example, by resource state structure 3100 (FIG. 31), processing transfers from test step 4202 (FIG. 42) to step 4204 in which the field "state" 3102 (FIG. 31) is retrieved. Processing transfers from step 4204 to step 4210 which is described below.

If no resource is associated with the external, processing transfers from test step 4202 to test step 4206. In test step 4206, execution engine 802 (FIG. 8) determines whether the external is an invalid pointer. An external is not an invalid pointer if the type of the external, as specified by field "type_code" (e.g., field "type_code" 2712 (FIG. 27)) of the item structure representing the item associated with the external, is VALUE_TYPE_NON_ZERO. Type VALUE_TYPE_NON_ZERO indicates that the item has a value other than zero. An external is an invalid pointer if field "invalid_pointer", e.g., field "invalid_pointer" 2720, of the item structure representing the item associated with the external so indicates or if the value of the external is zero or −1.

If the external is an invalid pointer, processing transfers from test step 4206 (FIG. 42) to step 4208 in which the state of the resource of the external is set to state X. For example, if a resource represented by resource state structure 3100 (FIG. 31) is associated with an external represented by external state structure 3000 (FIG. 30), data indicating state X is stored in field "state" 3102 (FIG. 31). From step 4208 (FIG. 42) processing transfers to step 4210. In addition, processing transfers to step 4210 from step 4204, as described above, and from test step 4206, if the external is not an invalid pointer.

In step 4210, the composite RS, DK, and CP states of the external are updated. The composition of states is described in greater detail above with respect to FIGS. 3B, 4B, and 5B. After step 4210, processing according to logic flow diagram 4200 terminates.

Output Model of Function

Figure 43:
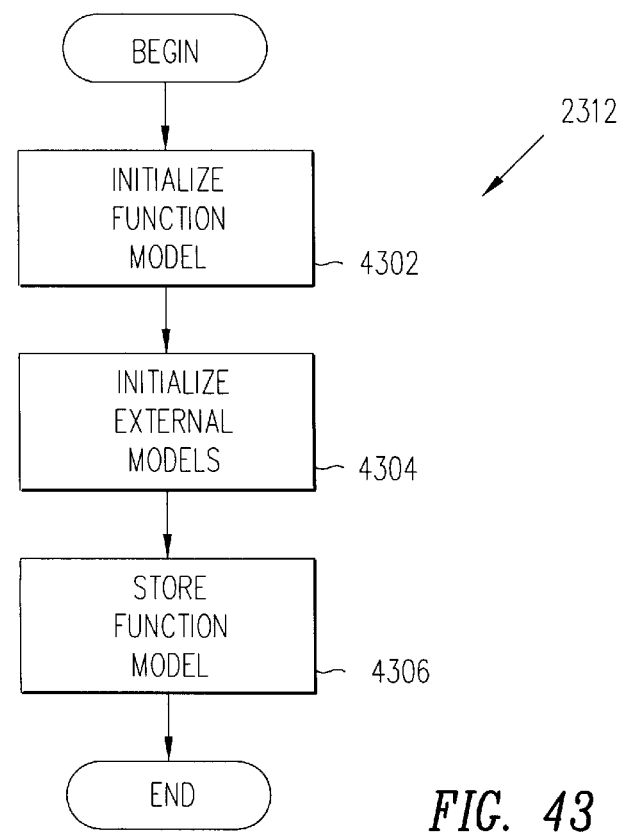
FIG. 43 is a logic flow diagram of the production of a function model from the analysis of the function in accordance with an embodiment of the present invention.

As described above, model machine 808 (FIG. 8) creates and stores a model of the subject function in step 2412 (FIG. 24). Step 2412 is shown in greater detail as logic flow diagram 2412 (FIG. 43). Processing begins in step 4302 in which model machine 808 (FIG. 8) allocates and initializes a function model structure such as function model structure 1100 (FIG. 11). Function model structure 1100 is initialized, in one embodiment, by storing in field "name" 1102, field "description" 1108, field "file" 1110, field "line" 1112, and field "automated" 1116 (i) the identifier of the function whose behavior is modelled in function model structure 1100, (ii) a textual description of the function, (iii) the name of the source code file and (iv) line within the source code file at which the function is defined, and (v) a boolean value indicating that the function is automatically modelled, respectively. A function is automatically modelled if the model of the function is generated by model machine 808 (FIG. 8). Conversely, if the model of the function is generated by a user of a text editor (not shown) in computer 100 (FIG. 1), the function is manually modelled. For example, library functions fopen ( ), malloc ( ), and free ( ) are manually modelled. Field "automated" 1116 (FIG. 11) of a function model structure which is read from model description file 604 (FIG. 6) in step 904 (FIG. 9) as described above is set to indicate that the function is manually modelled.

Figure 44:
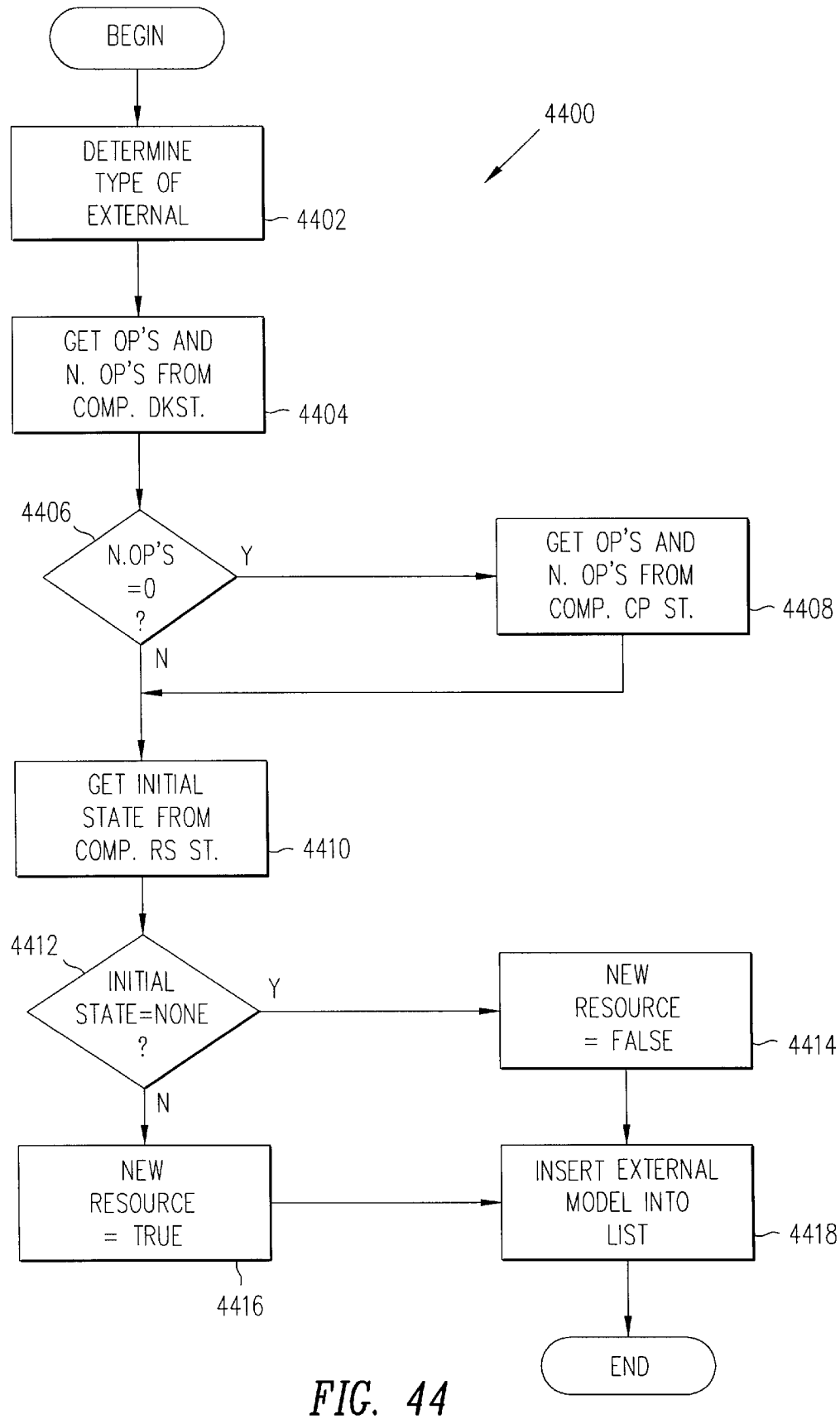
FIG. 44 is a logic flow diagram of the processing of a step of the logic flow diagram of FIG. 43.

From step 4302 (FIG. 43), processing transfers to step 4304 in which an external model structure, such as external model structure 1200 (FIG. 12), is created for each external of the subject function and is inserted into the singly-linked list of external model structures in the corresponding function model structure. For example, field "first external" 1104 (FIG. 11) and field "last external" 1106 are used as described above to associate with function model structure 1100 a singly-linked list of external model structures. The processing of a single external according to step 4304 (FIG. 43) is shown in logic flow diagram 4400 (FIG. 44).

Processing according to logic flow diagram 4400 begins in step 4402 in which model machine 808 (FIG. 8) determines the type of the external, i.e., whether the external is a parameter, returned item, or an item (i.e., either a globally-defined or a static item). If the external is a parameter, model machine 808 (FIG. 8) determines; the position of the parameter in the definition of the subject function. The first parameter is parameter number zero, and the number of the last parameter is one less than the number of parameters defined for the subject function. If the external is an item, model machine 808 (FIG. 8) determines the identifier of the item. The type of the external is stored in field "type" 1204 of external model structure 1200 (FIG. 12) as described above. Similarly, the parameter number, if one is determined, is stored in field "parameter number" 1206, and the identifier of the item, if one is determined, is stored in field "name" 1208.

Processing transfers from step 4402 to step 4404 in which model machine 808 (FIG. 8) determines the number of operations, and the particular operations, applied to the external during an emulated execution of the subject function. In step 4404, the operations and number of operations applied is determined according to the composite DK state of the external. Table N below summarizes the operations and number of operations derived from the composite DK state of an external.

TABLE N

| Composite DK State | No. of Ops. | Operations |
|---|---|---|
| O | 0 | |
| A | 1 | a |
| Q | 1 | m |
| K | 1 | k |
| KA | 2 | k, a |

TABLE N-continued

| Composite DK State | No. of Ops. | Operations |
|---|---|---|
| KQ | 2 | k, m |
| E | 0 | |

Thus, for example, if the composite DK state of an external is state A, emulated execution of the subject function applies operation a to the external. If, for example, the composite DK state of an external is state KQ, emulated execution of the subject function applies operation k, then operation m, to the external. As described above, the composite states of an external specific the comprehensive effect of multiple emulated executions of the subject function. Thus, the operations derived from the composite states of the external represent a distillation of the cumulative effect of execution of the subject function on the external.

Processing transfers from step 4404 to test step 4406, in which model machine 808 (FIG. 8) compares the number of operations to be applied to the external to zero. If the number of operations to be applied to the external equals zero, processing transfers to step 4408 (FIG. 414) in which model machine 808 (FIG. 8) determines the number of operations, and the particular operations, applied to the external during an emulated execution of the subject function according to the composite CP state of the external. Table O below summarizes the operations and number of operations derived from the composite CP state of an external.

TABLE O

| Composite CP State | No. of Ops. | Operations |
|---|---|---|
| O | 0 | |
| N | 0 | |
| C | 1 | c |
| I | 1 | i |
| P | 1 | p |

Thus, if the composite DK state of an external provides insufficient information regarding the cumulative effect of execution of the subject routine on the external, the composite CP state of the external is used to determine the cumulative effect of execution of the subject function. As an illustrative example, if the composite CP state of an external is state I, emulated execution of the subject function applies operation i to the external. In either step 4404 (FIG. 44) or step 4408, the operations and number of operations to be applied to the external are stored in fields "operations" 1214 (FIG. 12) and "number_of_operations" 1212, respectively, of external model structure 1200. Processing transfers from step 4408 (FIG. 44) to step 4410. In addition, if model machine 808 (FIG. 8) determines in test step 4406 (FIG. 44) that the number of operations to be applied to the external as determined in step 4404 is not zero, processing transfers directly from test step 4406 to step 4410.

In step 4410, model machine 808 (FIG. 8) determines the initial state of a resource associated with the external from the composite RS state of the external. In other words, the composite RS state of the external is stored in field "initial_state" 1220 (FIG. 12) of external model structure 1200. The composite RS state of an external reflects the cumulative effect of execution of the subject function on a resource associated with the external. Processing transfers from step 4410 (FIG. 44) to test step 4412 in which model machine 808 (FIG. 8) compares the composite RS state of the external to state NONE which indicates that no resource is associated with the external. If no resource is associated with the external, processing transfers from test step 4412 (FIG. 44) to step 4414 in which a boolean value of "false" is stored in field "new_resource" 1218 (FIG. 12) of external model structure 1200. Conversely, if a resource is associated with the external, i.e., if the composite RS state of the external is other than NONE, processing transfers from test step 4412 (FIG. 44) to step 4416. In step 4416, model machine 808 (FIG. 8) stores a boolean value of "true" in field "new_resource" 1218 (FIG. 12) of external model structure 1200 to indicate that emulated execution of the subject function creates a new resource associated with the external.

Processing transfers from either step 4414 (FIG. 44) or step 4416 to step 4418 in which model machine 808 (FIG. 8) inserts external model structure 1200 (FIG. 12) into the singly-linked list of external model structures of function model structure 1100 (FIG. 11). After step 4418 (FIG. 44), processing according to logic flow diagram 4400 terminates.

After each external of the subject function is processed according to logic flow diagram 4400 in step 4304 (FIG. 43), processing transfers to step 4306 in which function model structure 1100 (FIG. 11), representing the subject function, is stored in a data structure which includes all function model structures. After step 4306, processing according to logic flow diagram 2412, and therefore step 2412 (FIG. 24), terminates. The function model represented by the stored function model structure can then be used as described more completely below to emulate execution of the subject function when analyzing other functions which call the subject function.

Assignment of the Value of One Item to Another Item

As described above, in step 3356 (FIG. 33C), the value of one item, e.g., the rhs, is assigned to another item, e.g., the lhs. Step 3356 is shown in greater detail as logic flow diagram 3356 (FIG. 45) in which processing begins in test step 4502. In test step 4502, execution engine 802 (FIG. 8) determines whether the lhs and the rhs are represented by items. As described above, an expression, such as the lhs or the rhs, evaluates to an item if execution engine 802 has sufficient information to evaluate the expression and evaluates to a NULL otherwise. If an expression evaluates to an item, the expression is represented by that item. If either the lhs or the rhs is not represented by an item, processing transfers from test step 4502 (FIG. 45) to test step 4510 which is described below. Conversely, if both the lhs and the rhs are represented by items, processing transfers from test step 4502 to step 4504.

In step 4504, fields of the item representing the lhs, i.e., the lhs item, are made equivalent to corresponding fields of the item representing the rhs, i.e., the rhs item. Specifically, data stored in fields of the rhs item corresponding to fields "resource" 2702 (FIG. 27), "external" 2704, "value" 2706, "type_code" 2712, "initialized" 2714, and "invalid_pointer" 2720 of item structure 2700 are copied and stored in respective corresponding fields of the lhs item. Processing transfers from step 4504 (FIG. 45) to test step 4506 in which execution engine 802 (FIG. 8) determines whether the rhs is initialized. Execution engine 802 makes such a determination by comparing a field of the rhs item corresponding to field "initialized" 2714 (FIG. 27) of item structure 2700 to a boolean value of "false".

If the rhs is initialized, i.e., if the field of the rhs item corresponding to field "initialized" 2714 (FIG. 27) of item structure 2700 has a boolean value of "true", processing according to logic flow diagram 3356, and therefore step 3356 (FIG. 33C), terminates. Conversely, if the rhs is uninitialized, i.e., if the field of the rhs item corresponding to field "initialized" 2714 (FIG. 27) of item structure 2700 has a boolean value of "false", processing transfers from test step 4506 (FIG. 45) to step 4508. In step 4508, an error message is issued, to an error log file and/or to a display on video monitor 118 as described above, warning of the use of uninitialized data. Since the field of the rhs item corresponding to field "initialized" 2714 (FIG. 27) is copied to the corresponding field in the lhs item in step 4504 as described above, the lhs item is also marked as uninitialized. After step 4508 (FIG. 45), processing according to logic flow diagram 3356, and therefore step 3356 (FIG. 33C), terminates.

As described above, if either the lhs or the rhs is not represented by an item, processing transfers from test step 4502 (FIG. 45) to test step 4510. In test step 4510, execution engine 802 (FIG. 8) determines whether the rhs and lhs are represented by respective items. If the lhs is represented by an item and the rhs is not represented by an item, processing transfers from test step 4510 (FIG. 45) to step 4512. Otherwise, processing according to logic flow diagram 3356, and therefore step 3356 (FIG. 33C), terminates.

In step 4512 (FIG. 45), execution engine 802 (FIG. 8) marks the lhs item as unknown. For example, if item structure 2700 (FIG. 27) represents the lhs item, execution engine 802 (FIG. 8) marks the lhs item as unknown by (i) storing in field "type_code" 2712 (FIG. 27) data which indicates an unknown data type, (ii) storing in field "initialized" 2714 data indicating that the lhs item is uninitialized, and (iii) storing in fields "resource" 2702 and "external" 2704 NULLs to indicate that the lhs has no associated external or resource. After step 4512 (FIG. 45), processing according to logic flow diagram 3356, and therefore step 3356 (FIG. 33C), terminates.

Figure 39:
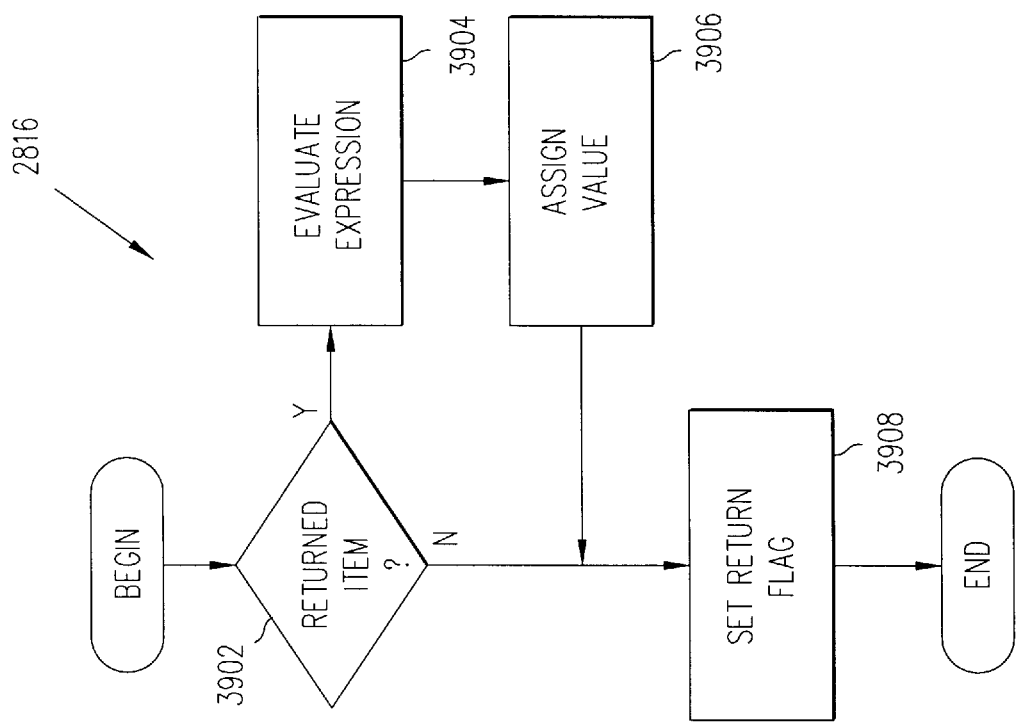
FIG. 39 is a logic flow diagram of the processing of a "return" statement in accordance with an embodiment of the present invention.

Thus, in step 3356, the value of the item representing the rhs is assigned to the item representing the lhs. As described above, execution engine 802 (FIG. 8) assigns the value of an item to which an expression evaluates to a declared item in step 3408 (FIG. 34). The assignment in step 3408 is directly analogous to the assignment of the rhs item to the lhs item described above with respect to logic flow diagram 3356 (FIG. 45). As described above in step 3812 (FIG. 38), execution engine 802 (FIG. 8) assigns the value of a known item to an unknown item. The assignment of a known item to an unknown item in step 3812 (FIG. 38) is directly analogous to the assignment of the rhs item to the lhs item described above with respect to logic flow diagram 3356 (FIG. 45). As described above, execution engine 802 (FIG. 8) assigns the value of an item to which an expression evaluates to a returned item in step 3906 (FIG. 39). The assignment in step 3906 is directly analogous to the assignment of the rhs item to the lhs item described above with respect to logic flow diagram 3356 (FIG. 45).

Emulating a Function

As described above, execution engine 802 (FIG. 8) evaluates a call to a function by emulating execution of the function in step 3352 (FIG. 33C). Step 3352 is shown in greater detail as logic flow diagram 3352 (FIG. 46) in which processing begins in step 4602. Execution of a called function is emulated according to a function model structure which represents the behavior of the called function. In test step 4602, execution engine 802 (FIG. 8) determines whether a function model structure representing the behavior of the called function is stored in memory 104 (FIG. 1). As described above, function model structure 1100 (FIG. 11) includes a field "name" 1102 which contains data representing the identifier of the function whose behavior is represented by function model structure 1100. Corresponding fields of various function model structures representing the behavior of respective functions are compared to the identifier by which the called function is called in the subject function until either all function model structures have been checked or a function model structure whose field "name" matches the identifier is found.

If no function model structure with a field "name" matching the identifier is found, processing transfers from test step 4602 (FIG. 46) to step 4604 in which a NULL is produced as the item to which emulated execution of the called function evaluates. As described above, an expression evaluates to a NULL when execution engine 802 (FIG. 8) has insufficient information to properly evaluate the expression. After performance of step 4604 (FIG. 46), processing according to logic flow diagram 3352, and therefore step 3352 (FIG. 33C), terminates.

If, on the other hand, a Junction model structure whose field "name" matches the identifier by which the subject function calls the called function, that function model structure is the called function model structure, i.e., the function model structure representing the behavior of the called function, and processing transfers from test step 4602 (FIG. 46) to loop step 4606. Loop step 4606 and next step 4630 form a loop in which each external represented by an external model structure within the called function model structure is processed. As described above with respect to FIG. 13, a function model structure such as function model structure 1100A includes a field "first_external" 1104A which points to the first external model structure in a singly-linked list of external model structures. For each external in the singly-linked list of external model structures of the called function model structure, processing transfers from loop step 4606 (FIG. 46) to test step 4608. After each external of the singly-linked list of external model structures of the called function model structure has been processed, processing transfers from loop step 4606 to step 4632 which is described below in greater detail.

In the context of the following description of steps 4608–4628, the external model structure being processed according to the loop formed by loop step 4606 and next step 4630 is external model structure 1200 (FIG. 12) as an illustrative example of the processing of an external model structure. In test step 4608 (FIG. 46), execution engine 802 (FIG. 8) determines whether external model structure 1200 (FIG. 12) represents a parameter by comparing field "type" 1204 to data indicating a parameter. If external model structure 1200 does not represent a parameter, processing transfers from test step 4608 (FIG. 46) to test step 4612 which is described below in greater detail. Conversely, if external model structure 1200 (FIG. 12) represents a parameter, processing transfers from test step 4608 (FIG. 46) to step 4610.

In step 4610, execution engine 802 (FIG. 8) retrieves an item representing the parameter. As described above with respect to loop step 3348 (FIG. 33C), step 3349, and next step 3350, execution engine 802 (FIG. 8) includes an array of items representing the parameters of the called function. The particular parameter represented by external model structure 1200 (FIG. 12) is specified in field "parameter_number" 1206. Processing transfers from step 4610 (FIG. 46) to test step 4616 which is described more completely below.

As described above, processing transfers from test step 4608 to test step 4612 if external model structure 1200 (FIG. 12) does not represent a parameter. In test step 4612 (FIG. 46), execution engine 802 (FIG. 8) determines whether external model structure 1200 (FIG. 12) represents a variable by comparing data stored within field "type" 1204 to data indicating that a variable is represented. If external model structure 1200 (FIG. 12) does not represent a variable, processing transfers from test step 4612 (FIG. 46) to test step 4616 which is described below in greater detail. Conversely, if external model structure 1200 (FIG. 12) represents a variable, processing transfers from test step 4612 to step 4614.

In step 4614, execution engine 802 (FIG. 8) evaluates the variable represented by external model structure 1200 (FIG. 12). Execution engine 802 (FIG. 8) evaluates the variable by retrieving the item of the variable. Within a function structure representing the subject function, a declaration structure, e.g., declaration structure 1506 (FIG. 16), represents the variable represented by external model structure 1200 (FIG. 12). External model structure 1200 identifies the particular variable represented by storing in field "name" 1208 the identifier of the variable. If external model structure 1200 and declaration structure 1506 (FIG. 16) represent the same variable, the identifier stored in field "name" 1604 is the same as the identifier stored in field "name" 1208 (FIG. 12). The variable is evaluated by retrieving item structure 2700 to which field "item" 1608 of declaration structure 1506 points. Processing transfers from step 4614 (FIG. 46) to test step 4616.

Figure 46:
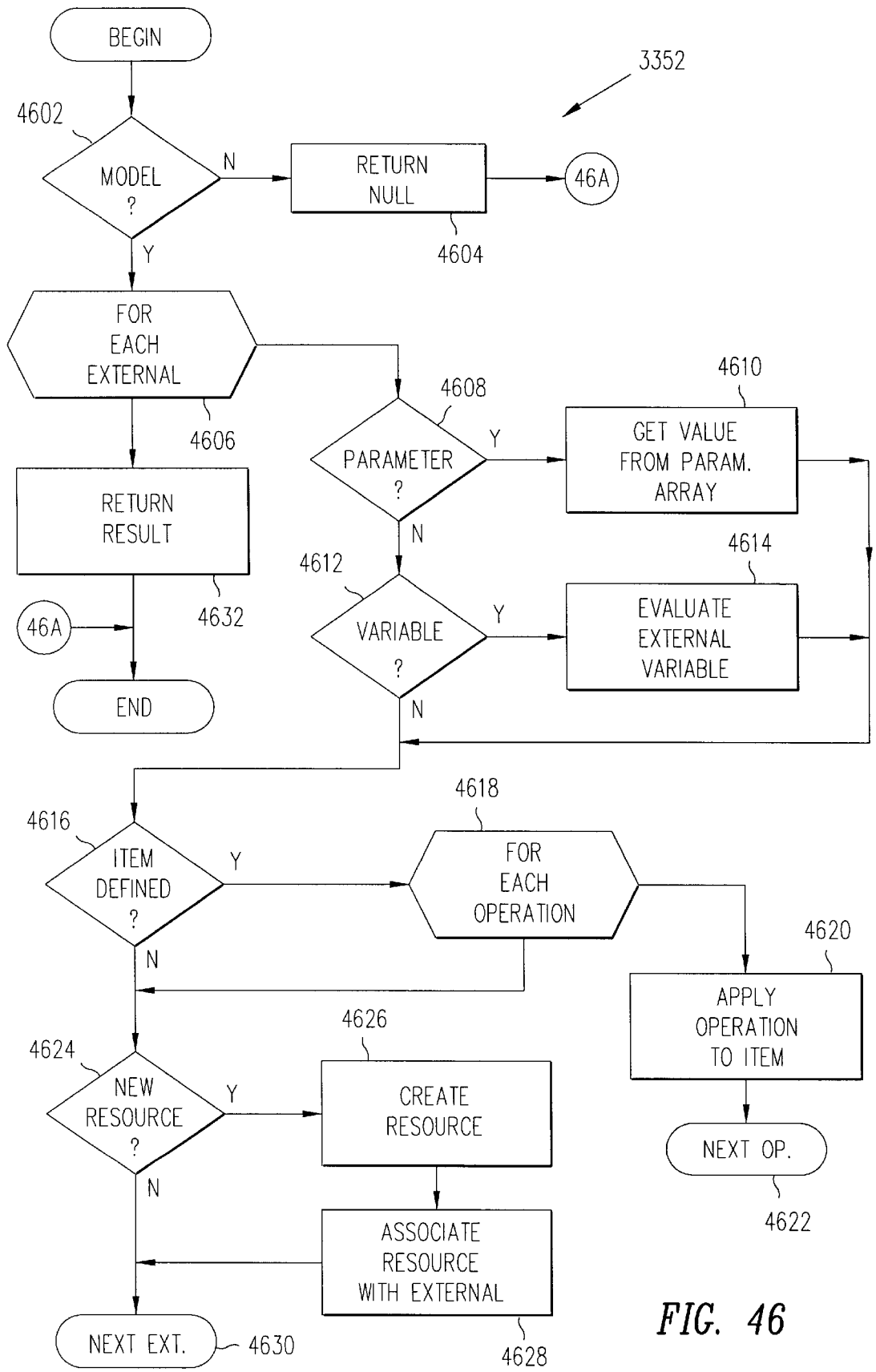
FIG. 46 is a logic flow diagram of the emulation of a called routine in accordance with an embodiment of the present invention.

As described above, processing transfers to test step 4616 from test step 4612 if external model structure 1200 (FIG. 12) represents neither a parameter nor a variable, i.e., if external model structure 1200 represents the returned item of the called function. Furthermore, processing transfers from either step 4610 (FIG. 46) or step 4614 to test step 4616. In test step 4616, execution engine 802 (FIG. 8) determines whether an item representing the external represented by external model structure 1200 (FIG. 12) is defined. Such an item is defined (i) in step 4610 if the value of the parameter represented by external model structure 1200 is defined and evaluates to a known value and if processing flows through step 4610 (FIG. 46) or (ii) in step 4614 if the variable represented by external model structure 1200 (FIG. 12) is initialized and processing flows through step 4614 (FIG. 46).

If an item representing the external represented by external model structure 1200 (FIG. 12) is not defined, processing transfers from test step 4616 (FIG. 46) to test step 4624 which is described below in greater detail. Conversely, is such an item is defined, processing transfers from test step 4616 to loop step 4618.

Loop step 4618 and next step 4622 form a loop in which each operation stored in field "operations" 1214 (FIG. 12) of external model structure 1200 is processed. As described above, the number of operations stored in field "operations" 1214 is recorded in field "num_operations" 1212. For each operation stored in field "operations" 1214, processing transfers from loop step 4618 (FIG. 46) to step 4620 in which the operation is applied to the external represented by external model structure 1200 (FIG. 12) in the manner described above with respect to step 2906 (FIG. 29). Any errors detected by application of the operation to the external is reported to the user as a programming error in the manner described above. From step 4620 (FIG. 46), processing transfers through next step 4622 to loop step 4618 in which the next operation, if any, stored in field "operations" 1214

(FIG. 12) is processed. Once all operations stored in field "operations" 1214 are processed according to the loop defined by loop step 4618 (FIG. 46) and next step 4622, processing transfers to test step 4624.

In test step 4624, execution engine 802 (FIG. 8) determines whether external model structure 1200 (FIG. 12) specifies that a new resource is created on behalf of the external represented by external model structure 1200. Execution engine 802 (FIG. 8) makes such a determination by comparing field "new_resource" 1218 (FIG. 12) to a boolean value of "true"If field "new_resource" 1218 is "false", processing transfers from test step 4624 (FIG. 46) through next step 4630 to loop step 4606 in which the next external is processed according to the loop defined by loop step 4606 and next step 4630 as described above. Conversely, if field "new_resource" 1218 (FIG. 12) is "true", processing transfers from test step 4624 (FIG. 46) to step 4626.

In step 4626, execution engine 802 (FIG. 8) creates a new resource by (i) creating and storing in memory 104 (FIG. 1) an item structure, e.g., item structure 2700 (FIG. 27), and a resource state structure, e.g., resource state structure 3100 (FIG. 31), and (ii) storing in field "resource" 2702 a pointer to resource state structure 3100 (FIG. 31), thereby associating resource state structure 3100 with item structure 2700 (FIG. 27). Processing transfers from step 4626 (FIG. 46) to step 4628 in which execution engine 802 (FIG. 8) associates the new item with the external represented by external model structure 1200 (FIG. 12). If external list structure 1414 (FIG. 15) represents the external, the item is associated with the external by storing in field "item" 1608 (FIG. 16) of declaration structure 1506, to which field "first_decl" 1502 (FIG. 15) points, a pointer to item structure 2700 (FIG. 27).

If the external is the returned item of the called function, a result record, which is set to NULL at the beginning of logic flow diagram 3352 (FIG. 46), is set to the new item. The external is the returned item of the called function if field "type" 1204 (FIG. 12) of external model structure 1200 so indicates. If the external is not the returned item of the called function, the new item is made field "item" 1608 (FIG. 16) of declaration structure 1506 which represents the external.

From step 4628 (FIG. 46), processing transfers through next step 4630 to loop step 4606 in which the next external is processed as described above. Once all externals represented by external structures of the singly-linked list of external structures pointed to by fields "first_external" 1104 (FIG. 11) and "last_external" 1106 of function model structure 1100 which represents the called function have been processed, processing transfers from loop step 4606 (FIG. 46) to step 4632. In step 4632, execution engine 802 (FIG. 8) produces, as the item to which emulated execution of the called function evaluates, the result record. As described above with respect to step 4628 (FIG. 46), the result record is initialized to a NULL and is set to the value of the returned item if a new resource is created on behalf of the returned item.

After step 4632, processing according to logic flow diagram 3352, and therefore step 3352 (FIG. 33C), terminates. Thus, by use of a model representing the behavior of a called function, a call to the called function within the subject function is evaluated to analyze the effect on resources and externals of execution of the called function.

Bunches of Memory

One of the peculiarities of the C computer language is that certain memory can be treated as a contiguously-allocated array. The following types of memory can be accessed according to the C computer language as if the memory is allocated as a contiguous block: (i) any data, whether a variable or parameter, defined using the instructions "struct" or "array", i.e., any complex data structures or arrays, respectively; (ii) any pointer passed into a function as a parameter; and (iii) any memory allocated by performance of function calloc ( ) or function malloc ( ) as defined within the C computer language. The disclosed embodiment of the present invention uses a bunch of memory to model contiguously allocated memory.

Item structures are allocated in bunches, i.e., in contiguous arrays of item structures. For the simple case of an item structure representing a single integer or floating point variable declaration, the bunch includes a single item structure. Bunches of item structures representing variables of complex types, i.e., variables of the type "struct", and arrays are represented by multiple item structures, one for each four (4) bytes of the array or the variable of a complex type.

Representing contiguously allocated memory with contiguously allocated item structures allows detection of some illegal array references. For example, a reference to an item structure outside the bounds of the bunch of contiguously allocated item structures corresponds to an illegal index of an array represented by the bunch. In addition, forming item structures in bunches simplifies detection of memory leaks as described above. For example, if any item structure in a bunch is reachable by an external of a function, every item structure in the bunch is reachable by an external of the function.

As described above, item structure 2700 (FIG. 27) includes field "first_in_bunch" 2708, field "size_of_bunch" 2710, field "head_in_bunch" 2716, and field "known_bunch_size" 2718. Field "first_in_bunch" 2708 is a pointer to the first item structure in the bunch of item structures which includes item structure 2700. If item structure 2700 is the first item structure in a bunch, field "first_in_bunch" 2708 points to item structure 2700. Field "size_of_bunch" 2710 indicates the number of item structures in the bunch which includes item structure 2700. In one embodiment, field "size_of_bunch" 2710 is so defined only in the item structure which is first in a given bunch.

Field "head_in_bunch" 2716 is a flag which indicates whether item structure 2700 is the first item structure in the bunch which includes item structure 2700. Field "known_bunch_size" 2718 is a flag which indicates whether the bunch which includes item structure 2700 has a known size. A bunch has an unknown size, for example, (i) when the bunch is allocated dynamically, e.g., by calling function malloc ( ), and execution engine 802 (FIG. 8) has insufficient information to calculate the amount of memory requested; (ii) when the bunch is passed into the subject function; or (iii) when the bunch is of such a size that tracking each item of the bunch is impractical. If a bunch has an unknown size, as indicated by field "known_bunch_size" 2718, execution engine 802 (FIG. 8) does not check for boundary violations with respect to the bunch.

The computer program in Microfiche Appendix A was compiled and linked, in one embodiment, using the UNIX operating system SunOS 4.1.3, the compiler, and the linker that are provided with a workstation such as the Sun Sparcstation® II computer system available from Sun Microsystems of Mountain View, Calif. In a second embodiment, the computer program in Microfiche Appendix A was compiled using the Microsoft Visual C++1.5 compiler, and was linked using the Microsoft Visual C++1.5 linker, both of which are available from Microsoft Corporation of Redmond, Wash. and which can be used on a personal computer using the MSDOS 6.2 operating system and Microsoft® Windows™ 3.1, which are also available from Microsoft Corporation. Such a personal computer is the Art 4000S available from Atman Computer of San Francisco, Calif. The particular computer language to which the computer program in Microfiche Appendix A conforms and the computer system in which a computer process defined by the computer program of Microfiche Appendix A is executed are not an essential aspect of this invention. In view of this disclosure, those skilled in the art can implement the invention using a different computer language and/or a different computer system.

Microfiche Appendix A includes a number of source code files including two separate embodiments of a source code file "readin.c", each of which defines a number of functions and data structures in accordance with a respective embodiment of the present invention. The first embodiment of the source code file "readin.c" appears on frames 64–74 of Microfiche Appendix A, and the second embodiment of the source code file "readin.c" appears on frames 77–87 of Microfiche Appendix A. It should be understood that only one embodiment of the source code file "readin.c" should be compiled and linked with the remainder of Microfiche Appendix A to form a resource checker in accordance with the principles of the present invention.

The above description is illustrative only and is not limiting. For example, while the disclosed embodiment analyzes functions according to the C computer language, the principles of the present invention are applicable to other computer instruction protocols including without limitation those described above. The present invention is limited only by the claims which follow.

APPENDIX B

```
    /* This file contains the definitions and documentation
       for mapping the parse trees used by the GNU C compiler
 5     to the parse tree written out.

Copyright (C) 1994 Jonathan D. Pincus and William R.
       Bush Copyright (C) Free Software Foundation, Inc.

10     This file uses GNU CC functions.

GNU CC is free software; you can redistribute it and/or
       modify it under the terms of the GNU General Public
       License as published by the Free Software Foundation;
15     either version 2, or (at your option) any later
       version.

GNU CC is distributed in the hope that it will be
       useful, but WITHOUT ANY WARRANTY; without even the
20     implied warranty of MERCHANTABILITY or FITNESS FOR A
       PARTICULAR PURPOSE.  See the GNU General Public License
       for more details.

You should have received a copy of the GNU General
25     Public License along with GNU CC; see the file COPYING.
       If not, write to the Free Software Foundation, 675 Mass
       Ave, Cambridge, MA 02139, USA.  */

/* The second argument is what parse code record to
30     write out:
            ERROR_RECORD         represents some error in the
                                 parse
            STRING_RECORD        a string or identifier
            STATEMENT_RECORD     a statement
35          TYPE_RECORD          a type
            DECLARATION_RECORD   a declaration (?)
```

```
              FUNCTION_RECORD     a function declaration
              EXPRESSION_RECORD   an expressinon UNKNOWN_RECORD      not yet supported
  5           IGNORE_RECORD       does not need to be written
                                  out The third argument is what 'kind' to write out, if any 10   For expressions, the fourth argument is how many
      operands to write out; a -1 is special code (for
      CALL_EXPRs).  This argument is ignored for other nodes.

See comments in tree.def for discussion of what the
 15   tree nodes represent.

*/

MAPTREECODE (ERROR_MARK, ERROR_RECORD, 0, 0)
 20   MAPTREECODE (IDENTIFIER_NODE, STRING_RECORD, 0, -1)
      MAPTREECODE (OP_IDENTIFIER, UNKNOWN_RECORD, 0, 2)
      MAPTREECODE (TREE_LIST, UNKNOWN_RECORD, 0, 2)
      MAPTREECODE (TREE_VEC, UNKNOWN_RECORD, 0, 2)
      MAPTREECODE (BLOCK, UNKNOWN_RECORD, 0, 0)
 25
      /* Types */

MAPTREECODE (VOID_TYPE, TYPE_RECORD, VOID_TYPEDEF, 0)
      MAPTREECODE (INTEGER_TYPE, TYPE_RECORD,
 30              INTEGER_TYPEDEF, 0)
      MAPTREECODE (REAL_TYPE, TYPE_RECORD, REAL_TYPEDEF, 0)
      MAPTREECODE (COMPLEX_TYPE, UNKNOWN_RECORD, 0, 0)
      MAPTREECODE (ENUMERAL_TYPE, TYPE_RECORD, ENUM_TYPEDEF,
                   0)
 35   MAPTREECODE (BOOLEAN_TYPE, TYPE_RECORD,
                   INTEGER_TYPEDEF, 0)
```

```
    MAPTREECODE (CHAR_TYPE, UNKNOWN_RECORD, 0, 0)
    MAPTREECODE (POINTER_TYPE, TYPE_RECORD,
                POINTER_TYPEDEF, 0)
    MAPTREECODE (OFFSET_TYPE, UNKNOWN_RECORD, 0, 0)
 5  MAPTREECODE (REFERENCE_TYPE, UNKNOWN_RECORD, 0, 0)
    MAPTREECODE (METHOD_TYPE, UNKNOWN_RECORD, 0, 0)
    MAPTREECODE (FILE_TYPE, UNKNOWN_RECORD, 0, 0)
    MAPTREECODE (ARRAY_TYPE, TYPE_RECORD, ARRAY_TYPEDEF, 0)
    MAPTREECODE (SET_TYPE, UNKNOWN_RECORD, 0, 0)
10  MAPTREECODE (STRING_TYPE, UNKNOWN_RECORD, 0, 0)
    MAPTREECODE (RECORD_TYPE, TYPE_RECORD, STRUCT_TYPEDEF,
                0)
    MAPTREECODE (UNION_TYPE, TYPE_RECORD, UNION_TYPEDEF, 0)
    MAPTREECODE (FUNCTION_TYPE, TYPE_RECORD,
15              FUNCTION_TYPEDEF, 0)
    MAPTREECODE (LANG_TYPE, UNKNOWN_RECORD, 0, 0)

/* Constants */

20  MAPTREECODE (INTEGER_CST, EXPRESSION_RECORD,
                CONSTANT_INTEGER, 1)
    MAPTREECODE (REAL_CST, EXPRESSION_RECORD,
                CONSTANT_REAL, 2)
    MAPTREECODE (COMPLEX_CST, UNKNOWN_RECORD, 0, 0)
25  MAPTREECODE (STRING_CST, EXPRESSION_RECORD,
                CONSTANT_STRING, 1)

/* Declarations.  */

30  MAPTREECODE (FUNCTION_DECL, DECLARATION_RECORD,
                FUNCTION_DECLARATION, 0)
    MAPTREECODE (LABEL_DECL, IGNORE_RECORD, 0, 0)
    MAPTREECODE (CONST_DECL, UNKNOWN_RECORD, 0, 0)
    MAPTREECODE (TYPE_DECL, IGNORE_RECORD, 0, 0)
35  MAPTREECODE (VAR_DECL, DECLARATION_RECORD,
                LOCAL_VARIABLE_DECLARATION, 0)
```

```
        MAPTREECODE (PARM_DECL, DECLARATION_RECORD,
                    PARAMETER_DECLARATION, 0)
        MAPTREECODE (RESULT_DECL, DECLARATION_RECORD,
                    RESULT_DECLARATION,   0)
 5      MAPTREECODE (FIELD_DECL, DECLARATION_RECORD,
                    LOCAL_VARIABLE_DECLARATION, 0)

/* references to storage */
        MAPTREECODE (COMPONENT_REF, EXPRESSION_RECORD,
10                  FIELD_REFERENCE, 2)
        MAPTREECODE (BIT_FIELD_REF, UNKNOWN_RECORD, 0, 3)
        MAPTREECODE (INDIRECT_REF, EXPRESSION_RECORD,
                    OP_INDIRECTION, 1)
        MAPTREECODE (OFFSET_REF, UNKNOWN_RECORD, 0, 2)
15      MAPTREECODE (BUFFER_REF, UNKNOWN_RECORD, 0, 1)
        MAPTREECODE (ARRAY_REF, EXPRESSION_RECORD,
                    ARRAY_OFFSET, 2)
        MAPTREECODE (CONSTRUCTOR, UNKNOWN_RECORD, 0, 2)

20      /* operators */
        MAPTREECODE (COMPOUND_EXPR, EXPRESSION_RECORD,
                COMPOUND_EXPRESSION, 2)
        MAPTREECODE (MODIFY_EXPR, EXPRESSION_RECORD,
                    ASSIGNMENT, 2)
25      MAPTREECODE (INIT_EXPR, UNKNOWN_RECORD, 0, 2)
        MAPTREECODE (TARGET_EXPR, UNKNOWN_RECORD, 0, 3)
        MAPTREECODE (COND_EXPR, EXPRESSION_RECORD, CONDITIONAL,
                    3)
        MAPTREECODE (BIND_EXPR, UNKNOWN_RECORD, 0, 3)
30      MAPTREECODE (CALL_EXPR, EXPRESSION_RECORD,
                    FUNCTION_CALL, -1)
        MAPTREECODE (METHOD_CALL_EXPR, UNKNOWN_RECORD, 0, 4)
        MAPTREECODE (WITH_CLEANUP_EXPR, UNKNOWN_RECORD, 0, 3)

35      /* arithmetic */
```

```
        MAPTREECODE (PLUS_EXPR, EXPRESSION_RECORD, OP_PLUS, 2)
        MAPTREECODE (MINUS_EXPR, EXPRESSION_RECORD, OP_MINUS,
                    2)
        MAPTREECODE (MULT_EXPR, EXPRESSION_RECORD, OP_TIMES, 2)
   5    MAPTREECODE (TRUNC_DIV_EXPR, EXPRESSION_RECORD, OP_DIV,
                    2)
        MAPTREECODE (CEIL_DIV_EXPR, EXPRESSION_RECORD, OP_DIV,
                    2)
        MAPTREECODE (FLOOR_DIV_EXPR, EXPRESSION_RECORD, OP_DIV,
  10                2)
        MAPTREECODE (ROUND_DIV_EXPR, EXPRESSION_RECORD, OP_DIV,
                    2)
        MAPTREECODE (TRUNC_MOD_EXPR, EXPRESSION_RECORD, OP_MOD,
                    2)
  15    MAPTREECODE (CEIL_MOD_EXPR, EXPRESSION_RECORD, OP_MOD,
                    2)
        MAPTREECODE (FLOOR_MOD_EXPR, EXPRESSION_RECORD, OP_MOD,
                    2)
        MAPTREECODE (ROUND_MOD_EXPR, EXPRESSION_RECORD, OP_MOD,
  20                2)
        MAPTREECODE (RDIV_EXPR, EXPRESSION_RECORD, OP_DIV, 2)
        MAPTREECODE (EXACT_DIV_EXPR, EXPRESSION_RECORD, OP_DIV,
                    2)
        MAPTREECODE (FIX_TRUNC_EXPR, EXPRESSION_RECORD,
  25                CONVERT_TO_INT, 1)
        MAPTREECODE (FIX_CEIL_EXPR, EXPRESSION_RECORD,
                    CONVERT_TO_INT, 1)
        MAPTREECODE (FIX_FLOOR_EXPR, EXPRESSION_RECORD,
                    CONVERT_TO_INT, 1)
  30    MAPTREECODE (FIX_ROUND_EXPR, EXPRESSION_RECORD,
                    CONVERT_TO_INT, 1)
        MAPTREECODE (FLOAT_EXPR, EXPRESSION_RECORD,
                    CONVERT_TO_REAL, 1)
        MAPTREECODE (EXPON_EXPR, EXPRESSION_RECORD, OP_POW, 2)
  35
        MAPTREECODE (NEGATE_EXPR, EXPRESSION_RECORD,
```

```
                 OP_UNARY_MINUS, 1)

MAPTREECODE (MIN_EXPR, UNKNOWN_RECORD, 0, 2)
      MAPTREECODE (MAX_EXPR, UNKNOWN_RECORD, 0, 2)
 5    MAPTREECODE (ABS_EXPR, UNKNOWN_RECORD, 0, 1)
      MAPTREECODE (FFS_EXPR, UNKNOWN_RECORD, 0, 1)
      MAPTREECODE (LSHIFT_EXPR, EXPRESSION_RECORD,
                 OP_SHIFT_LEFT, 2)
      MAPTREECODE (RSHIFT_EXPR, EXPRESSION_RECORD,
10               OP_SHIFT_RIGHT, 2)
      MAPTREECODE (LROTATE_EXPR, EXPRESSION_RECORD,
                 OP_SHIFT_LEFT, 2)
      MAPTREECODE (RROTATE_EXPR, EXPRESSION_RECORD,
                 OP_SHIFT_RIGHT, 2)
15
      /* Bit operations. */
      MAPTREECODE (BIT_IOR_EXPR, EXPRESSION_RECORD, OP_OR, 2)
      MAPTREECODE (BIT_XOR_EXPR, EXPRESSION_RECORD,
                 OP_XOR_BITS, 2)
20    MAPTREECODE (BIT_AND_EXPR, EXPRESSION_RECORD,
                 OP_AND_BITS, 2)
      MAPTREECODE (BIT_ANDTC_EXPR, EXPRESSION_RECORD,
                 OP_AND_BITS, 2)
      MAPTREECODE (BIT_NOT_EXPR, EXPRESSION_RECORD,
25             OP_NOT_BITS, 1)

/* boolean operations */

MAPTREECODE (TRUTH_ANDIF_EXPR, EXPRESSION_RECORD,
30           OP_AND, 2)
      MAPTREECODE (TRUTH_ORIF_EXPR, EXPRESSION_RECORD, OP_OR,
                 2)
      MAPTREECODE (TRUTH_AND_EXPR, EXPRESSION_RECORD, OP_AND,
                 2)
35    MAPTREECODE (TRUTH_OR_EXPR, EXPRESSION_RECORD, OP_OR,
                 2)
```

```
        MAPTREECODE (TRUTH_NOT_EXPR, EXPRESSION_RECORD, OP_NOT,
                    1)

/* relational operators */
  5
        MAPTREECODE (LT_EXPR, EXPRESSION_RECORD, OP_LT, 2)
        MAPTREECODE (LE_EXPR, EXPRESSION_RECORD, OP_LE, 2)
        MAPTREECODE (GT_EXPR, EXPRESSION_RECORD, OP_GT, 2)
        MAPTREECODE (GE_EXPR, EXPRESSION_RECORD, OP_GE, 2)
 10     MAPTREECODE (EQ_EXPR, EXPRESSION_RECORD, OP_EQUAL, 2)
        MAPTREECODE (NE_EXPR, EXPRESSION_RECORD, OP_NOT_EQUAL,
                    2)

/* Operations for Pascal sets. Not used now. */
 15     MAPTREECODE (IN_EXPR, UNKNOWN_RECORD, 0, 2)
        MAPTREECODE (SET_LE_EXPR, UNKNOWN_RECORD, 0, 2)
        MAPTREECODE (CARD_EXPR, UNKNOWN_RECORD, 0, 1)
        MAPTREECODE (RANGE_EXPR, UNKNOWN_RECORD, 0, 2)

20     /* placeholders; don't bother to write out */
        MAPTREECODE (CONVERT_EXPR, EXPRESSION_RECORD, -1, 1)
        MAPTREECODE (NOP_EXPR, EXPRESSION_RECORD, -1, 1)
        MAPTREECODE (NON_LVALUE_EXPR, EXPRESSION_RECORD, -1, 1)
        MAPTREECODE (SAVE_EXPR, EXPRESSION_RECORD, -1, 1)
 25     MAPTREECODE (RTL_EXPR, UNKNOWN_RECORD, 0, 2)

MAPTREECODE (ADDR_EXPR, EXPRESSION_RECORD,
                    OP_ADDRESS_OF, 1)

30     MAPTREECODE (REFERENCE_EXPR, UNKNOWN_RECORD, 0, 1)
        MAPTREECODE (ENTRY_VALUE_EXPR, UNKNOWN_RECORD, 0, 1)
        MAPTREECODE (COMPLEX_EXPR, UNKNOWN_RECORD, 0, 2)
        MAPTREECODE (CONJ_EXPR, UNKNOWN_RECORD, 0, 1)
        MAPTREECODE (REALPART_EXPR, UNKNOWN_RECORD, 0, 1)
 35     MAPTREECODE (IMAGPART_EXPR, UNKNOWN_RECORD, 0, 1)
```

-150-

```
      /* Nodes for ++ and -- in C. */
      MAPTREECODE (PREDECREMENT_EXPR, EXPRESSION_RECORD,
          OP_PREDECREMENT, 2)
      MAPTREECODE (PREINCREMENT_EXPR, EXPRESSION_RECORD,
   5      OP_PREINCREMENT, 2)
      MAPTREECODE (POSTDECREMENT_EXPR, EXPRESSION_RECORD,
          OP_POSTDECREMENT, 2)
      MAPTREECODE (POSTINCREMENT_EXPR, EXPRESSION_RECORD,
          OP_POSTINCREMENT, 2)
  10
      /* these are actually represented as statements; they
      should never crop up as exprs */

MAPTREECODE (LABEL_EXPR, UNKNOWN_RECORD, 0, 1)
  15  MAPTREECODE (GOTO_EXPR, UNKNOWN_RECORD, 0, 1)
      MAPTREECODE (RETURN_EXPR, UNKNOWN_RECORD, 0, 1)
      MAPTREECODE (EXIT_EXPR, UNKNOWN_RECORD, 0, 1)
      MAPTREECODE (LOOP_EXPR, UNKNOWN_RECORD, 0, 1)

20  /* interm.c: map the parse trees used by the GNU C
      compiler to the intermediate form (parse tree written
      out).

Copyright (C) 1994 Jonathan D. Pincus and William R.
  25                  Bush
          Copyright (C) Free Software Foundation, Inc.

This file is included in a modification of GNU CC, and
      uses data structures and routines defined by GNU CC.
  30
      GNU CC is free software; you can redistribute it and/or
      modify it under the terms of the GNU General Public
      License as published by the Free Software Foundation;
      either version 2, or (at your option) any later
  35  version.
```

```
        GNU CC is distributed in the hope that it will be
        useful, but WITHOUT ANY WARRANTY; without even the
        implied warranty of MERCHANTABILITY or FITNESS FOR A
        PARTICULAR PURPOSE.  See the GNU General Public License
 5      for more details.

You should have received a copy of the GNU General
        Public License along with GNU CC; see the file COPYING.
        If not, write to the Free Software Foundation, 675 Mass
10      Ave, Cambridge, MA 02139, USA.  */ include "config.h"
15      #include <stdio.h>
        #include <ctype.h>
        #include <assert.h>
        #include <stddef.h>
        #include "tree.h"
20
        /* fix turn on prototypes for this file only; turning
        them on globally leads to many many errors */ ifdef MSDOS
25      #undef PROTO
        #define PROTO(args) args
        #endif /* opcodes for intermediate file -- shared with ccheck
30      */
        #include "../ccheck/opcodes.h"

struct mapping_def {
35          enum tree_code         code;
            parse_record_kind      kind;
```

```
                int             what;
                int             num_ops;
                };

5      #define UNKNOWN_RECORD -1
        #define IGNORE_RECORD -2 define MAPTREECODE(sym,record,kind,num_ops) { sym,
        record, kind,  num_ops },
10
        static struct mapping_def mapping[] = {
        #include "interm.def"
        };
        #undef MAPTREECODE
15
        /* access macros for the mapping structure */ define PARSE_KIND(code)        (mapping[code].kind)
        #define SUB_KIND(code)          (mapping[code].what)
20      #define NUM_OPERANDS(code)
        (mapping[code].num_ops)

/* maximum number of operands that can be written for a
        routine */
25      #define MAX_OPS 10

/* the file which is the destination */
        static FILE *outfile;
        #ifdef _DEBUG
30      static FILE *logfile;
        #endif /* whether we've seen a function declaration yet */
        static int in_function = FALSE;
35
        /* private routine definitions */
```

```
        static void patch_function_start PROTO((void));
        static void patch PROTO((statement_kind,long));
        static void patch_end_block PROTO((int));
        static void write_current_line PROTO((void));
 5      static long write_parse_record_kind
        PROTO((parse_record_kind));
        static long write_tree PROTO((tree));
        static void write_string PROTO((size_t, char*));
        static void write_field PROTO((tree));
10      static long write_string_cst PROTO((size_t, char*));
        static long write_decl PROTO((tree, declaration_kind));
        static short num_exprs_for_statement
        PROTO((statement_kind));
        static void write_statement
15      PROTO((statement_kind,tree,tree));
        static void write_patch
        PROTO((parse_patch_kind,long,long));

20      /* data structures and routines dealing with patches */

/* a stack of all the block statements that have been
        encountered */
        /*    TREE_LIST nodes, where the TREE_VALUE is the
25            offset of that block statement.  This is needed to
              restore the last_statement_address appropriately
              when the end-of-block is seen.
        */

30      static tree block_stmts = NULL_TREE;

/* the last statement that has been written out; needed
        to generate patch information */
        static long last_statement_address = NULL_OFFSET;
35
```

```c
    /* whether the last statement needs its EXP field patch
    (as opposed to its NEXT field). This will be true if
    the last statement was an IF, ELSE, LOOP, or BLOCK
    */ static int patch_last_exp_field = FALSE;

/* whether the next statement should be inserted in the
    NEXT chain. This is TRUE unless the last statement
    seen was an IF or an ELSE in these situations, the
    chain must come from the IF or ELSE statement, not the
    'completion' statement. This is necessary because of a
    quirk the C grammar.
    */ static int chain_statement;

static void
patch_function_start ()
{
    block_stmts = NULL_TREE;
    last_statement_address = NULL_OFFSET;
    patch_last_exp_field = FALSE;
    chain_statement = TRUE;
} static void
patch (kind, new_statement)
    statement_kind kind;
    long new_statement;
{
    /* if this is not the first statement, generate a
    patch statement */
    if (last_statement_address != NULL_OFFSET)
    {
        /* what kind of patch is needed? */
```

```
                    parse_patch_kind p_kind = (patch_last_exp_field ?
                        PATCH_EXPRESSION : PATCH_NEXT);
                    write_patch (p_kind, last_statement_address,
                                new_statement);
 5              }
                /* now update internal records structures */
                /* XXX is switch_stmt appropriate? */
                if (kind == BLOCK_STMT || kind == LOOP_STMT /* ||
                            kind == SWITCH_STMT */)
10                  {
                    /* push this on the stack */
                    if (chain_statement)
                        /*    a block occurring without a preceeding
                              if or else.  The statement following the
15                            block is patched to follow the block
                              statement. */
                        block_stmts = tree_cons ((tree)new_statement,
                                        (tree)chain_statement,
                                        block_stmts);
20                  else
                        /*    a block as the first statement of an if
                              or else.  The statement following the
                              block is patched to follow the if or
                              else */
25                      block_stmts = tree_cons
                ((tree)last_statement_address,
                                (tree)chain_statement,
                                 block_stmts);
                    last_statement_address = new_statement;
30                  }
                else if (chain_statement)
                    last_statement_address = new_statement;

/* what needs to get updated in this statement? */
35              patch_last_exp_field = (kind == IF_STMT || kind ==
                                ELSE_STMT
```

```
                    || kind == LOOP_STMT || kind == BLOCK_STMT
                    || kind == SWITCH_STMT);

chain_statement = (kind != IF_STMT && kind !=
 5                             ELSE_STMT && kind !=
      SWITCH_STMT);
      } static void
10    patch_end_block (is_loop)
          int   is_loop;      /* is it a loop (as opposed to
                                 simple block) */
      {
          /* update the last statement */
15        last_statement_address = (long) TREE_PURPOSE
                                            (block_stmts);

/* and pop the stack */
          block_stmts = TREE_CHAIN (block_stmts);
20        /* patch the NEXT field, not the EXP field */
          patch_last_exp_field = FALSE;
          chain_statement = TRUE;
      }

25

/* utility routines to write out specific bits of
      information within a record */

30    /* temporary routine to enable setting breakpoints */ int cchwrite (ptr, size, number, fptr)
          void *ptr;
          size_t size;
35        size_t number;
          FILE *fptr;
```

```
    {
#ifdef _DEBUG
    long value_written;
    if (size == 1)
5    value_written = (long) *(char *)ptr;
    else if (size == 2)
     value_written = (long) *(short *)ptr;
    else
     value_written = *(long *)ptr;
10   fprintf (logfile, "\t%d * %d bytes, value = %ld\n",
      size, number, value_written);
#endif
    return fwrite (ptr, size, number, fptr);
    }
15
#define OUTPUT_AS(s,type)      \
    {                          \
    type __dummy_var = (type)(s);           \

20  (void)cchwrite(&__dummy_var,sizeof(type),1,outfile);  \
    \
    }                          \ define OUTPUT_ARRAY(s,length,type)
25  (void)cchwrite(s,sizeof(type),length,outfile)

static void
    write_current_line ()
    {
30     short number = lineno;
       OUTPUT_AS (number, short);
    } static void
35  write_string (length, ptr)
       size_t length;
```

```
        char *ptr;
    {
        short length_with_null = length + 1;
        OUTPUT_AS (length_with_null, short);
5       OUTPUT_ARRAY (ptr, length + 1, char);
    }

/* write out a field declaration */
    static void
10  write_field (field)
        tree field;
    {
        long name_addr;
        short i;
15      long result;
        assert (TREE_CODE (field) == FIELD_DECL);

if (TREE_INTERMED_OFFSET (field))
            return;
20
        name_addr = write_tree (DECL_NAME (field));
        /*  the type should already be written out; just
            return the address */
        /* type_addr = write_tree (TREE_TYPE (field)); */
25      result = write_parse_record_kind (FIELD_RECORD);
        OUTPUT_AS (name_addr, long);
        i = (short) TREE_INT_CST_LOW (DECL_FIELD_BITPOS
                        (field));
        OUTPUT_AS (i, short);
30      i = (short) TREE_INT_CST_LOW (TYPE_SIZE (TREE_TYPE
                        (field)));
        OUTPUT_AS (i, short);
        TREE_INTERMED_OFFSET (field) = result;
    }
35
```

```
        /* write out the parse record kind and return where it
        was written */
        static long
        write_parse_record_kind (kind)
   5        parse_record_kind    kind;
        {
            long result;
            result = ftell (outfile);
        #ifdef _DEBUG
  10        fprintf (logfile, "Record kind %d, offset %ld\n",
             kind, result);
        #endif
            OUTPUT_AS (kind, short);
            return result;
  15    } static long
        write_string_cst (length, ptr)
  20        size_t length;
            char *ptr;
        {
            long result = write_parse_record_kind
                                    (STRING_RECORD);
  25        write_string (length, ptr);
            return result;
        }

30    static long
        write_decl (t, kind)
            tree t;
            declaration_kind kind;
        {
  35        long name_addr, type_addr;
            long result;
```

-160-

```
            if (TREE_INTERMED_OFFSET (t))
                return TREE_INTERMED_OFFSET (t);

/* variables may be extern or static */
5           if (kind == LOCAL_VARIABLE_DECLARATION)
                {
                if (TREE_STATIC (t))
                    kind = STATIC_VARIABLE_DECLARATION;
                else if (TREE_PUBLIC (t))
10                  kind = GLOBAL_VARIABLE_DECLARATION;
                }
            name_addr = write_tree (DECL_NAME (t));
            type_addr = write_tree (TREE_TYPE (t));
            result = write_parse_record_kind
15                                      (DECLARATION_RECORD);
            OUTPUT_AS (kind, short);
            OUTPUT_AS (name_addr, long);
            OUTPUT_AS (type_addr, long);
            return result;
20      }

25      /* write out a tree node; may be an expression,
        constant, or identifier */ static long
        write_tree (t)
30          tree t;
        {
            long result;
            parse_record_kind   kind;
            expression_kind what;
35          short length;
            long ops[MAX_OPS];
```

```
              short num_ops = 0;
              tree params, field;
              long type_addr;
              long name_addr;
        5     int i;

if (! t)
               return NULL_OFFSET;

10     if (TREE_INTERMED_OFFSET (t))
               /* already written out */
               return TREE_INTERMED_OFFSET (t);

kind = PARSE_KIND (TREE_CODE (t));
       15
              /*    first, write out any things this tree is
                    pointing to that need to be written first */
              switch (kind)
               {
       20       case TYPE_RECORD:
               /* name of tree may be NULL, DECL_NODE or an
                                 IDENTIFIER_NODE */
               if (TYPE_NAME (t) && TREE_CODE (TYPE_NAME (t)) !=
                    IDENTIFIER_NODE)
       25         name_addr = write_tree (DECL_NAME (TYPE_NAME
                                                        (t)));
               else
                 name_addr = write_tree (TYPE_NAME (t));
               /* write out what it points to */
       30     type_addr = write_tree (TREE_TYPE (t));
              break;

case DECLARATION_RECORD:
               /* this really means to write out the variable
       35            that this declaration points to */
                  ops[0] = write_decl (t, SUB_KIND (TREE_CODE
```

-162-

```
                                                  (t)));
              kind = EXPRESSION_RECORD;
              what = VARIABLE;
              type_addr = write_tree (TREE_TYPE (t));
 5            num_ops = 1;
              break;

case EXPRESSION_RECORD:
              /* a few special cases here */
10            what = (expression_kind) SUB_KIND (TREE_CODE
                                                           (t));
              if (what == -1)
              {
              /* nop, convert, lexpr -- write out what it's
15               poiint to */
              return write_tree (TREE_OPERAND (t, 0));
              }
            num_ops = NUM_OPERANDS (TREE_CODE (t));
            if (TREE_CODE (t) == STRING_CST)
20            ops[0] = write_string_cst (TREE_STRING_LENGTH
                                                           (t),
                TREE_STRING_POINTER (t));
            else if (TREE_CODE (t) == INTEGER_CST)
              ops[0] = TREE_INT_CST_LOW (t);
25          else if (TREE_CODE (t) == REAL_CST)
              *(double *)ops = TREE_REAL_CST (t);
            /* for anything but a call, just iterate through
     */
            else if (num_ops != -1)
30            {
              for (i = 0; i < num_ops; i++)
                ops[i] = write_tree (TREE_OPERAND (t, i));
              }
            else
35            {
              /* for a call, the parameters are chained
```

-163-

```
              together */
         ops[0] = write_tree (TREE_OPERAND (t, 0));
         num_ops = 1;
         for (params = TREE_OPERAND (t, 1); params;
5                 params = TREE_CHAIN (params))
            ops[num_ops++] = write_tree (TREE_VALUE
                                            (params));
         }
        /* write out the type */
10       type_addr = write_tree (TREE_TYPE (t));
        break;

case UNKNOWN_RECORD:
        fprintf (stderr, "Unable to write out tree code %d
15    (%s) to intermediate file\n",
                TREE_CODE (t), tree_code_name [TREE_CODE
                                                  (t)]);
        return NULL_OFFSET;

20       case IGNORE_RECORD:
        return NULL_OFFSET;

default:
        /* do nothing */
25       break;
         }

/* write out the record header */
        result = write_parse_record_kind (kind);
30      /* save this on the tree */
        TREE_INTERMED_OFFSET (t) = result;

switch (kind)
          {
35        case ERROR_RECORD:
          /* nothing needs to be written out here */
```

```
              break;

case STRING_RECORD:
          /* identifier */
    5     write_string ((short)IDENTIFIER_LENGTH (t),
                             IDENTIFIER_POINTER (t));
          break;

case TYPE_RECORD:
    10    what = SUB_KIND (TREE_CODE (t));
          OUTPUT_AS (what, short);
          OUTPUT_AS (name_addr, long);
          if (TYPE_SIZE (t))
              length = (short) TREE_INT_CST_LOW (TYPE_SIZE
    15                                                  (t));
          else
              length = 0;     /* unknown */
          OUTPUT_AS (length, short);
          OUTPUT_AS (type_addr, long);
    20    if (TREE_CODE (t) == RECORD_TYPE || TREE_CODE (t)
                          == UNION_TYPE)
              {
              for (field = TYPE_FIELDS (t); field; field =
                              TREE_CHAIN (field))
    25            write_field (field);
              }
          break;

case EXPRESSION_RECORD:
    30    OUTPUT_AS (what, short);
          OUTPUT_AS (num_ops, short);
          OUTPUT_AS (type_addr, long);
          OUTPUT_ARRAY (ops, num_ops, long);
          break;
    35
          default:
```

-165-

```
                break;

}
        return result;
 5    }

/* initialize. */

10  #define INTER_FILE_NAME "ccheck.int"
    #define LOG_FILE_NAME "ccheck.log"

void
    begin_inter_file ()
15  {
        outfile = fopen (INTER_FILE_NAME, "wb");
        if (! outfile)
          {
          fprintf(stderr, "Error: unable to open %s for
20  output\n",
                INTER_FILE_NAME);
          outfile = stdout;
          }

25      /* could put in some header information here; not
           doing that yet */
    #ifdef _DEBUG
        logfile = fopen (LOG_FILE_NAME, "w");
    #endif
30  } void
    end_inter_file ()
    {
35      fclose (outfile);
    #ifdef _DEBUG
```

```
            fclose (logfile);
    #endif
        }

5

/* externally visible entry points for various
            statement types and function begin/end
         */
10

/* beginning of function: write out the FUNCTION_RECORD
         */ void
15      write_begin_function(decl)
            tree decl;       /* function decl for this function
                              */
        {
            long result;
20          long name_addr;
            long filename_addr;

in_function = TRUE;

25      #ifdef _DEBUG
            printf("Writing function %s\n",
              IDENTIFIER_POINTER (DECL_NAME (decl)));
        #endif 30          /* write out the name */
            name_addr = write_tree (DECL_NAME (decl));
            /* write out the current filename */
            filename_addr = write_string_cst (strlen
                        (input_filename), input_filename);
35          result = write_parse_record_kind (FUNCTION_RECORD);
            OUTPUT_AS (name_addr, long);
```

```
            OUTPUT_AS (filename_addr, long);
            write_current_line ();

patch_function_start ();
 5      }

/* end of function: write out the END_FUNCTION record,
        which includes the list of all static and external
        variable declarations used by this function */
10
        #define NEED_TO_WRITE_OUT(decl)             \
            (DECL_USED_IN_FUNCTION (decl) && TREE_CODE (decl)
                == VAR_DECL \
                && (DECL_EXTERNAL (decl) || TREE_STATIC
15              (decl)))

void
        write_end_function()
        {
20          long result;
            short num_externals = 0;
            long *externals;
            tree decl;
            tree param;
25          tree last_external_seen = NULL_TREE;
            int need_to_search_again;

/* search all globals to see which are used this
                function */
30
            for (decl = first_global(); decl; decl = TREE_CHAIN
                    (decl))
            {
            /*  if it's a global or static variable used in
35              this function, put it on the list of globals
                used */
```

```
            if (NEED_TO_WRITE_OUT (decl))
                {
                num_externals++;
                last_external_seen = decl;
 5              }
            }

/*    are we going to have to loop through again?
              not if we've seen exactly 0 or 1 external */
10      need_to_search_again = num_externals > 1;

/* now loop through each parameter */ for (param = DECL_ARGUMENTS
15                 (current_function_decl);
             param;
             param = TREE_CHAIN (param))
          if (TREE_INTERMED_OFFSET (param))
             num_externals ++;
20
        /* and, perhaps, the return value (if any) */
        if (DECL_RESULT (current_function_decl)
         && TREE_INTERMED_OFFSET (DECL_RESULT
                      (current_function_decl)))
25        num_externals++;

result = write_parse_record_kind
                       (END_FUNCTION_RECORD);
        OUTPUT_AS (num_externals, short);
30
        if (num_externals)
         {
         int i = 0;
         /* now, allocate the storage and collect them */
35       externals = (long *) malloc (num_externals *
                       sizeof (long));
```

-169-

```
            if (need_to_search_again)
               {
               /* general case: 2 or more extern/static
                     variables */
 5             for (decl = first_global(); decl; decl =
                         TREE_CHAIN (decl))
                  {
                  if (NEED_TO_WRITE_OUT (decl))
                     externals[i++] = TREE_INTERMED_OFFSET
10                                      (decl);
                  }
               }
            else if (last_external_seen)
               /* special case: only one */
15             externals[i++] = TREE_INTERMED_OFFSET
                                    (last_external_seen);

for (param = DECL_ARGUMENTS
                            (current_function_decl);
20             param;
               param = TREE_CHAIN (param))
                  if (TREE_INTERMED_OFFSET (param))
                     externals[i++] = TREE_INTERMED_OFFSET
                                         (param);
25
            if (DECL_RESULT (current_function_decl)
                   && TREE_INTERMED_OFFSET (DECL_RESULT
                                (current_function_decl)))
               externals[i++] = TREE_INTERMED_OFFSET
30                                        (DECL_RESULT
                                (current_function_decl));

OUTPUT_ARRAY (externals, num_externals, long);
            }
35
         /* no longer in a function */
```

-170-

```
            in_function = FALSE;
        }

/* writing out statements.  most statements can be
 5      handled similaraly; all we need to know is how many
        expressions they take.  Some require special handling
         */ define MAX_ADDRESSES    2
10
        struct statement_exprs {
            statement_kind  kind;
            short       num_exprs;
            };
15
        static struct statement_exprs statement_map[] =
            {
            { EXPR_STMT, 1 },
            { IF_STMT, 2 },
20          { SWITCH_STMT, 2 },
            { ELSE_STMT, 2 },
            { BLOCK_STMT, 1 },
            { LOOP_STMT, 1 },
            { CONTINUE_STMT, 0 },
25          { BREAK_STMT, 0 },
            { DECL_STMT, 2},
            { RETURN_STMT, 1 }
            };

30      #define STMT_MAP_SIZE    (sizeof (statement_map) /
        sizeof                              (statement_map[0]))

static short
        num_exprs_for_statement (kind)
35          statement_kind  kind;
        {
```

```
        int i;
        for (i = 0; i < STMT_MAP_SIZE; i++)
            {
            if (statement_map[i].kind == kind)
5               return statement_map[i].num_exprs;
            }
        return -1;
    }

10  static void
    write_statement (kind, e1, e2)
        statement_kind kind;
        tree    e1;     /* first expression (if any) */
        tree    e2;     /* second expression (if any) */
15  {
        short num_exprs = num_exprs_for_statement (kind);
        long exprs[MAX_ADDRESSES];
        long result;

20      if (num_exprs == -1)
         {
         /* ooops, didn't find it */
         fprintf(stderr,
             "Internal error: write statement can not
25                       write kind %d\n",
             kind);
         return;
         }

30      exprs[0] = write_tree (e1);
        exprs[1] = write_tree (e2);
        result = write_parse_record_kind
                                (STATEMENT_RECORD);
        OUTPUT_AS (kind, short);
35      OUTPUT_AS (num_exprs, short);
        write_current_line ();
```

```
            OUTPUT_ARRAY (exprs, num_exprs, long);
            patch (kind, result);
        } void
    write_expr_statement (e)
        tree e;    /* the expression */
    {
        write_statement (EXPR_STMT, e, NULL_TREE);
    } void
    write_if_statement (condition)
        tree condition; /* the condition */
    {
        write_statement (IF_STMT, NULL_TREE, condition);
    } void
    write_else_statement (condition)
        tree condition; /* the condition, for an ELSIF */
    {
        write_statement (ELSE_STMT, NULL_TREE, condition);
    } void
    write_block_statement ()
    {
        write_statement (BLOCK_STMT, NULL_TREE, NULL_TREE);
    } void
```

```
    write_loop_statement ()
    {
        write_statement (LOOP_STMT, NULL_TREE, NULL_TREE);
    }
5
    void
    write_end_block_statement ()
    {
        patch_end_block (FALSE);
10  } void
    write_end_loop_statement ()
    {
15      patch_end_block (TRUE);
    } void
20  write_goto_statement (label)
        tree label;     /* the label */
    {
        write_statement (GOTO_STMT, label, NULL_TREE);
    }
25
    void
    write_switch_statement (e)
        tree e;    /* the expression */
    {
30      write_statement (SWITCH_STMT, NULL_TREE, e);
    } void
    write_case (e)
35      tree e;    /* the expression */
    {
```

```
        } void
        write_end_switch_statement ()
  5     {
            /* patch_end_block (FALSE); */
        }

10     void
        write_break_statement ()
        {
            write_statement (BREAK_STMT, NULL_TREE, NULL_TREE);
        }
 15
        void
        write_continue_statement ()
        {
            write_statement (CONTINUE_STMT, NULL_TREE,
 20     NULL_TREE);
        } void
        write_loop_continue_here ()
 25     {
        } void
        write_return_statement (e)
 30         tree e;    /* the expression to be returned or NULL
        */
        {
            write_statement (RETURN_STMT, e, NULL_TREE);
        }
 35
        void
```

```
    write_decl_statement (decl, e)
        tree decl;  /* the declartion node */
        tree e;     /* the initial value */
    {
5       /* GCC declares some dummy variables that we want
            to ignore */
        if (DECL_IGNORED_P (decl))
         return;
        /* avoid writing out parameters [these are handled
10      by the external_list at in the
    END_FUNCTION_RECORD] */ if (TREE_CODE (decl) == PARM_DECL)
         return;
15
        write_statement (DECL_STMT, decl, e);
    } static void
20  write_patch (p_kind, last_address, this_address)
        parse_patch_kind    p_kind;
        long        last_address;
        long        this_address;
    {
25      (void) write_parse_record_kind (PATCH_RECORD);
        OUTPUT_AS (p_kind, short);
        OUTPUT_AS (last_address, long);
        OUTPUT_AS (this_address, long);
    }
30
```

What is claimed is:

1. A method for detecting programming errors in a component of a computer program, the method comprising:

detecting that a resource, whose use is prescribed by one or more statements of the component, is in any of one or more states; and detecting that the component includes a first statement which requires that the resource be in a specific one of the one or more states and that the first statement is not preceded in a control flow path through the component by a second statement, execution of which ensures that the resource is in the specific state.

2. The method of claim 1 wherein the one or more states comprise a definitely allocated state and a definitely unallocated state.

3. The method of claim 2 wherein the specific state is the definitely allocated state.

* * * * *